US008171556B2

(12) United States Patent
Torigai et al.

(10) Patent No.: US 8,171,556 B2
(45) Date of Patent: May 1, 2012

(54) PERSONAL INFORMATION PROTECTION METHOD, PERSONAL INFORMATION PROTECTION SYSTEM, PROCESSING DEVICE, PORTABLE TRANSMITTER/RECEIVER, AND PROGRAM

(75) Inventors: Masamichi Torigai, Yokohama (JP); Mikio Fujii, Hachioji (JP); Yutaka Tsukamoto, Kyoto (JP)

(73) Assignee: Mieko ISHII, Kurashiki-shi, Okayama (JP)

( * ) Notice: Subject to any disclaimer, the term of this patent is extended or adjusted under 35 U.S.C. 154(b) by 1472 days.

(21) Appl. No.: 10/398,743

(22) PCT Filed: Oct. 10, 2001

(86) PCT No.: PCT/JP01/08896
§ 371 (c)(1),
(2), (4) Date: Apr. 15, 2003

(87) PCT Pub. No.: WO02/33610
PCT Pub. Date: Apr. 25, 2002

(65) Prior Publication Data
US 2004/0015690 A1    Jan. 22, 2004

(30) Foreign Application Priority Data

Oct. 17, 2000 (JP) ................................. 2000-316358
Aug. 28, 2001 (JP) ................................. 2001-258259

(51) Int. Cl.
*H04L 29/06* (2006.01)
(52) U.S. Cl. .................. 726/26; 726/27; 726/28; 726/2; 726/3; 705/26.1; 705/26.35; 705/74; 705/76; 705/54; 709/237; 709/230; 709/229; 709/228; 713/156; 713/180

(58) Field of Classification Search ........................ None
See application file for complete search history.

(56) References Cited

U.S. PATENT DOCUMENTS 5,950,173 A * 9/1999 Perkowski ...................... 705/26
(Continued)

FOREIGN PATENT DOCUMENTS
EP         1324203 A1 *  7/2003
(Continued)

OTHER PUBLICATIONS

Naoyuki Sato et al., *An Authentication System that Can Verify an Anonymous Person's Rights*, IPSJ MAGAGINE, vol. 41, No. 8, Aug. 2000.

(Continued)

*Primary Examiner* — Syed A. Zia
(74) *Attorney, Agent, or Firm* — Westerman, Hattori, Daniels & Adrian, LLP

(57) ABSTRACT

A prescribed virtual person was created for allowing a real person (user) in the actual world to pretend to be the virtual person (virtual person) and act as the virtual person when acting on a network and registered in a database 12*a* of a financial institution 7 for enabling the user to make shopping or the like as the virtual person with an electronic certificate issued by the financial institution 7 for the virtual person when pretending to be the virtual person and acting on the network, and the address of the virtual person necessary as the destination of a purchased article was set to a nearby convenience store. When acting on the network as the virtual person, cookies are rendered easily acceptable as compared with the case of the real person.

8 Claims, 46 Drawing Sheets

U.S. PATENT DOCUMENTS

| | | | |
|---|---|---|---|
| 5,987,440 A * | 11/1999 | O'Neil et al. | 705/44 |
| 6,005,939 A * | 12/1999 | Fortenberry et al. | 705/76 |
| 6,269,349 B1 * | 7/2001 | Aieta et al. | 705/80 |
| 6,421,729 B1 | 7/2002 | Paltenghe et al. | |
| 6,611,253 B1 * | 8/2003 | Cohen | 345/168 |
| 6,718,468 B1 * | 4/2004 | Challener et al. | 713/184 |
| 6,725,269 B1 * | 4/2004 | Megiddo | 709/228 |
| 6,757,826 B1 | 6/2004 | Paltenghe | |
| 6,801,946 B1 * | 10/2004 | Child et al. | 709/230 |
| 6,865,681 B2 * | 3/2005 | Nuutinen | 726/14 |
| 6,970,836 B1 | 11/2005 | Paltenghe et al. | |
| 7,089,208 B1 * | 8/2006 | Levchin et al. | 705/39 |
| 7,142,812 B1 * | 11/2006 | Brankovic et al. | 455/41.2 |
| 7,200,578 B2 * | 4/2007 | Paltenghe et al. | 705/74 |
| 7,249,139 B2 * | 7/2007 | Chuah et al. | 1/1 |
| 7,343,351 B1 * | 3/2008 | Bishop et al. | 705/67 |
| 7,647,278 B1 * | 1/2010 | Foth et al. | 705/59 |
| 7,689,243 B2 * | 3/2010 | Kaneda et al. | 455/550.1 |
| 7,814,009 B1 * | 10/2010 | Frenkel | 705/39 |
| 7,853,481 B1 * | 12/2010 | Johnson | 705/26.8 |
| 2002/0004783 A1 | 1/2002 | Paltenghe et al. | |
| 2002/0010635 A1 * | 1/2002 | Tokiwa | 705/26 |
| 2002/0016778 A1 * | 2/2002 | Konno et al. | 705/80 |
| 2002/0032616 A1 * | 3/2002 | Suzuki et al. | 705/26 |
| 2002/0040350 A1 | 4/2002 | Shinzaki | |
| 2003/0158960 A1 * | 8/2003 | Engberg | 709/237 |
| 2007/0143853 A1 * | 6/2007 | Tsukamoto | 726/26 |
| 2008/0048022 A1 * | 2/2008 | Vawter | 235/380 |
| 2009/0193494 A1 * | 7/2009 | Ratliff et al. | 726/1 |
| 2010/0114662 A1 * | 5/2010 | Jung et al. | 705/10 |

FOREIGN PATENT DOCUMENTS

| | | |
|---|---|---|
| JP | 8-329413 | 12/1996 |
| JP | 9-167220 | 6/1997 |
| JP | 10-214284 | 8/1998 |
| JP | 10-285153 | 10/1998 |
| JP | 11-250165 A | 9/1999 |
| JP | 11-306263 | 11/1999 |
| JP | 2001-188755 A | 7/2001 |
| JP | 2002-42008 | 2/2002 |
| JP | 2002-82840 | 3/2002 |
| JP | 2002-109409 | 4/2002 |
| WO | WO 00/14648 | 3/2000 |
| WO | WO 02/21284 | 3/2002 |

OTHER PUBLICATIONS

Japanese Office Action dated Nov. 30, 2010, issued in corresponding Japanese Patent Application No. 2001-258259.

* cited by examiner

FIG.4

| | SITE NAME | ABC | MTT | MEC | --------- |
|---|---|---|---|---|---|
| FIRST TRAP INFORMATION | NAME | B13P | E(B13P) | $E^2$(B13P) | --------- |
| | PUBLIC KEY | KPB | KPB' | KPB" | --------- |
| | E-MAIL ADDRESS | ○□×△× | △△△△△ | △△△△△ | --------- |
| | VIRTUAL ACCOUNT NUMBER | 2503 | E(2503) | $E^2$(2503) | --------- |
| | VIRTUAL CREDIT NUMBER | 9145 | E(9145) | $E^2$(9145) | --------- |
| SECOND TRAP INFORMATION | SITE NAME | AMZ | RAK | ASK | --------- |
| | NAME | NPXA | E(NPXA) | $E^2$(NPXA) | --------- |
| | PUBLIC KEY | KPN | KPN' | KPN" | --------- |
| | E-MAIL ADDRESS | ××○△□ | △△△△△ | △△△△△ | --------- |
| | VIRTUAL ACCOUNT NUMBER | 3541 | E(3541) | $E^2$(3541) | --------- |
| | VIRTUAL CREDIT NUMBER | 3288 | E(3288) | $E^2$(3288) | --------- |

FIG.5

|  | PRIVATE INFORMATION A | PRIVATE INFORMATION B | ----- |
|---|---|---|---|
| FIRST PRIVATE INFORMATION | ○○△+Dks(○○△) | ××△+Dks(××△) | ----- |
| SECOND PRIVATE INFORMATION | △○○+Dks(△○○) | △××+Dks(△××) | ----- |
| THIRD PRIVATE INFORMATION | ○△○+Dks(○△○) | ×△×+Dks(×△×) | ----- |
| FOURTH PRIVATE INFORMATION | △○△+Dks(△○△) | △×△+Dks(△×△) | ----- |
| ⋮ | ⋮ | ⋮ | ⋮ |

FIG.6

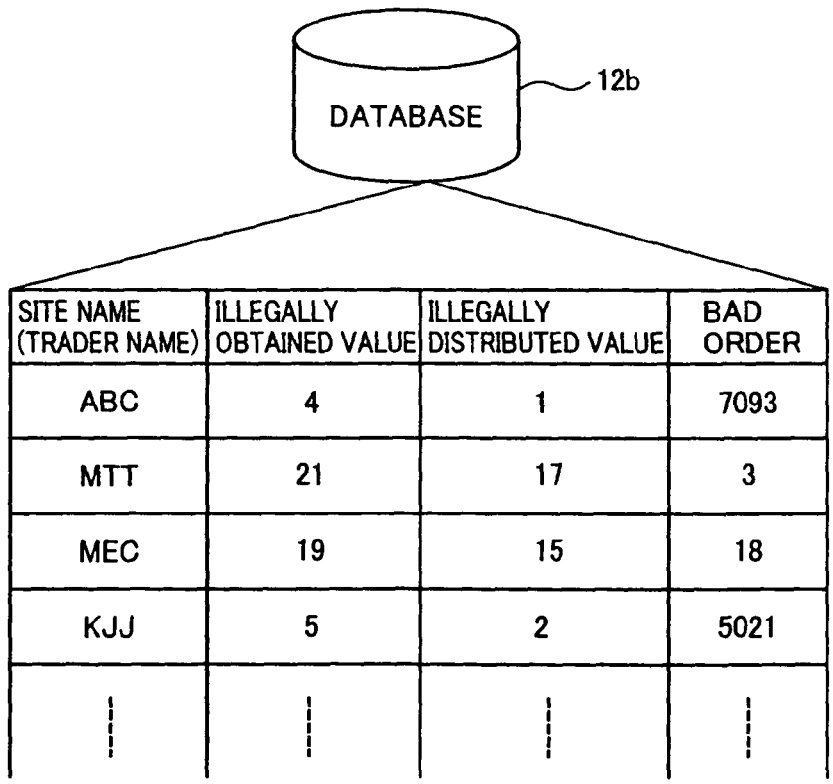

DATABASE — 12b

| SITE NAME (TRADER NAME) | ILLEGALLY OBTAINED VALUE | ILLEGALLY DISTRIBUTED VALUE | BAD ORDER |
|---|---|---|---|
| ABC | 4 | 1 | 7093 |
| MTT | 21 | 17 | 3 |
| MEC | 19 | 15 | 18 |
| KJJ | 5 | 2 | 5021 |
| ⋮ | ⋮ | ⋮ | ⋮ |

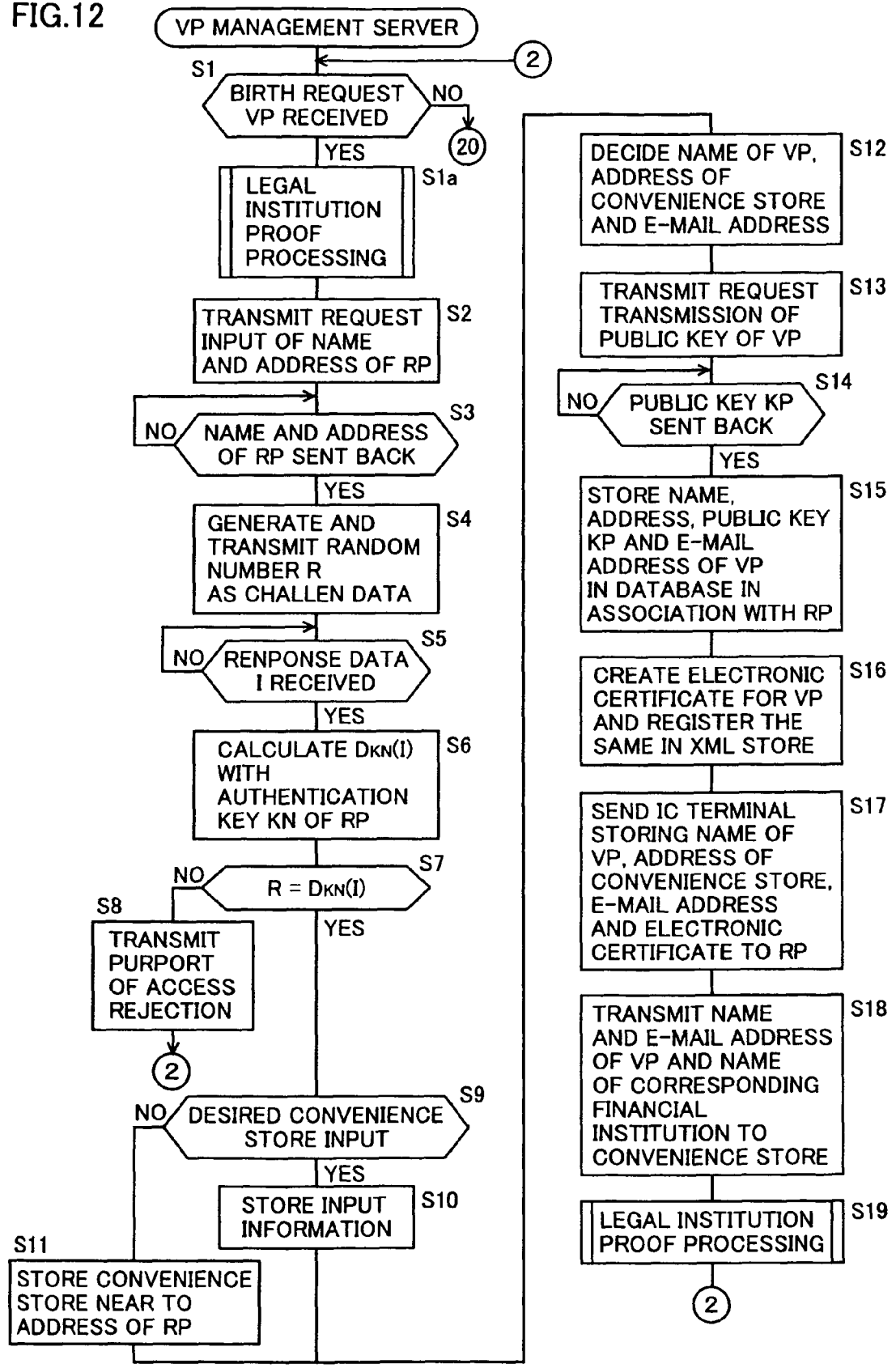

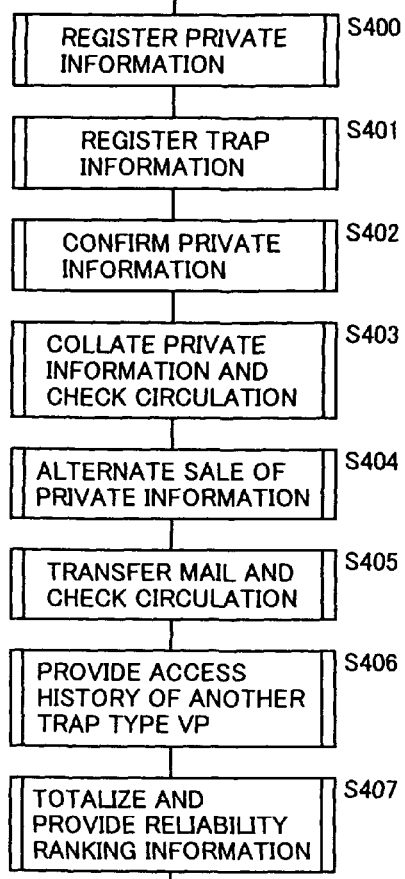
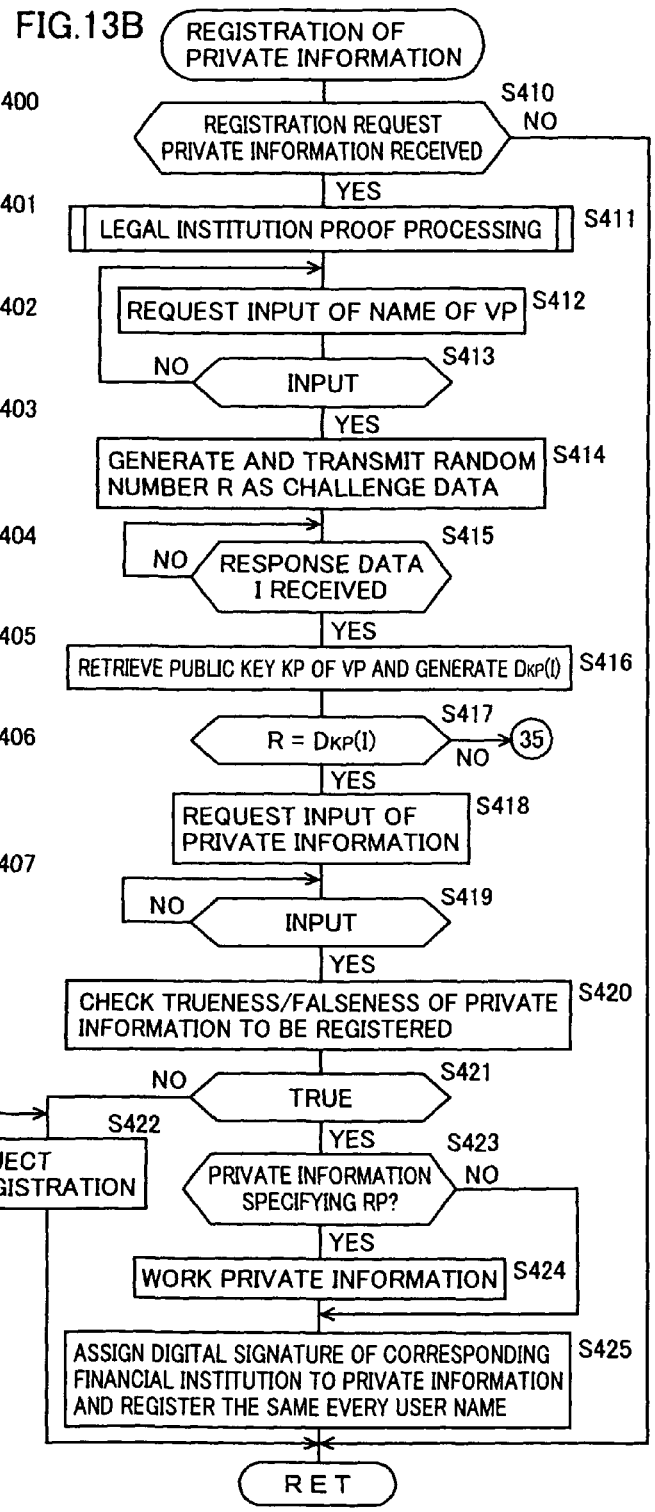

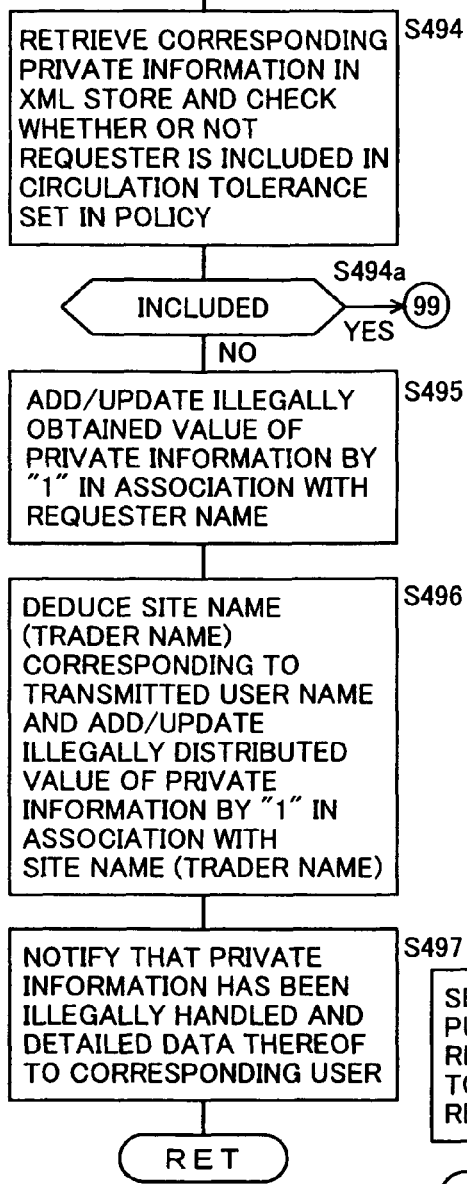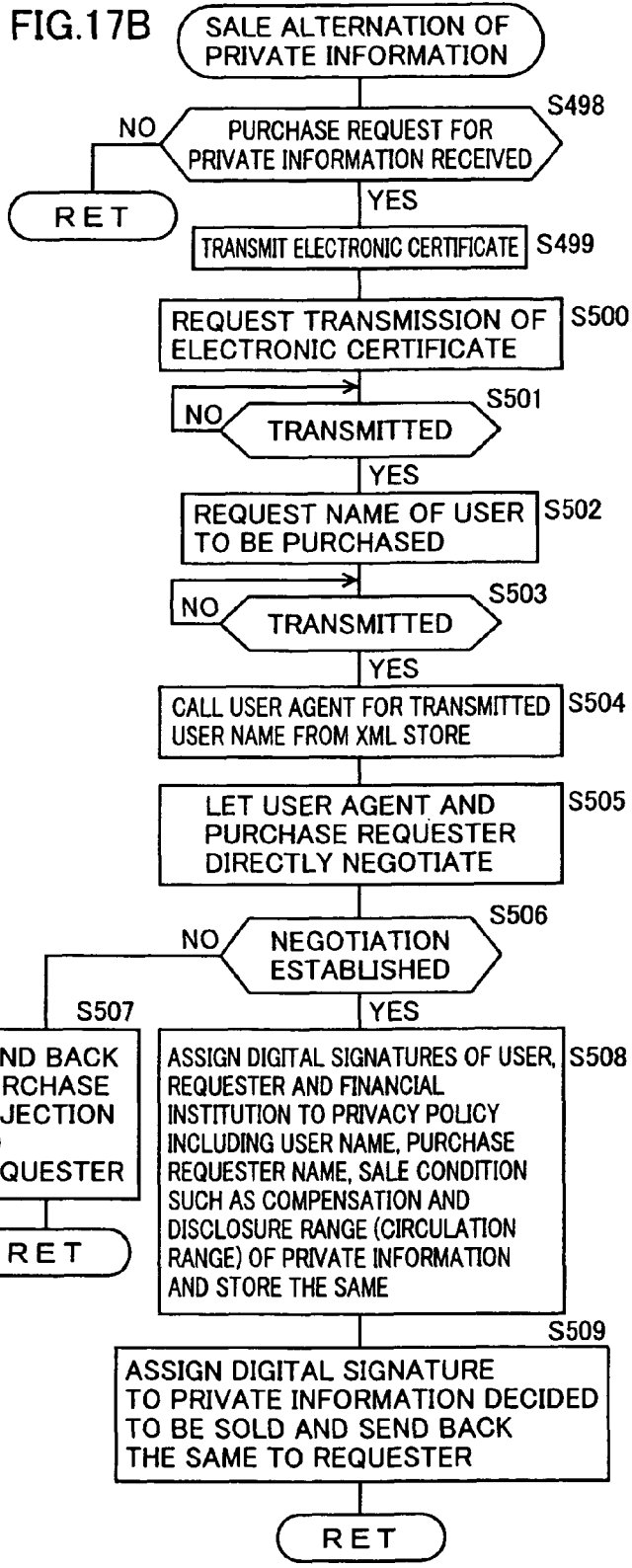

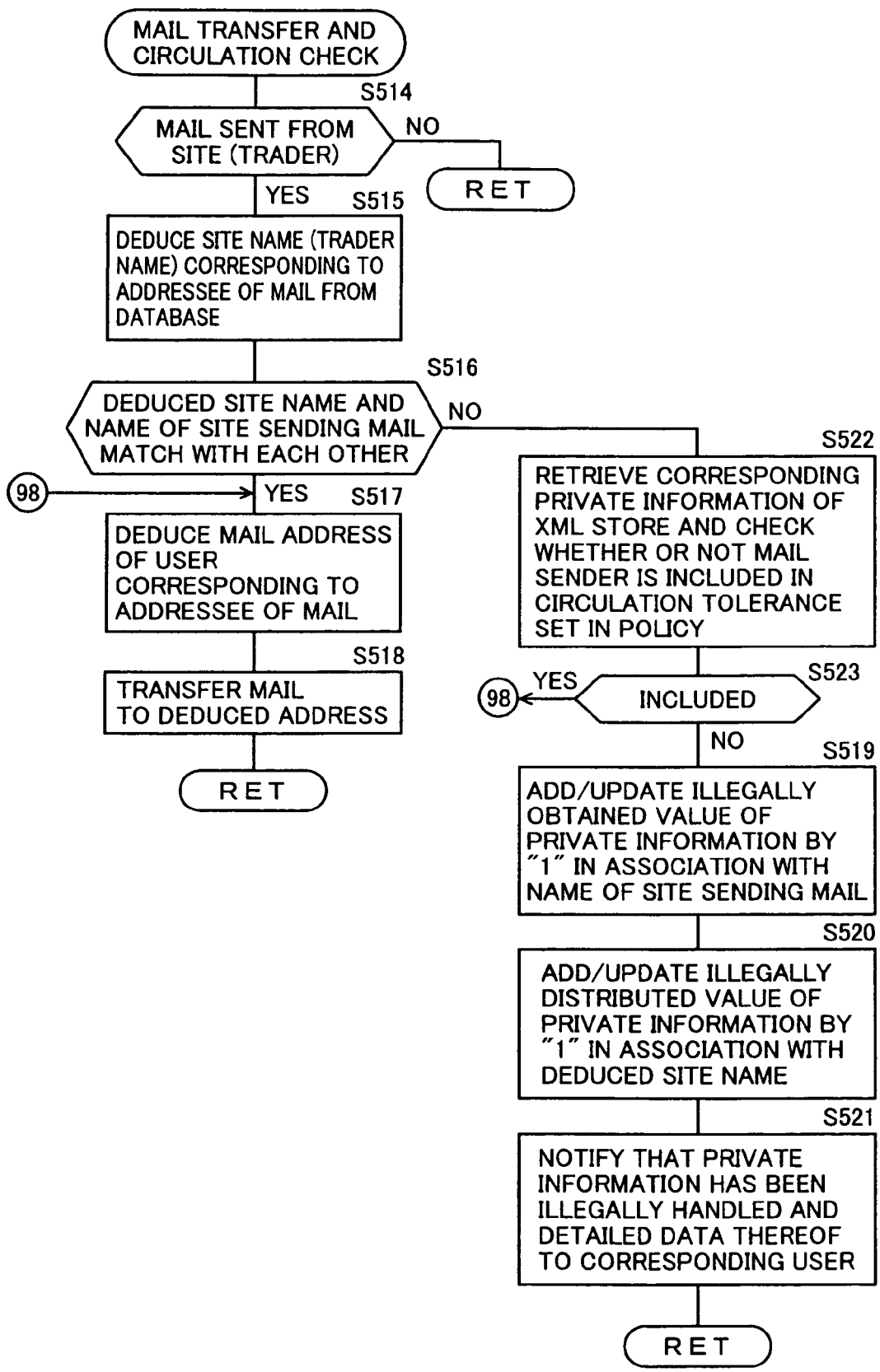

FIG.34A
FIG.34B
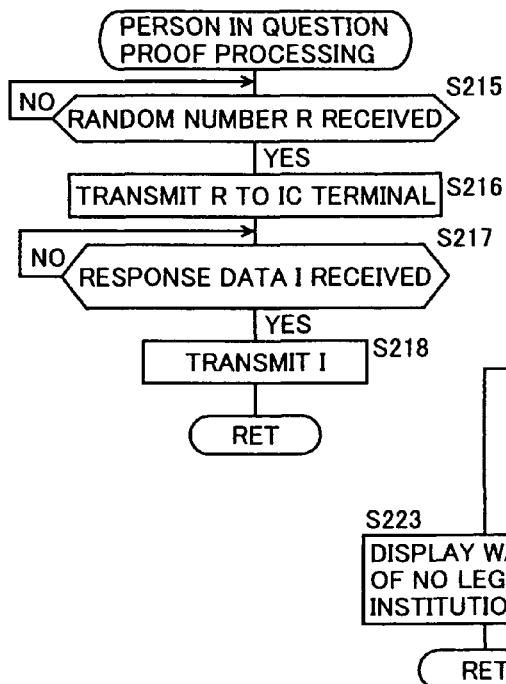
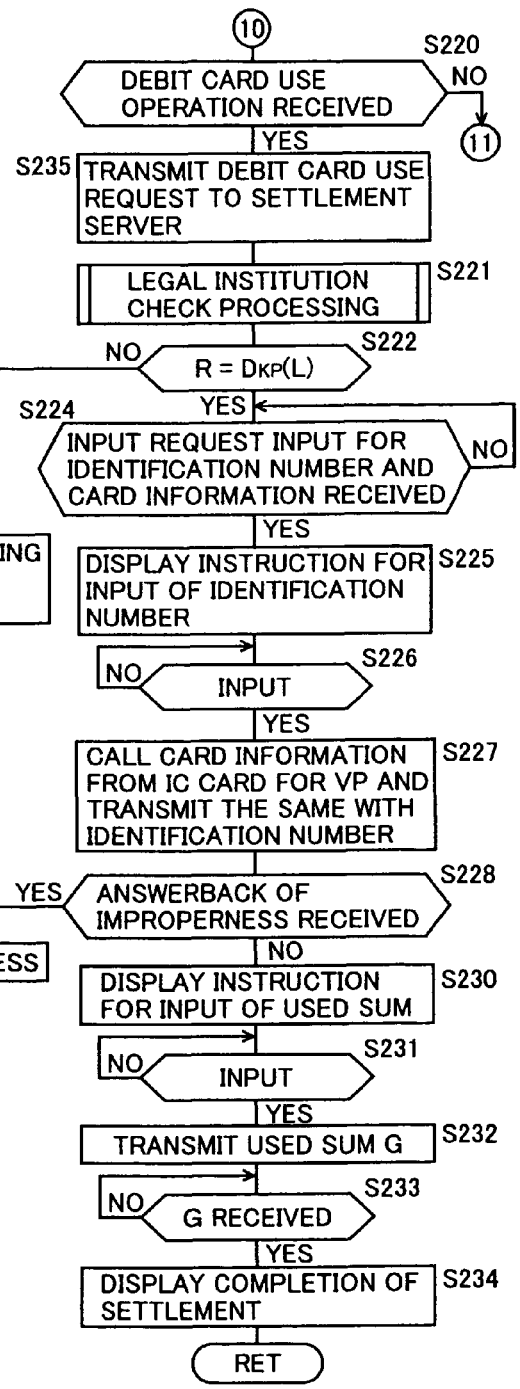

PERSONAL INFORMATION PROTECTION METHOD, PERSONAL INFORMATION PROTECTION SYSTEM, PROCESSING DEVICE, PORTABLE TRANSMITTER/RECEIVER, AND PROGRAM

TECHNICAL FIELD

The present invention relates to a private information protection method, a private information protection system, a processor, a portable transmitter-receiver and a program protecting private information on a network through a computer system.

BACKGROUND TECHNIQUE

In general, when a user accesses a site through the Internet or the like, for example, and takes some action such as shopping, for example, on the network, he/she may be required to transmit private information such as the address, the name, the age etc. of the user from the site.

In this regard, there has generally been such a structure that the site presents a privacy policy to the user for clarifying the object of collecting the private information, handling of the collected private information etc. and lets the user transmit the private information upon approval by the user.

In this type of conventional private information protection method, on the other hand, the user acting on the network acts in the name of him/herself, whereby it follows that the private information is also collected in the state revealing the name of the person in question, and hence the user necessarily hesitates to provide the private information to the site, leading to difficulty in collecting the private information on the site. When trying to collect private information of a customer for selecting articles or information suitable for the customer and providing information to the customer, therefore, the site disadvantageously cannot provide sufficient services since sufficient private information is not collected.

As a method of collecting private information of a user accessing the site, there has generally been a method for the site to utilize a cookie (cookie) which is exemplary identification data for tracing what sort of site the user has accessed and collecting information. This method is employed for transmitting and storing identification data (cookie, for example) to a terminal (browser phone (portable telephone) or personal computer) of the user accessing the site and specifying the terminal of the user with the clue of the identification data (cookie, for example) in next access thereby tracing what sort of site he/she accesses and collecting information.

However, there has been such a disadvantage that, when the user transmits his/her name and address from the terminal recording such a trace type cookie, for example, the cookie may be registered in association with the name of the user and the name, the address etc. of the user may thereafter be specified with the clue of the cookie to result in a problem in privacy.

Therefore, the user may act with a personally created pseudonym when accessing the site through the terminal. When taking action such as shopping, for example, with the pseudonym, however, there arises such a new disadvantage that the destination of a purchased article cannot be specified and hence the user cannot obtain the purchased article. Further, no electronic certificate is issued in the case of the pseudonym, and hence it follows that remarkably large restriction is imposed when acting on the network with the pseudonym, resulting in such a disadvantage that the user cannot freely act.

The present invention has been devised in consideration of such circumstances, and an object thereof is to make it possible to easily provide services following sufficient collection of private information on a trader side while protecting private information of a user acting on a network, and to enable the user to freely act on the network.

DISCLOSURE OF THE INVENTION

An aspect of the present invention is a private information protection method protecting private information on a network through a computer system, characterized in a virtual person creation step of creating a prescribed virtual person for allowing a real person in the actual world to pretend to be the virtual person and act as the virtual person when acting on the network, a registration step of registering information capable of specifying the association between said real person and said virtual person in a prescribed institution having the duty of confidentiality, an electronic certificate issuance step of issuing an electronic certificate for said virtual person and an address set step for setting the address of said virtual person to a different address from said real person, for rendering acceptance limitation for identification data transmitted from a site for identifying a user variable with a case of acting on the network as said real person and with a case of acting on the network as said virtual person.

Another aspect is a private information protection system protecting private information on a network through a computer system, including virtual person creation processing means performing processing of creating a prescribed virtual person for allowing a real person in the actual world to pretend to be the virtual person and act as the virtual person when acting on the network and registration processing means for performing processing of registering information capable of specifying the association between said real person and said virtual person in a prescribed institution having the duty of confidentiality.

In another aspect, further, said prescribed institution is a financial institution.

Still another aspect is a private information protection system protecting private information on a network through a computer system, including virtual person creation processing means performing processing of creating a prescribed virtual person for allowing a real person in the actual world to pretend to be the virtual person and act as the virtual person when acting on the network and electronic certificate issuance processing means performing processing for issuing an electronic certificate for said virtual person.

In still another aspect, further, said electronic certificate is issued by a prescribed institution having the duty of confidentiality registering information capable of specifying the association between said real person and said virtual person for certifying that said virtual person is registered in this prescribed institution.

A further aspect is a private information protection system protecting private information on a network through a computer system, including virtual person creation processing means performing processing for creating a prescribed virtual person for allowing a real person in the actual world to pretend to be the virtual person and act as the virtual person when acting on the network and address set means performing processing for setting the address of said virtual person to a different address from said real person.

In the further aspect, further, the address of said virtual person is the address of a prescribed convenience store.

A further aspect is a private information protection system protecting private information on a network through a computer system, including virtual person creation processing means performing processing for creating a prescribed virtual person for allowing a real person in the actual world to pretend to be the virtual person and act as the virtual person when acting on the network and credit number issuance processing means performing processing for issuing a credit number for said virtual person, for allowing the real person to make payment on credit as said virtual person through the credit number issued by the credit number issuance processing means.

A further aspect is a private information protection system protecting private information on a network through a computer system, including virtual person creation processing means performing processing for creating a prescribed virtual person for allowing a real person in the actual world to pretend to be the virtual person and act as the virtual person when acting on the network and account opening processing means performing processing for opening a bank account for said virtual person, for allowing the real person to settle accounts as said virtual person through funds in the account opened by said account opening processing means.

A further aspect is a private information protection system protecting private information on a network through a computer system, including virtual person creation processing means performing processing for creating a prescribed virtual person for allowing a real person in the actual world to pretend to be the virtual person and act as the virtual person when acting on the network, for rendering acceptance limitation for identification data transmitted from a site for identifying a user variable with a case of acting on the network as said real person and with a case of acting on the network as said virtual person.

A further aspect is a processor employed for protection of private information on a network, including request acceptance means accepting a request for creating a prescribed virtual person for allowing a real person in the actual world to pretend to be the virtual person and act as the virtual person when acting on the network, virtual person creation processing means performing processing for creating the prescribed virtual person on condition that the request is accepted by said request acceptance means and association storage processing means performing processing for storing information capable of specifying the association between the virtual person created by the virtual person creation processing means and said real person corresponding to this virtual person as a database.

A further aspect is a processor for protecting private information on a network, including public key storage processing means performing processing for accepting input of a public key for a prescribed virtual person created for allowing a real person in the actual world to pretend to be the virtual person and act as the virtual person when acting on the network and storing the input public key in a database and electronic certificate creation/issuance processing means for performing processing of creating and issuing an electronic certificate for said virtual person corresponding to said stored public key, while said electronic certificate creation/issuance processing means performs creation/issuance processing for the electronic certificate on condition that it is registered said virtual person for whom information capable of specifying the association between said real person and said virtual person is registered in a prescribed institution having the duty of confidentiality.

A further aspect is a processor for protecting private information on a network, including payment approval processing means for performing approval processing for payment when a purchase request by credit payment is received through a credit number issued for a prescribed virtual person created for allowing a real person in the actual world to pretend to be the virtual person and act as the virtual person when acting on the network and payment request processing means performing processing for issuing a request for credit payment approved by the payment approval processing means to a credit card issuing company, while said payment approval processing means approves payment after confirming an electronic certificate issued for said virtual person.

A further aspect is a processor for protecting private information on a network, including charge request acceptance processing means performing processing for accepting a charge request charging funds in a bank account opened for a prescribed virtual person created for allowing a real person in the actual world to pretend to be the virtual person and act as the virtual person when acting on the network for settling accounts and charge processing means performing processing for deducing the bank account corresponding to corresponding said virtual person and remitting a fund corresponding to the sum of the charge request from the funds in the bank account when said charge request acceptance processing means accepts the charge request.

A further aspect is a processor for protecting private information on a network, said processor is set on an address of a prescribed virtual person created for allowing a real person in the actual world to pretend to be the virtual person and act as the virtual person when acting on the network while said address is different from that of said real person, and includes storage processing means performing processing for storing information capable of specifying said virtual person employing the address where the processor is set as his/her address in a database, keep information storage processing means performing processing for storing information capable of specifying that an article purchased by the virtual person stored in the storage processing means and delivered to the address where said processor is set has been kept and delivery approval processing means confirming, when receiving a delivery request for said kept article, that a virtual person issuing the delivery request is the virtual person stored in said database and performing processing for issuing approval for delivery of the corresponding article on condition that it is the virtual person whose article is kept.

A further aspect is a program for protecting private information on a network, for letting a computer function as creation request determination means determining whether or not a request operation for creating a prescribed virtual person for allowing a real person in the actual world to pretend to be the virtual person and act as the virtual person when acting on the network has been made, birth request transmission means performing processing for transmitting a birth request for said virtual person to a prescribed institution when the creation request determination means determines that the creation request has been made and prescribed information transmission means performing processing for transmitting information capable of specifying said real person making the birth request for said virtual person and necessary for bearing said virtual person to said prescribed institution.

A further aspect is a processor for protecting private information on a network, while said processor is a portable processor enabled to transfer and receive information to and from a terminal of a user and carried by the user, used when a real person as said user pretends to be a prescribed virtual person and acts on the network as this virtual person, and constituted to be capable of storing, when identification data transmitted from a site for identifying the user is transmitted to said terminal, said identification data on behalf of said terminal.

In the further aspect, further, the processor outputs said stored identification data when the user accesses the site through said terminal to be capable of transmitting said stored identification data to said site at need.

In the further aspect, further, the processor further includes an input/output part for enabling the terminal of said user to input/output information and identification data storage means storing said identification data when said identification data is input from the input/output part.

In the further aspect, further, the processor externally outputs the stored identification data when an output instruction for the stored identification data is input.

In the further aspect, further, the processor stores information related to said virtual person and externally outputs the stored information related to said virtual person when an output instruction for information related to said virtual person is input.

A further aspect is a portable transmitter-receiver carried by a user for performing transmission/receiving with a nearby base station by radio and capable of entering a network through said base station, comprising a processing function for a virtual person for allowing a real person in the actual world to pretend to be the virtual person and act as the virtual person when acting on the network, and comprising different route enter means for the virtual person for performing processing of directly making radio communication to a terminal connected to the network when the user enters the network as the virtual person with said processing function for the virtual person and entering the network not through an enter route from said base station but from said terminal.

A further aspect is a private information protection system allowing a real person in the actual world to pretend to be a virtual person and act as the virtual person when acting on a network, including access means accessing a site not intended by said real person in response to a request from said real person.

In the further aspect, further, the private information protection system further includes private information provision processing means performing processing of providing the real name of said real person to the site accessed by said access means and cookie acceptance processing means performing processing for accepting and storing identification data transmitted from the site accessed by said access means for identifying the user.

In the further aspect, further, the private information protection system further includes access inhibition means comprised in said access means for determining whether or not the accessed site is within access tolerance previously set by the user and not accessing the site if the site is not within the access tolerance.

BRIEF DESCRIPTION OF THE DRAWINGS

FIG. 4 is an explanatory diagram showing various data stored in the database set in the financial institution.

FIG. 5 is an explanatory diagram showing various data stored in the database set in the financial institution.

FIG. 6 is an explanatory diagram showing various data stored in the database set in the financial institution.

FIG. 12 is a flow chart showing processing operations of a VP management server.

FIG. 13A is a flow chart showing processing operations of the VP management server, and FIG. 13B is a flow chart showing a subroutine program of private information registration processing.

FIG. 17A is a flow chart showing a subroutine program of private information collation and circulation check, and FIG. 17B is a flow chart showing a subroutine program of private information sale alternation.

FIG. 18 is a flow chart showing a subroutine program of mail transfer and circulation check.

FIG. 34A is a flow chart showing a subroutine program of person in question proof processing, and FIG. 34B is a flow chart showing part of a subroutine program of settlement processing for the VP.

BEST MODES FOR CARRYING OUT THE INVENTION

Figure 1:
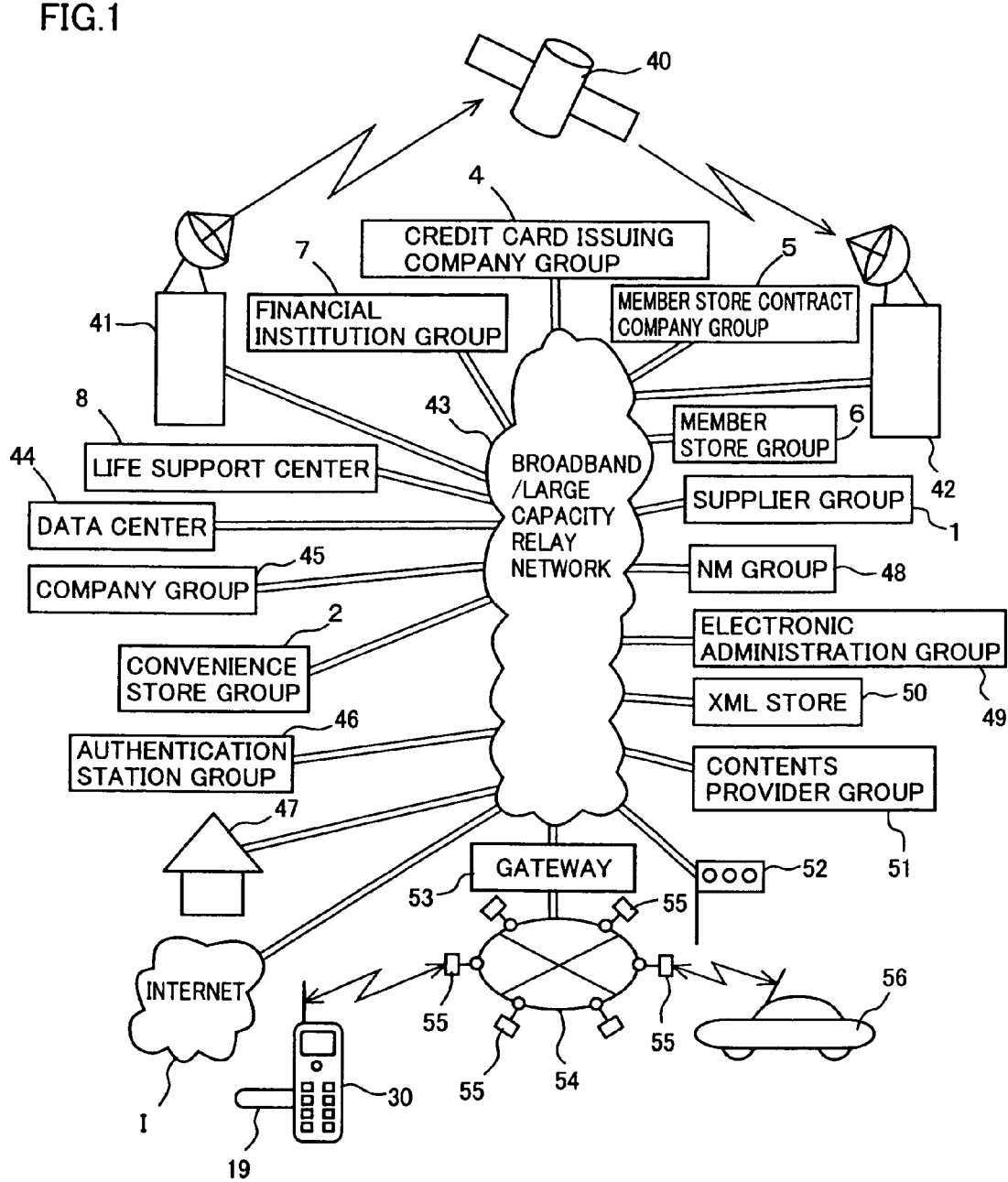
FIG. 1 is a schematic system diagram showing the overall structure of a private information protection system.

An embodiment of the present invention is now described in detail with reference to the drawings. FIG. 1, showing a network system utilizing the broadband, is a block diagram showing the overall outline of a private information protection system. The system is so constituted that a credit card issuing company group 4, a member store contract company group 5, a receiving station 42, a member store group 6, a supplier group 1, an NM group (new middleman group) 48, an electronic administration group 49, an XML store 50, a contents provider group 51, a signal 52, a gateway 53 connected to a portable telephone network 54, the Internet I, a user's house 47, an authentication station group 46, a convenience store group 2, a company group 45, a data center 44, a life support center 8, a broadcast station 41, a financial institution group 7 etc. can transmit/receive information through a broadband/large capacity relay network 43. Referring to the figure, numeral 40 denotes a satellite (satellite) employed for relaying broadcasting waves from the broadcast station 41 and sending the waves to the receiving station 4.

The credit card issuing company group 4 is a card issuing group exhibiting a function as an issuer when settling accounts by SET (Secure Electronic Transaction), for example. The member store contract company group 5 is a company consisting of a financial institution or the like contracting with the member store group 6 constituting an electronic mall or the like, and an institution functioning as an acquirer in SET. The supplier group 1 denotes an article maker or the like, and an institution providing articles and information. The NM group 48 is a service trader mediating between the supplier group 1 and a consumer (a natural person or a corporate body) for supporting consumer's consuming action such as shopping, for example. While a conventional middleman such as a wholesaler or a trading company supports sales of the supplier group, this NM group 48 is different in a point that the same supports purchase (supports consuming action) of the consumer. More specifically, a service provider storing preference information, purchase history information, access history information to a Web site etc. of the consumer as a database and recommending article information etc. suitable for the consumer on the basis of stored profile information (private information) of the consumer for helping the consuming action of the consumer corresponds to this NM group 48.

The electronic administration group 49 is formed by bringing administration of a city office, a tax office or central government agencies, for example, into an electronic state. The XML store 50 denotes a database storing data by a unified data structure according to XML while providing prescribed data to a data requester at need. The XML store 50 stores various types of private information of the user and a user agent (including knowledge data for the agent). The XML store 50 is constituted to be capable of providing necessary data when accessed by the financial institution group 7 or the user while performing person in question authentication and keeping security. The contents provider group 51 denotes a trader group providing various contents such as images, characters, sounds etc. through the network. The signal 52 for traffic control is also connected to the broadband/large capacity relay network 43 and constituted to be remote-controllable.

The system is so constituted that radio waves of the browser phone (advanced portable telephone) 30 are transmitted to the base station 55 connected to the portable telephone network 45 to be capable of accessing the financial institution group 7, the member store group 6, the NM group 48, the electronic administration group 49, the XML store 50, the contents provider group 51 etc. through the base station 55, the portable telephone network 45, the gateway 53 and the broadband/large capacity relay network 43. A vehicle 56 is also constituted to be capable of accessing various service providers and various institutions through the base station 55, the portable telephone network 54, the gateway 53 and the broadband/large capacity relay network 54.

The authentication station group 46 is an institution issuing an electronic certificate to a desirer for issuance of the electronic certificate after performing person in question authentication. The data center 44 denotes an institution storing and managing various data distributed from the broadcast station 41 by radio. In order to transmit large capacity data when the user requests transmission of prescribed information to the member store group 6, the supplier group 1, the NM group 48, the electronic administration group 49, the contents provider group 51 or the like, the data center 44 temporarily stores data distributed by these respective institutions and service providers so that the broadcast station 41 distributes the data by radio when a prescribed day comes and the receiving station 42 distributes the received data to prescribed users through the broadband/large capacity relay network 43.

Numeral 8 denotes the life support center. This life support center 8 is an institution collecting private information of the user and providing a service of recommending dreams, a life plan, a type of occupation, hobbies etc. suitable for the user on the basis of the private information and recommending member stores (including new middlemen) providing various articles and information necessary for implementing these.

Referring to FIG. 1, portions shown by double lines denote a wireless LAN, a CATV, a satellite, an xDSL (digital subscriber line), FTTH (fiber to the home) etc.

According to this embodiment, not only the authentication station group 46 but also the financial institution group 7 issues an electronic certificate. Referring to FIG. 1, numeral 19 denotes an IC terminal carried by the user, which stores the profile information (private information) of the user etc. as described later.

Figure 2A:
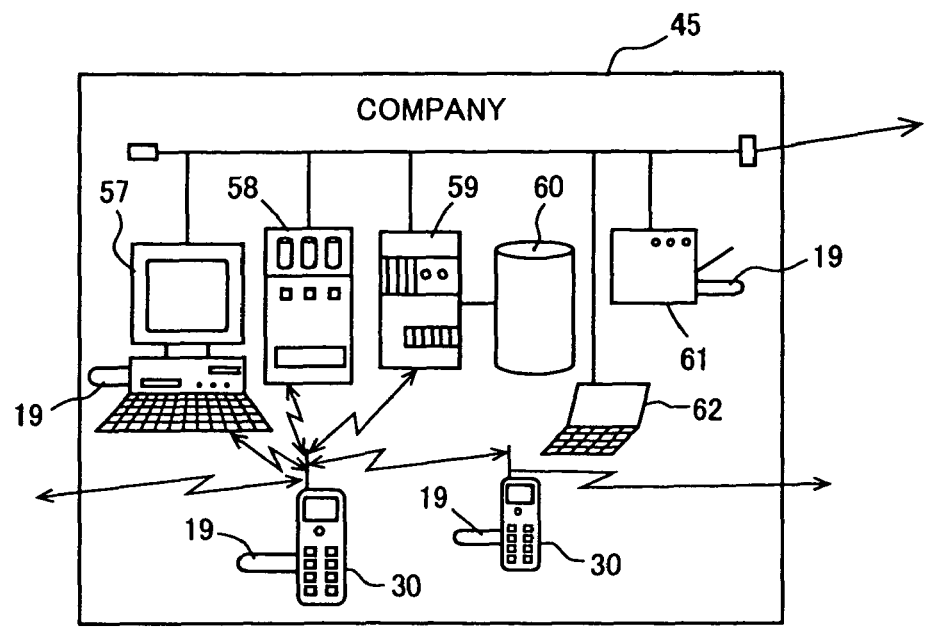
FIG. 2A illustrates a schematic structure of a company.
Figure 2B:
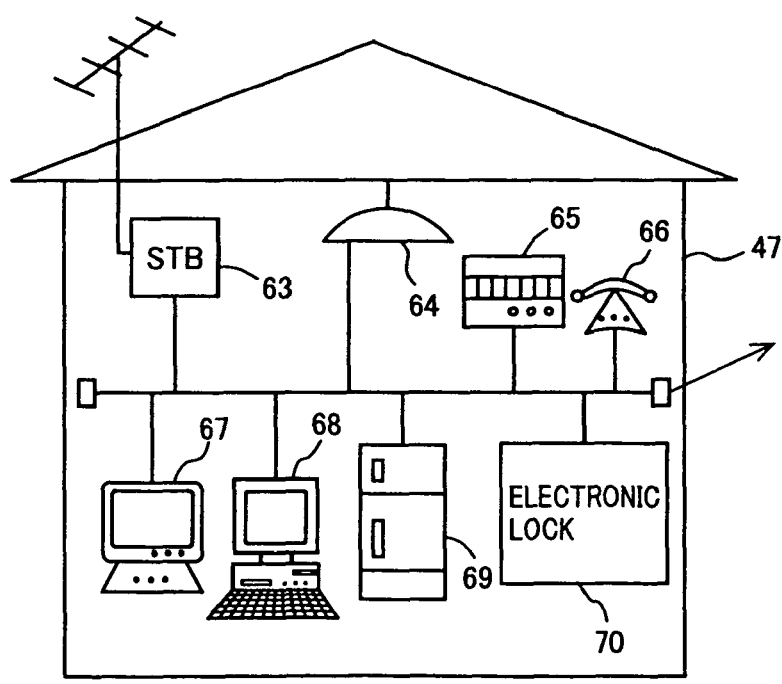
FIG. 2B is a diagram showing a schematic structure of a user's house.

FIG. 2A shows an example of the company group 45 shown in FIG. 1, and FIG. 2B shows an example of the user's house 47 shown in FIG. 1.

An intra-office LAN is constructed in the company 45, and a personal computer 57, a vending machine 58, a server 59, a database 60, a notebook computer 62 and a facsimile 61 are connected with each other to be capable of transferring information.

A browser phone 30 is constituted to be capable of directly making transmission/receiving with the personal computer 57, the vending machine 58, the server 59 and another browser phone 30 through Bluetooth (Bluetooth). The aforementioned data center 44 stores information requiring security among information such as contents to be distributed in an encrypted state, and the broadcast station 41 distributes the encrypted information in the encrypted state by radio when distributing the same. On the other hand, the IC terminal 19 comprises a security function such as a key for person in question authentication of the user possessing the IC terminal 19 and an encryption algorithm in addition to the private information. The encrypted information distributed from the aforementioned broadcast station 41 and transmitted to the intra-office LAN in the company 45 through the broadband/large capacity relay network 43 or the like is constituted to be decodable with the key and the algorithm stored in this IC terminal 19.

Further, it is possible to receive the transmitted information in the browser phone 30, decode the encrypted information by the IC terminal 19 and display the same as the original information such as a plaintext by connecting this IC terminal 19 to the browser phone 30. When connecting the IC terminal 19 to the browser phone 30, it is further possible to encrypt and transmit/receive telephone conversation. The IC terminal 19 is constituted to be capable of, when the browser phone 30 receives encrypted telephone conversation, decoding the same to the original telephone conversion in real time and sending the telephone conversation from a speaker.

It is possible to encrypt data transmitted/received by the facsimile 61 by connecting the IC terminal 19 to the facsimile 61. When the facsimile 61 receives encrypted data, the IC terminal 19 can decode the same, return the same to the original data such as a plaintext and print out the same.

A set box 63, a television 67, a personal computer 68, illumination 64, a refrigerator 69, an air conditioner 65, a telephone 66, an electronic lock 70 etc. are connected to a RAN of the user's house 47 in FIG. 2B.

URLs are assigned to the personal computer 57, the vending machine 58, the server 59, the facsimile 61, the notebook computer 62, the set box 63, the television 67, the personal computer 68, the lighting fitting 64, the refrigerator 69, the air conditioner 65, the telephone 66, the electronic lock 70 etc. shown in FIG. 2 respectively, and the system is so constituted as to be capable accessing the respective units by externally accessing the URLs (Uniform Resource Locators) through the broadband/large capacity relay network 43 or the like. For example, it is possible to access the electronic lock 70 and fasten the same by remote control when not fastened, or access the air conditioner 65 so that the air conditioner 65 operates about 10 minutes before the user returns to the user's house 47.

Figure 3:
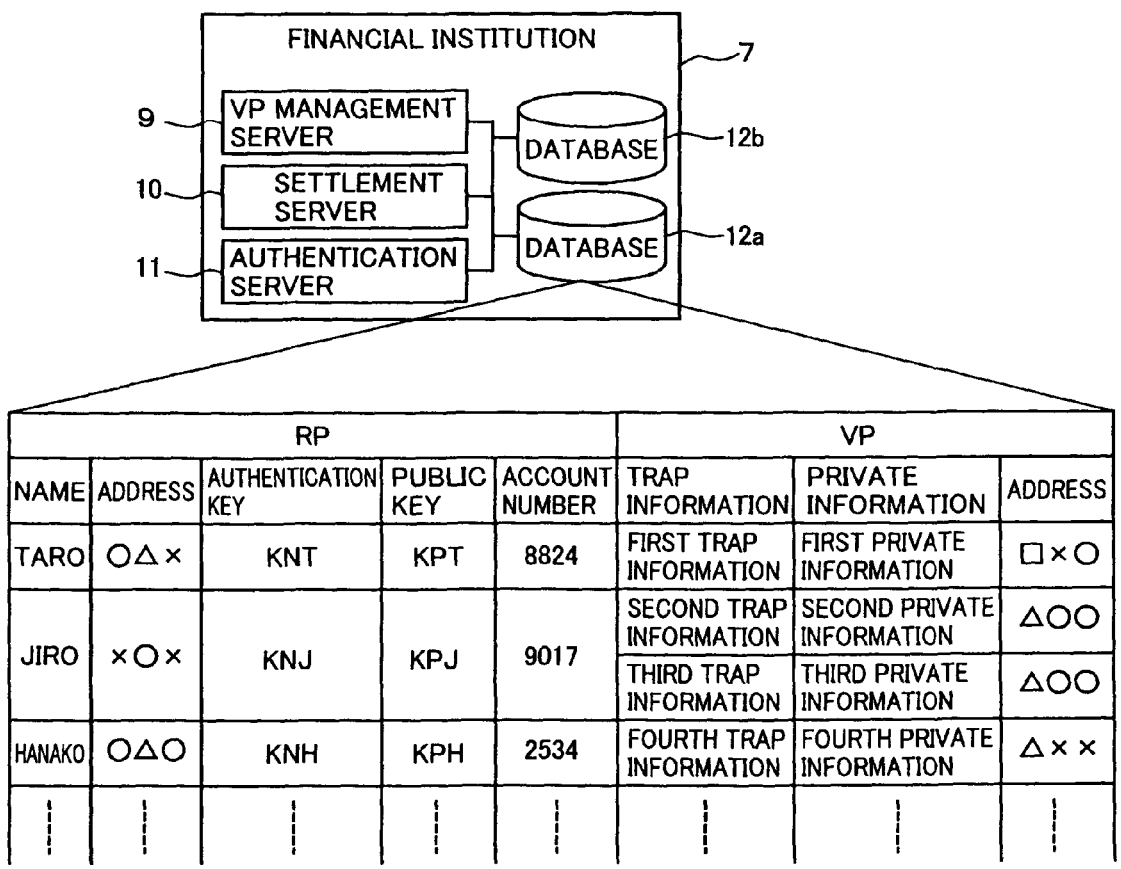
FIG. 3 is an explanatory diagram showing various data stored in a database set in a financial institution.

FIG. 3 is an explanatory diagram for illustrating the financial institution 7. The financial institution 7 comprises a VP management server 9, a settlement server 10, an authentication server 11 and databases 12a and 12b. The VP management server 11 is a server for managing a virtual person (hereinafter simply referred to as "VP") as a virtual person. The VP denotes a virtual person, acting on a network, not existing in the actual world, and denotes a virtual person created for allowing a real person (hereinafter simply referred to as "RP") who is a real person in the actual world to pretend to be the VP and act as the VP when acting on the network.

The VP management server 9 has a function of deciding prescribed information such as the name and the address of the VP and storing the data of the VP in the database 12a when receiving a birth request for the VP from the RP as described later. This VP management server 9 also has a function of creating and issuing an electronic certificate for the VP. When the VP takes legal action such as buying and selling or settlement, it is possible to individually take the legal action as the virtual person by transmitting this electronic certificate to the other party.

The authentication server 11 has a function of creating and issuing an electronic certificate for the RP. The settlement server 10 set in the financial institution 7 has a function of performing processing for not only settling accounts with electronic money or a debit card by the RP but also settling accounts with electronic money or a debit card as the VP.

The database 12a stores data related to the RP and the VP. The database 12b stores data for managing sites (traders) connected to the broadband/large capacity relay network 43 and the Internet I.

As shown in FIG. 3, the database 12a stores the name, the address, an authentication key KN, a public key KT, an account number etc. of the RP as the data for the RP. The authentication key is a key for performing person in question authentication by a common key cipher system when the RP accesses the financial institution 7. The public key is a key employed for a public key cipher system, and a key paired with a secret key. The account number denotes the number of an account opened by the RP in this financial institution 7.

Trap information is information for setting a trap (trap) for deducing the criminal when a site (trader) collects private information and illegally circulates the same. When the VP transfers his/her private information to a certain site (first transferee), for example, he/she employs a name specific to the first transferee. In other words, the VP has a plurality of types of his/her names and uses the same every site (trader). Such a VP name is referred to as a trap type VP name for convenience. When a direct mail or an E-mail is sent from a trader in this case, the addressee of the mail must be the trap type VP name. If the site (trader) sending the mail is a site (trader) different from the first transferee deduced from the trap type VP name and exceeds disclosure tolerance (circulation tolerance) of the transferred private information of his/hers, it follows that the private information has been illegally disclosed (circulated) by the first transferee. Thus, it is possible to deduce the first transferee performing illegal circulation (illegal disclosure) from the trap type VP name.

Referring to FIG. 3, Jiro has double information, i.e., second trap information, third trap information, second private information and third private information. Jiro registers these double types of information in the financial institution 7 in order to act as these two VPs when acting on the network. The address of the VP denotes the address of a convenience store 2 desired by the RP or near to the address of the RP, as described later. Consequently, it follows that an article electronically shopped by the VP is delivered to the convenience store 2 which is the address of the VP. The RP can pretend to be the VP, go to the convenience store 2 and receive the delivered article. Thus, it is possible to prevent such inconvenience that the association between the VP and the RP is revealed with the clue of the address.

FIG. 4 shows the details of the trap information shown in FIG. 3. Each trap information of the first trap information, the second trap information, . . . includes a name (trap type VP name), a public key, an E-mail address, a virtual account number and a virtual credit number every site name. When the VP accesses a site name (trader name) ABC, for example, he/she employs B13P which is his/her real name, employs a public key KPB' paired with the VP's secret key KSB, employs ○□X△X which is the VP's real E-mail address, employs 2503 which is the VP's real account number and employs 3288 which is the VP's real credit number.

When accessing a site name (trader name) MTT, on the other hand, the VP employs E(B13P) created by encrypting the real name of the VP with the VP's secret key once as the name of the trap type VP. As the secret key, he/she employs EKSB(KSB) created by encrypting the VP's real secret key KSB with the VP's real secret key KSB once. The database 12a stores the public key KPB for this secret key EKSB (KSB). As the E-mail address, he/she employs an E-mail address △△△△△ opened by the financial institution 7 for the trap type VP. As the account number, he/she employs E(2503) created by encrypting the VP's real account number with the VP's real secret key once as a virtual account number. As to the credit number, he/she employs E(3288) created by encrypting the VP's real credit number with the VP's real secret key once.

When accessing a site name (trader name) MEC, further, he/she employs E2(B13P) created by encrypting the VP's real name with the VP's secret key twice as the trap type VP name.

When the VP acts on the network with the trap type VP name E2(B13P), he/she employs a twice encrypted secret key E2KSB(KSB) created by encrypting the secret key KSB with the secret key KSB twice. The public key paired with the twice encrypted secret key is KPB". As to the E-mail address, he/she employs △△△△△ opened by the financial institution 7 as the E-mail address for the trap type VP. As to the virtual account number, he/she employs E2(2503) created by encrypting the VP's real account number with the secret key twice. As to the credit number, he/she employs a virtual credit number E2(3288) created by encrypting the VP's real credit number with the VP's secret key twice.

Thus, the number of times for encrypting the trap information varies with the site name. Private information provided to the site (the trader) finally returns to the possessor of the private information in the form of an E-mail or a direct mail. The aim of this trap information is to be capable of tracing the criminal setting a trap through the feedback loop of this private information and illegally circulating the private information. In other words, the trap information is employed for the opposite of a tracking type cookie for tracing the user on the net.

FIG. 5 is a diagram illustrating the private information of the VP shown in FIG. 3. Each private information of the first private information, the second private information, the third private information, . . . is constituted by collecting a plurality of types of private information of private information A, private information B, . . . . For example, the private information A includes the age, the sex, the occupation, the annual income etc., and the private information B is information related to the VP's preferences.

As shown in FIG. 5, a digital signature is assigned to each private information with the secret key KS of the financial institution 7. As to the private information A of the first private information, for example, DKS(○○△) which is a digital signature is assigned to the private information of ○○△ itself.

As to each private information stored in this database 12a, the financial institution 7 checks trueness/falseness thereof, stores only the correct one in the database 12a and assigns the digital signature for authenticating the correctness.

FIG. 6 is a diagram showing the information stored in the database 12b of the financial institution 7. The database 12b stores the value of private information illegally obtained by the trader, the value of illegally distributed (illegally circulated) private information and bad order deduced from these values every site name (trader name).

When a certain site name (trader name) MTT illegally obtains private information, the value of illegally obtained private information is added/updated by "1", and when the same illegally circulates private information, the value of illegally circulated private information is added/updated by "1", as described later. The value of the bad order is calculated according to a calculation formula of the value of illegally obtained private information+2×the value of illegally distributed private information, and the bad order ascends as the value is increased. If the value of said calculation formula is the maximum, the bad order is the number one.

Figure 7:
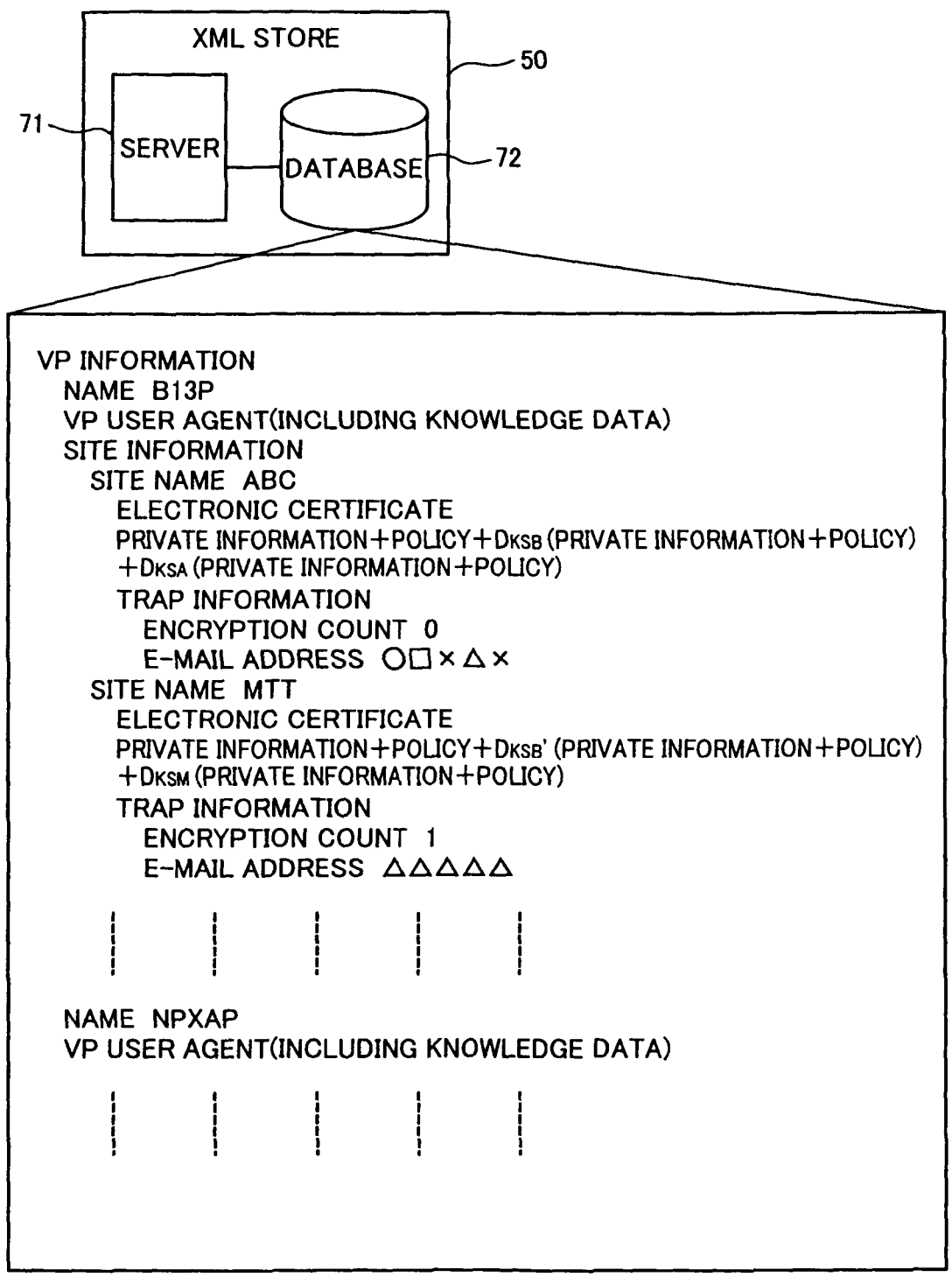
FIG. 7 is an explanatory diagram showing various data stored in a database of an XML store.

FIG. 7 is a diagram showing the structure of the XML store 50. A database 72 and a server 71 controlling the same are set in the XML store 50. The server 71 also has a function of performing person in question authentication on a person accessing the XML store 50 and controlling his/her access.

The database 72 stores data expressed in XML. The contents of the data include B13P, for example, which is the VP's name and a VP user agent (including knowledge data) as VP information, a site name such as ABC, for example, an electronic certificate issued to a VP accessing the site, private information of the VP, the privacy policy of this site, a digital signature DKSB (private information+policy) assigned by this VP to both information and a digital signature DKSA (private information+policy) assigned by this site ABC as site information, an encryption count "0" as trap information and ○□X△X which is the VP's E-mail address. When the VP accesses the site name MTT, further, the data include an electronic certificate issued to the trap type VP accessing the site name MTT, private information provided by the trap type VP to the site, the privacy policy of the site, the digital signature of the trap type VP and the digital signature of the site for both information, an encryption count "1" as the trap information and the E-mail address.

Also as to information of another VP whose name is NPXA, the database 72 stores items similar to the above. This database 72 stores data in the aforementioned items for an extremely large number of VPs.

As to the site name ABC, the VP employs information not encrypted once as the trap information as described with reference to FIG. 4, and hence the encryption count stored in the database 72 is also "0". As to the site name MTT, the VP employs the information encrypted once as the trap information as described with reference to FIG. 4, and hence the encryption count stored in the database 72 is also "1".

The aforementioned VP user agent denotes self-contained software operating for the VP who is the user. This VP user agent is constituted by a mobile agent to be movable through the network.

Each data shown in FIGS. 3 to 7 may be stored in each database in an encrypted state. Thus, the data cannot be decoded even if the same is stolen, and hence reliability in security is improved. If the VP (including a trap type VP) takes unpardonable illegal action (action against the criminal law, for example) on the network, for example, the VP may be retrieved from the database 12a or the like in response to a request or the like from a prescribed institution (police or the like, for example) for deducing the RP corresponding to the VP and providing the address, the name etc. of the RP to the prescribed institution (police or the like, for example) making the request.

Figure 8:
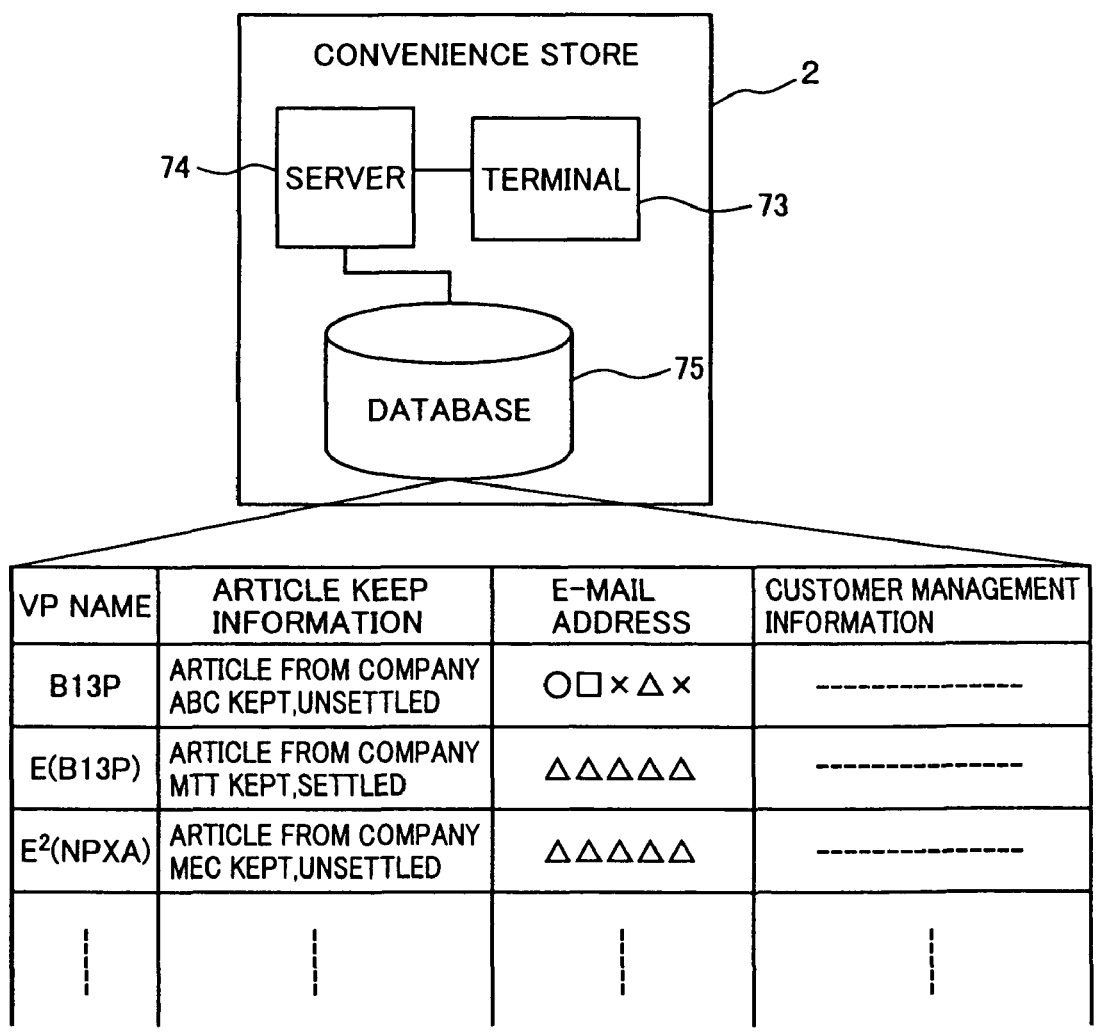
FIG. 8 is an explanatory diagram showing various types of information stored in a database set in a convenience store.

FIG. 8 is a diagram showing the structure of the convenience store 2. A database 75, a server 74 connected thereto and a terminal 73 connected to the server are set in the convenience store 2. The database 75 stores the names of VPs (including trap type VPs) having the address in this convenience store along with article keep information, E-mail addresses, customer management information etc. in association with these names respectively.

When an article purchased by the VP of B13P is delivered to this convenience store 2, the database 75 stores "article from ABC company kept, unsettled" in the storage area for B13P as article keep information. This term unsettled denotes such a state that B13P has purchased the article through the network but not paid therefor.

The database 75 stores E-mail addresses in the column of E-MAIL ADDRESS in correspondence to the respective VPs. B13P is not a trap type VP, and hence the database 75 stores ○□XΔX which is the VP's real E-mail address.

Also for E(B13P) who is a trap type VP, the database 75 stores "article from MTT company kept, settled", for example, as article keep information. E(B13P) is a trap type VP, and hence the database 75 stores an E-mail address opened in the financial institution 7 for the trap type VP.

When a customer coming to the convenience store 2 for receiving an article as a VP (including a trap type VP) keeps the article with respect to a VP (including a trap type VP) registered in this convenience store 2, the server 74 performs processing for delivering the article to the VP (including a trap type VP), as described later.

The convenience store 2 provides not only the keeping service for articles but also a keeping service for direct mails for the VPs. This is because the VPs have the address in the convenience store 2 and the direct mails addressed to the VPs are sent to the convenience store 2.

Figure 9:
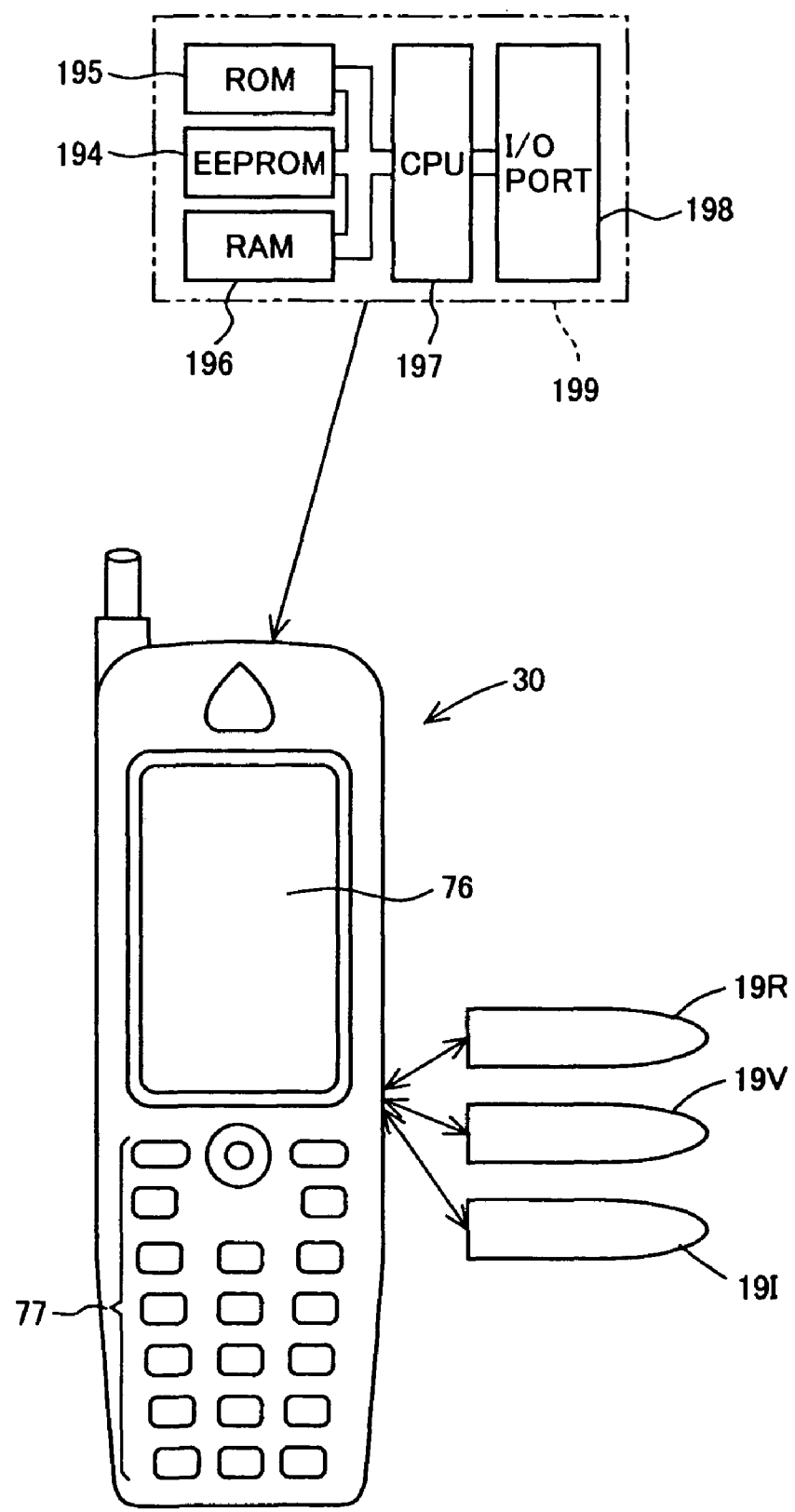
FIG. 9 is a front elevational view showing a browser phone as an exemplary user terminal.

FIG. 9 is a front elevational view showing the browser phone 30 as an exemplary terminal employed by the user. The browser phone 30 comprises a microcomputer 199. This microcomputer 199 comprises a CPU (Central Processing Unit) 197, an I/O port 198, a ROM 195, an EEPROM 194 and a RAM 196. This browser phone 30 comprises a USB (Universal Serial Bus) port, and is so constituted that an IC terminal 19R, 19V or 19I can be inserted in the USB port. The IC terminal 19R is an IC terminal for the R. The IC terminal 19V is an IC terminal for the VP. The IC terminal 19I, storing data and a program for the VP issued by the financial institution, is delivered to the user as described later, and it follows that the browser phone 30 stores the data and software stored in the IC terminal 19I when the delivered IC terminal 191I is inserted into the USB port of the browser phone 30.

Figure 10:
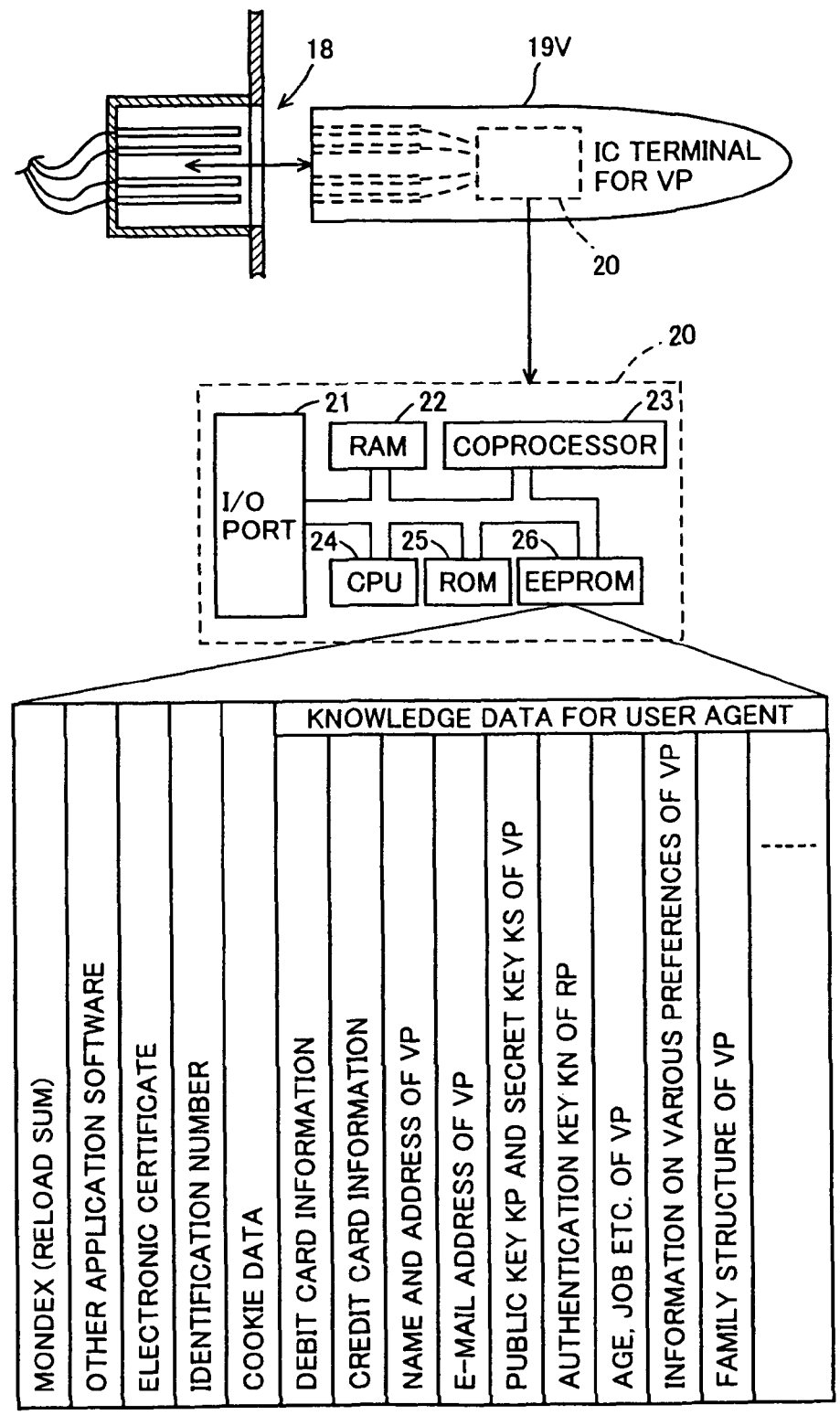
FIG. 10 is a block diagram showing the circuit of an IC terminal for a VP carried by a user and a diagram showing a breakdown of stored information.

FIG. 10 is an explanatory diagram for illustrating the IC terminal 19V for the VP. The IC terminal 19V for the VP is constituted to be attachable/detachable to/from a USB port 18 of the browser phone 30 as described above, so that information can be transferred/received to/from the browser phone 30 when inserted into the USB port 18, to be usable.

An LSI chip 20 is built in the IC terminal 19V for the VP. This LSI chip 20 is provided with a CPU 24 serving as a control center, a ROM 25 storing operation programs for the CPU 24, a RAM 22 serving as a work area of the CPU 24, an EEPROM 26 capable of electrically erasing stored data, a coprocessor 23, an I/O port 21 for inputting/outputting data from/to the exterior etc., which are connected with each other through a bus.

The EEPROM 26 stores Mondex (including reload sum data) which is a program for electronic money, other various application software, an electronic certificate issued for the VP, an identification number and cookie data.

Further, the IC terminal 19V for the VP has a function as the user agent for the VP, and stores various knowledge data such as debit card information, credit card information, the name and the address of the VP, the E-mail address of the VP, the public key KP and the secrete key KS of the VP, the authentication key KN of the RP, the age, the occupation etc. of the VP, various preference information of the VP, the family structure of the VP, . . . etc. as knowledge data for the user agent.

The IC terminal 19R for the RP also has a structure substantially similar to that of the IC terminal 19V for the VP shown in FIG. 10. As to the point of difference, the contents of knowledge data for the user agent recorded in an EEPROM 26 are different. More specifically, the EEPROM 26 stores the name and the address of the RP in place of the name and the address of the VP, the E-mail address of the RP in place of the E-mail address of the VP, the public key and the secret key of the RP in place of the public key and the secret key of the VP, the age, the occupation etc. of the RP in place of the age, the occupation etc. of the VP, various preference information of the RP in place of the various preference information of the VP, and the family structure of the RP in place of the family structure of the VP.

When the family of the RP corresponding to the VP creates VPs, the family structure of the VP is constituted by data such as the names, the addresses, the ages etc. of the created VPs. In other words, it follows that the storage area for the family structure of this VP stores data of the family of the VP corresponding to the family of the RP, i.e., a virtual family.

Figure 11:
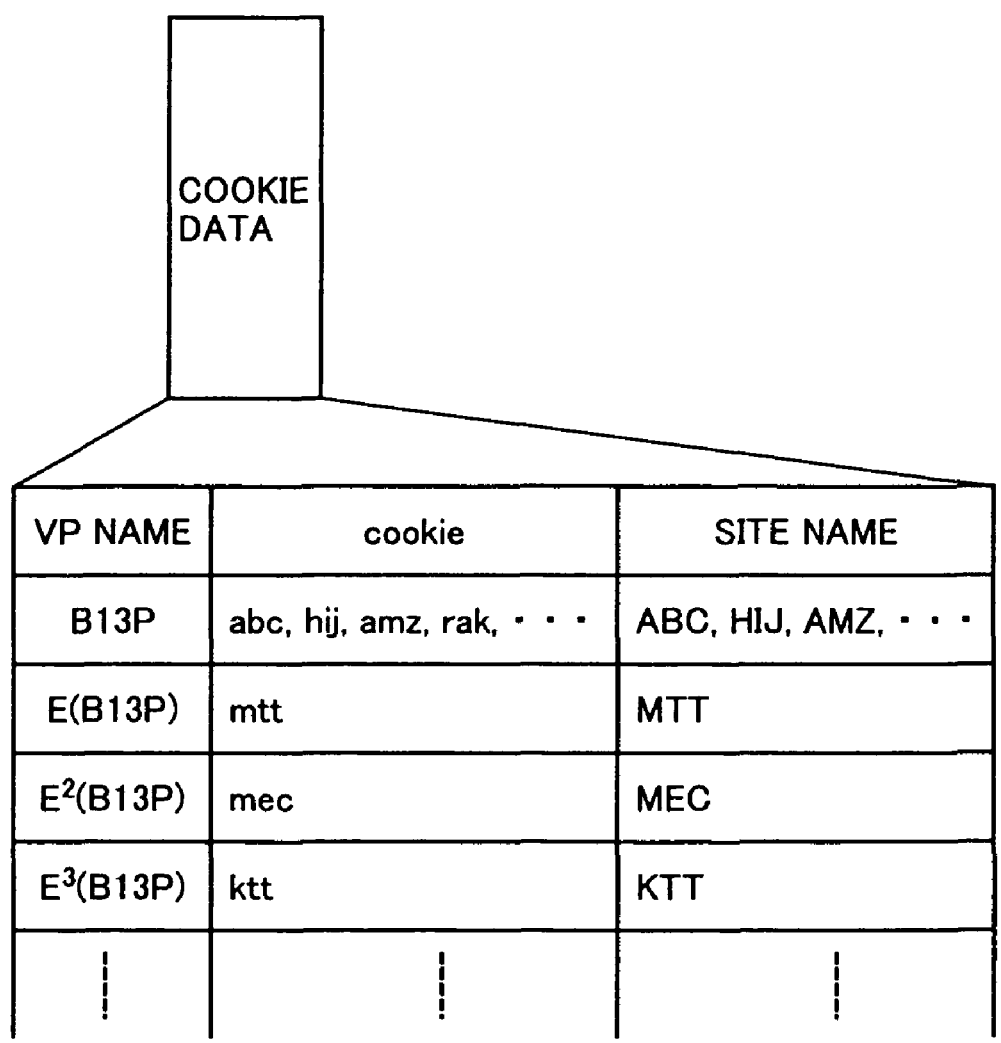
FIG. 11 is a diagram showing a breakdown of cookie data stored in a cookie data storage area of the IC terminal for the VP.

FIG. 11 is a diagram showing the details of the cookie data shown in FIG. 10. The storage area for the cookie data stores cookies sent from the sites (traders) accessed with the VP name every VP name. When the VP accesses a site with the real name B13P, he/she can access any site other than the sites already accessed with the trap type VP. Consequently, the storage area stores cookie data from a large number of sites only with respect to the real name B13P.

The EEPROMs 26 of the IC terminals 19V and 19R may store only the public keys KP, the secret keys KS, the authentication keys KN and the identification numbers so that all other information is stored in the XML store 50 and can be retrieved and utilized at need. Further, encryption or decoding with the public keys KP and the secret keys KS may be performed not by the IC terminals 19V and 19R themselves but by the browser phone 30 or a personal computer 30' described later. In this case, it is necessary to output the public keys KP and the secret keys KS to the browser phone 30 or the personal computer 30' described later.

FIG. 12 is a flow chart showing processing operations of the VP management server 9 shown in FIG. 3. The server determines whether or not a birth request for a VP has been received through a step S (hereinafter simply referred to as S) 1. When the customer (user) manipulates the browser phone 30 and makes a birth request for a VP, the server advances to S1a for performing proof processing for a legal institution. This proof processing is processing for proving that the financial institution 7 is a legal institution managing the VP, and processing for preventing others from illegal action of pretending to be the financial institution 7. This processing is described later with reference to FIG. 24B. Then, the server advances to S2 for transmitting a request for input of the name and the address of the RP to the browser phone 30. Then, the server advances to S3 for determining whether or not the name and the address of the RP have been sent back from the browser phone 30, and waits until the same are sent back.

When the RP who is the user inputs and transmits his/her name and address from the browser phone 30, the server makes a determination of YES through S3 and advances to S4, for performing processing of generating a random number R and transmitting the same to the browser phone 30 as challenge data. When the user makes a birth request for the VP, he/she inserts the IC terminal 19V for the VP into the USB port 18 of the browser phone 30. When the random number R is transmitted from the VP management server 9 in this state, he/she inputs the random number in the IC terminal 19V for the VP. Then, the IC terminal 19V for the VP performs processing of encrypting the input random number R with the authentication key KN of the RP therein and outputs the result of this encryption to the browser phone 30. The browser phone 30 transmits response data I which is the output encrypted data to the VP management server 9. Then, the server makes a determination of YES through S5 and advances to S6, for performing processing of decoding the received response data I, i.e., processing of calculating DKN (I), with the authentication key KN of the RP. Then, the server advances to S7, for determining whether or not the random number R generated through S4 is equal to DKN(I).

The control advances to S9 when the birth requestor for the VP is a normal RP stored in the database 12 of the financial institution 7 since R=DKN(I), while the control advances to S8 when another person pretends to be the RP stored in the database 12 and makes the birth request for the VP since R is not equal to DKN(I), for transmitting access rejection to the browser phone 30 and returning to S1.

When making a determination of YES through S7, on the other hand, the server advances to S9 for determining whether or not a desired convenience store has been input. If there is a particularly desired convenience store as to the convenience store providing the address for the born VP, the RP making the birth request for the VP inputs the same in the browser phone 30 and transmits the same to the VP management server 9. In this case, the server makes a determination of YES through S9, advances to S10, stores the information of the input convenience store and thereafter advances to S10. If no desired convenience store has been input, on the other hand, the server advances to S11, retrieves a convenience store near to the address of the RP, stores the convenience store and thereafter advances to S12.

At S12, the server decides the name of the VP, the address of the convenience store which is the address of the VP, the E-mail address of the VP etc. Then, the server advances to S13 for transmitting a transmission request for the public key of the VP to the browser phone 30. Then, the server advances to S14, determines whether or not the public key KP has been sent back, and waits until the same is sent back. The browser phone 30 receiving the transmission request for the public key of the VP outputs a public key output request to the connected IC terminal 19V for the VP. Then, the IC terminal 19V for the VP outputs the stored public key KP for the VP to the browser phone 30 as described later. The browser phone 30 sends back the output public key KP for the VP to the VP management server 9. Then, the server makes a determination of YES through S14 and advances to S15 for performing processing of storing the name, the address, the public key KP and the E-mail address of the VP in the database 12 in association with the RP.

Then, the server advances to S16, for performing processing of creating an electronic certificate for the VP and registering the same in the XML store 50. Then, the server advances to S17, for performing processing of sending the IC terminal 19I storing the name of the VP, the address of the convenience store, the name of the convenience store, the E-mail address and the electronic certificate to the RP. Then, the server advances to S18 for performing processing of transmitting the name and the E-mail address of the VP and the name of this financial institution 7 to the convenience store of the address decided at S12. Then, the server advances to S19 for performing proof processing for a legal institution. This proof processing for the legal institution is the same processing as the aforementioned one at S1a. Then, the server returns to S1.

In the present invention, "electronic certificate for a pseudonym" is a concept including a certificate issued by a prescribed institution (financial institution 7), having the duty of confidentiality, registering information capable of specifying the association between a user and a pseudonym (VP name) employed by this user for proving that the user employing said pseudonym is a user registered in this prescribed institution. Therefore, this is a concept including not only a general digital ID employed for person in question confirmation but also all electronic certificates with which said prescribed institution certifies that this user is a user registered in this prescribed institution with respect to the user employing said pseudonym. For example, this is a concept including a simple certificate to which only a digital signature by said prescribed institution is assigned with respect to the pseudonym employed by the user and a message indicating that the pseudonym is registered in said prescribed institution.

When making a determination of NO through S1, the server advances to S400 in FIG. 13A. The server performs private information registration processing at S400, then performs private information confirmation processing through S402, performs collation and circulation check processing for the private information through S403, performs sale alternation processing for the private information through S404, performs mail transfer and circulation check processing through S405, performs provision processing of an access history of another trap type VP through S406, performs reliability ranking information totalization and provision processing through S407, and returns to S1. The site (trader) provided with the private information from the user needs to confirm whether or not the contents of the provided private information are really correct. Therefore, the VP management server 9 of the financial institution 7 accepts the private information from the user, checks whether or not the private information is correct private information, and registers only correct private information in the database 12a. The server performs this processing through S400.

If the VP is frequently utilized on the network, on the other hand, there is an apprehension of such inconvenience that a trader collecting detailed private information of both the RP and the VP thoroughly matches the private information with each other, deduces the RP name and the VP name having matching private information and predicts the RP corresponding to the VP. When registering the private information in the database 12a, therefore, it is necessary to register the same while eliminating (or changing) private information such as the name of the user's place of employment, the name of his/her place of duty or his/her position, with which the RP can be specified. The server performs such processing through S400.

On the other hand, the user possessing the private information needs to monitor whether or not his/her private information is circulated with correct contents and correct the same to correct contents if erroneous. Therefore, the server performs private information confirmation processing through S402 so that the user can check trueness/falseness of his/her private information registered in the database 12b.

When the user limits the public range (circulation range) of his/her private information and provides the private information to the trader (site), he/she needs to monitor whether or not the public range (circulation range) is kept. The trader provided with the private information needs to confirm whether or not this private information is correct information as described above. Therefore, the server performs the processing of S403 so that the site (trader) can collate the possessed private information with the private information of the database 12a registering correct private information while it is possible to check the circulation tolerance for the collated private information possessed by the trader and check whether or not the same is correctly circulated.

The user needs to obtain some services or money as the compensation for the provision of the private information. Therefore, the server performs private information sale alternation through S404. The trap type VP sets his/her E-mail address at the address opened for the trap type VP in the financial institution 7 as described with reference to FIG. 4, and hence an E-mail addressed to the trap type VP is sent to the E-mal address opened for the trap type VP in the financial institution 7. Therefore, it is necessary to transfer the sent E-mail to the E-mail address of the corresponding VP. The server performs this processing through S405. At this time, the E-mail sent from the trader is addressed to the trap type VP, and hence the server also performs processing of deducing the site corresponding to the trap type VP (see FIG. 4), checking whether or not this is an E-mail from a site within the circulation tolerance for the private information of the trap type VP if this is not an E-mail from the deduced site and performing circulation check.

When using the name of the trap type VP every site, the user must perform traffic control for separately recording cookies from the site every name, as described with reference to FIG. 4. This is because, if the same cookies are attached in common over a plurality of trap type VPs, it is revealed that the plurality of trap type VPs are VPs of the same person.

When performing such traffic control, the trader (site) can collect access history information and article purchase history information as to a certain trap type VP but cannot collect an access history and article purchase history information when another trap type VP name is employed for the same VP. In other words, such inconvenience takes place that the trader (site) can collect only partial history information as to a certain VP.

Therefore, the server performs processing capable of providing the access history of another trap type VP when requested by the trader (site) through S406.

When the user provides his/her private information to the site (trader), he/she needs to confirm to what degree the trader is trustable or untrustable as to protection of privacy. Therefore, the server performs processing of totalizing reliability ranking information and providing the result of the totalization through S407.

FIG. 13B is a flow chart showing a subroutine program of the private information registration processing at S400. This private information registration processing is processing performed when the user registers the private information as the VP.

The browser phone 30 receiving the random number R encrypts the random number R once with the secret key for the VP stored in the IC terminal 19V for the VP connected to this browser phone 30 and generates response data I. The browser phone transmits the response data I to the VP management server 9 of the financial institution 7.

The server determines whether or not a registration request for the private information has been received from the user through S410, and terminates this subroutine program if no request has been received. If receiving the registration request, the server advances to S411 for performing legal institution proof processing. Then, the control advances to S412 for requesting input of the name of the VP, and determines whether or not the same has been input through S413. When the same is input, the control advances to S414 for performing processing of generating a random number R and transmitting the same to the user making the registration request as challenge data. The server advances to S415, determines whether or not the response data I has been received from the user, and waits until receiving the same. The server advances to S416 in a stage receiving the same, for performing processing of retrieving the public key KP of the VP from the database 12a and generating Dkp(I) by encrypting the received response data I with the public key KP.

Then, the control advances to S417 for determining whether or not the challenge data R and Dkp(I) are equal to each other. If the same are not equal to each other, it follows that no person in question authentication for the user could be performed, and the server advances to S422 for performing processing of registration rejection. When making a determination of YES through S417, the control advances to S418 for performing processing of issuing a request for input of private information desired to be registered to the user making the registration request. Then, the server advances to S419, determines whether or not the same has been input, and waits until the same is input. The control advances to S420 in a stage receiving the input, for checking trueness/falseness of the private information to be registered.

The server makes this trueness/falseness check by accessing the XML store 50 and making collation check when the private information of the corresponding user is registered, or by accessing the city office or the like included in the electronic administration group 49 and making collation check with private information registered therein, for example. If such collation check by mechanical retrieval is insufficient, an investigator of the financial institution 7 makes corroborative investigation for checking trueness/falseness.

Then, the control advances to S421 for determining whether or not the information is correct as a result of the trueness/falseness check for advancing to S422 and performing processing of registration rejection if the same is not correct while advancing to S423 for determining whether or not this is private information specifying the RP if the same is correct. If the private information of the VP to be registered includes private information such as the name of the user's place of employment, the name of his/her place of duty or his/her position, for example, with which the RP can be specified and the server registers the same as such, there is an apprehension that the third party predicts which VP corresponds to which RP from the registered information. The private information registered in this database 12a can be recognized by the site (trader) through S403 or S404. Consequently, there is an apprehension that the site (trader) predicts the association between the RP and the VP.

Therefore, the server determines whether or not this is private information specifying the RP through S423 for advancing to S425 if this is not predictable private information, while advancing to S424 if this is private information having the apprehension of prediction for performing processing of manipulating the private information and thereafter advancing to S425. The server manipulates the place of duty to "certain major electric maker" if the same is MEC, for example, or manipulates the position to "director", for example, when the same is a managing director, for example.

At S425, the server performs processing of assigning a digital signature of this final institution to the private information and registering the same every user name. Consequently, the database 12a registers the data shown in FIG. 5.

Figure 14:
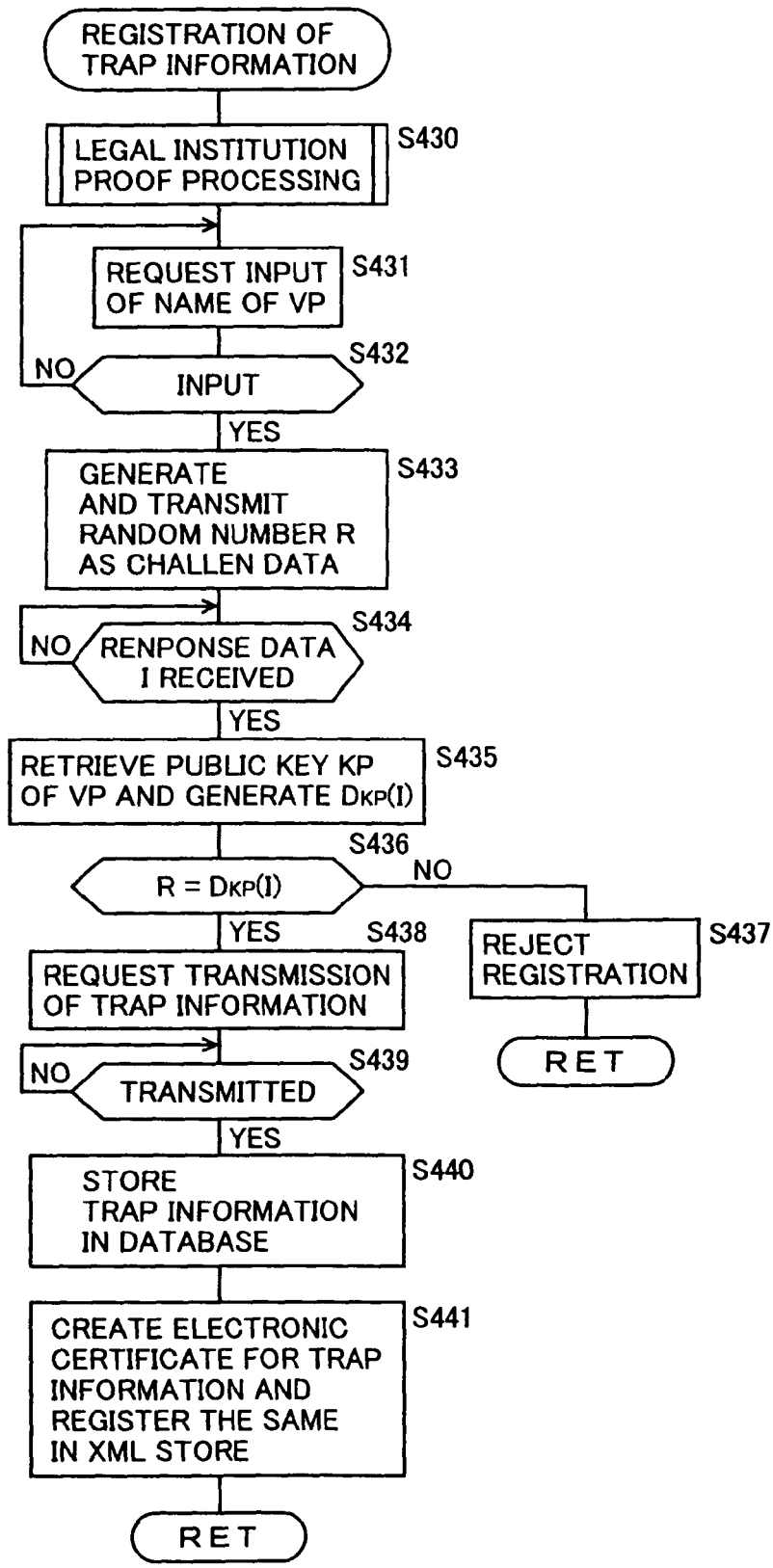
FIG. 14 is a flow chart showing a subroutine program of trap information registration processing.

FIG. 14 is a flow chart showing a subroutine program of the trap information registration processing shown in S401. The server performs legal institution proof processing through S430, and issues a request for input of the VP name to the VP making a registration request for trap information through S431. Then, the server advances to S432, determines whether or not the VP making the registration request has input his/her VP name and issues the request of S431 until he/she inputs the same. Then, the control advances to S433 for performing processing of generating a random number R and transmitting the same to the VP who is the registration requestor as challenge data. The server determines whether or not response data I has been received through S434.

The VP who is the registration requestor receiving the transmitted challenge data R encrypts the challenge data R with his/her secret key for generating the response data I and transmits the same to the VP management server 9 of the financial institution 7. Then, the control advances to S435 for performing processing of retrieving the public key KP of the VP making the registration request from the database 12a and decoding the received response data I with the public key KP. When the server determines whether or not the challenge data R is equal to Dkp(I) through S436 and the former is not equal to the latter, it means that the VP cannot be defined as the person in question as a result of authentication, and the server notifies registration rejection to the VP through S437. If the server makes a determination of YES through S436 and could confirm that the VP is the person in question as a result of authentication, on the other hand, the control advances to S438 for performing processing of transmitting a transmission request for trap information to the VP.

The server determines whether or not the VP has transmitted the trap information to be registered through S439, and waits until the same is transmitted. The control advances to S440 in a stage of transmission, for performing processing of storing the transmitted trap information in the database 12a. This trap information is stored in a storage area corresponding to the VP who is the registration requestor. Then, the control advances to S441 for performing such processing that the financial institution 7 generates an electronic signature for the trap information and registers an electronic certificate therefor in the XML store 50. Consequently, the database 72 of the XML store 50 stores the electronic certificate as described with reference to FIG. 7.

This electronic certificate may be stored in the IC terminal 19V of the VP making the registration request in place of storage in the XML store 50. However, the trap information varies with the Web site accessed by the VP as described above, and it consequently follows that the electronic certificate also varies with the Web site such that a problem of storage capacity arises if the IC terminal 19V stores a large number of electronic certificates. According to this embodiment, therefore, the XML store 50 registers the electronic certificates in order to overcome the problem of storage capacity. If the storage capacity of the IC terminal 19V is extremely large, the IC terminal 19V may store all or most of the electronic certificates issued by the financial institution 7.

Figure 15:
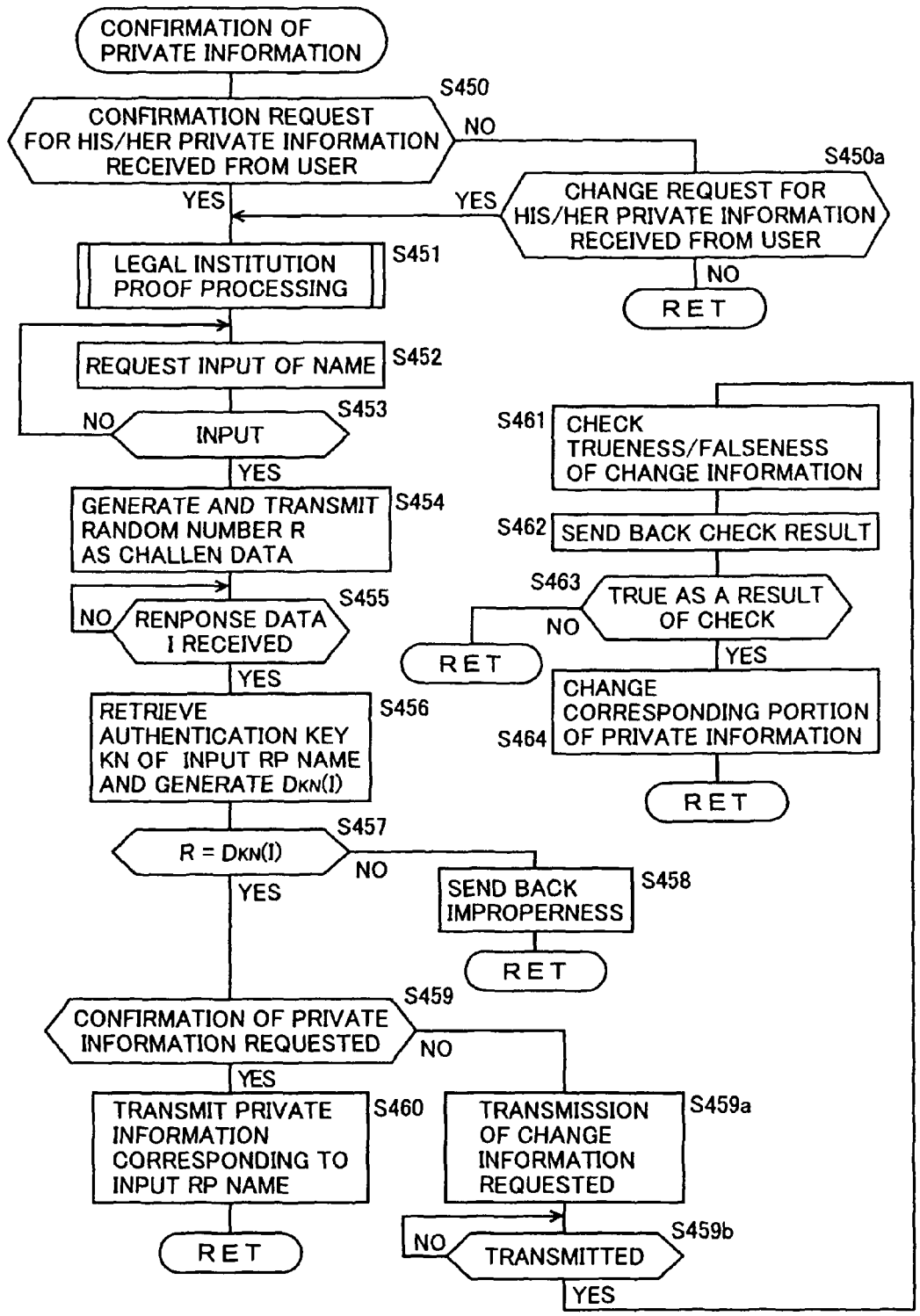
FIG. 15 is a flow chart showing a subroutine program of private information confirmation processing.

FIG. 15 is a flow chart showing a subroutine program of the private information confirmation processing shown in S402. When the user wishes to confirm his/her private information registered in the database 12a of the financial institution 7, the user transmits a confirmation request to the VP management server 9 of the financial institution 7 as the RP. When the confirmation request is transmitted, the server makes a determination of YES through S450 and performs person in question authentication processing similar to the aforementioned one through S451 to S458. A request for input of the name through S452 is an input request for the name of the RP of the user. When confirming that the user is the person in question as a result of person in question authentication, the server makes a determination of YES through S457 and the control advances to S459.

At S459, the server determines whether or not this has been a confirmation request for the private information. This subroutine program of the private information confirmation processing is so constituted as to be capable of coping also with a case where the user has made a change request for his/her private information. The server makes a determination of NO through S459 if this has been a change request for the private information from the user, while the server makes a determination of YES through S459 if this has been a confirmation request for the private information so that the control advances to S460 for performing processing of transmitting the private information corresponding to the input RP name to the user.

If the private information includes false private information or the private information has been changed due to change of occupation or house-moving, the user confirming the transmitted private information transmits a change request for his/her private information to the VP management server 9 of the financial institution 7. Then, the server makes a determination of YES through S450a and the control advances to S451 for performing authentication processing of S451 to S458. When confirming that this is the person in question as a result of authentication, the server makes a determination of YES through S457 and advances to S459 for determining whether or not this has been the confirmation request for the private information. In this case, this is the change request for the private information and hence the control advances to S459a for issuing a transmission request for the private information to be changed (change information) to the user.

The user transmits change information on how he/she wishes to change which portion in his/her private information to the VP management server 9 of the financial institution 7. Then, the server makes a determination of YES through S459b and performs trueness/falseness check as to whether or not the transmitted change information is correct. Then, the server performs processing of sending back the result of the check to the user through S462. Then, the server determines whether or not this is correct as a result of the check for terminating this subroutine program as such without changing the private information if the same is not correct while advancing to S464 for performing processing of changing the corresponding portion of the private information in the database 12a if the same is correct.

Figure 16:
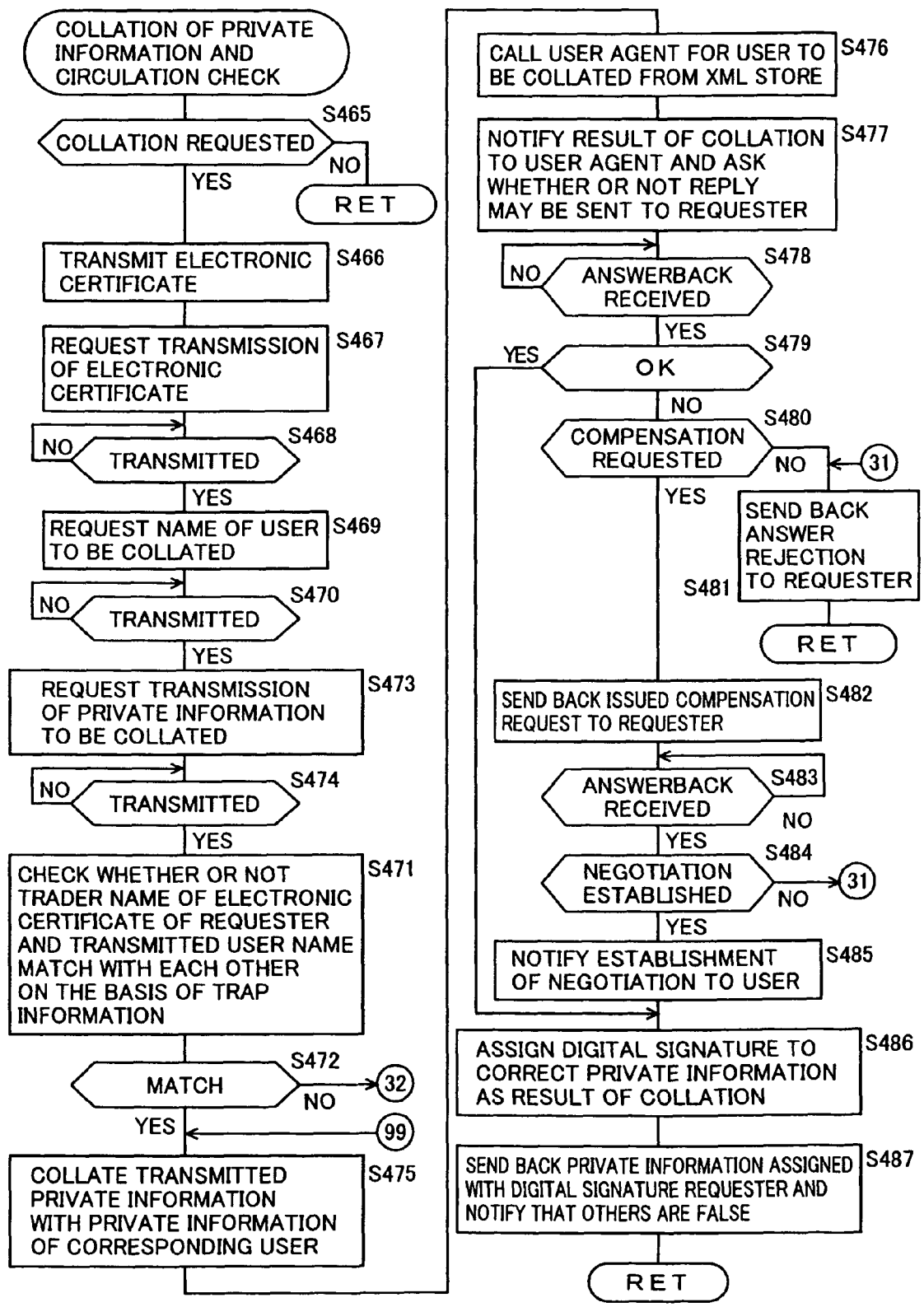
FIG. 16 is a flow chart showing a subroutine program of private information collation and circulation check.

FIG. 16 is a flow chart showing a subroutine program of the private information collation and circulation check processing shown in S403. The server determines whether or not a collation request has been received through S465. When the Web site collects private information such as the address, the name, the age, the sex, the annual income, preference information etc. of an accessing user, for example, this subroutine program enables the financial institution 7 to collate whether or not the private information is really correct private information. When receiving a collation request from such a site (trader), the control advances to S466 for transmitting an electronic certificate of the financial institution 7 to the site (trader) and performing processing of requesting transmission of an electronic certificate of the site (trader) through S467. If the trader transmits its electronic certificate, the server makes a determination of YES through S468 and the control advances to S469 for performing processing of requesting the name of the user to be collated to the collation requester. When the site (trader) which is the collation requester transmits the name of the user to be collated, the control advances to S473 for sending a transmission request for the private information to be collated to the requester. When the requester transmits the private information to be collated to the financial institution 7, the control advances to S471.

At S471, the server performs processing of checking whether or not the trader name (site name) of the transmitted electronic certificate of the requester and the transmitted user name to be collated match with each other on the basis of the trap information. The trader name (site name) of the requester is described in the electronic certificate of the requester. As described with reference to FIG. 4, the VP may use the real name of the VP or may use the trap type VP when accessing the Web site. In other words, the VP varies the name with every accessed site. Therefore, when receiving a collation request for private information from MTT in FIG. 4, for example, the user name received through S470 must be originally E(B13P). Thus, the server determines whether or not the site name and the VP name employed therefor match with each other through S472 for advancing to S473 if the former matches with the latter while advancing to S494 of FIG. 17 if the former does not match with the latter.

At S494, the server performs processing of retrieving the corresponding private information in the XML store and checking whether or not the requester is included in the circulation tolerance set in the privacy policy. If the trader name (site name) and the user name do not match with each other, the server must not immediately determine that the private information has been illegally circulated but such a case is conceivable that the VP allows the site to circulate (disclose) his/her private information to another trader within certain constant circulation tolerance when he/she provides the private information to the site. This circulation tolerance is described in the privacy policy prepared by the site. Therefore, the server retrieves the corresponding private information in the XML store through S494 and checks whether or not the requester is included in the circulation tolerance set in the privacy policy stored therein. For example, this is transferred from the requester MTT, the user name is B13P (see FIG. 4), and it is possible to deduce the site name ABC corresponding thereto from the user name.

The server makes retrieval in the database 72 of the XML store 50 on the basis of the deduced site name ABC, and retrieves the "policy" stored following the site name ABC (see FIG. 7). This privacy policy has been presented by the Web site ABC to the user when collecting the private information, and the circulation tolerance for the collected private information is described in this privacy policy. The server checks whether or not MTT which is the collation requester is included in this circulation tolerance through S494. The server makes a determination of YES through S494a and advances to S475 if the same is included, while it follows that the private information has been illegally circulated if the same is not included, and the server performs processing following S495.

At S495, the server performs processing of adding/updating the value of illegally obtained private information by "1" in association with the requester name. In the aforementioned example, the fact that the requester MTT has transmitted the VP name B13P means that the same has illegally obtained the private information of the VP name B13P from the site (trader) ABC. Therefore, the server performs processing of adding/updating the value of the illegally obtained private information by "1" through S495. This value of the illegally obtained private information is stored in the database 12b (see FIG. 6).

Then, the control advances to S496, for performing processing of deducing the site name (trader name) corresponding to the transmitted user name and adding/updating the value of illegally distributed private information by "1" in association with the site name (trader name). In the aforementioned example, the server deduces the site name (trader name) ABC corresponding to the transmitted user name B13P and adds/updates the value of illegally distributed private information by "1" in association with the site name (trader name) ABC. In other words, the site (trader) ABC has illegally distributed the private information of the VP name B13P to MTT, and hence the server adds/updates the value of illegally distributed private information "1". This value of illegally distributed private information is also stored in the database 12b (see FIG. 6).

Then, the control advances to S497, for performing processing of notifying that the private information has been illegally handled and detailed data thereof to the corresponding user.

If the trader name described in the electronic certificate of the requester and the transmitted user name match with each other, on the other hand, the control advances to S475 for performing processing of collating the private information transmitted from the requester with the private information (see FIG. 5) of the corresponding user in the database 12a. Then, the server performs processing of calling the user agent for the user to be collated from the XML store through S476. Then, the server performs processing of notifying the result of the collation to the user agent and asking whether or not the same can be sent back to the requester through S477. The control advances to S476 if receiving an answerback from the user agent, and the control advances to S486 if this is an answerback stating that the result can be sent back to the requester for performing processing of assigning a digital signature to the correct private information as the result of the collation. This digital signature expresses that the financial institution 7 has confirmed that this is correct private information. Then, the server performs processing of sending back the private information assigned with the digital signature to the requester and notifying that others are false to the requester through S487. If the database 12a includes no private information of the user corresponding to the private information transmitted from the requester, collation is impossible and hence the server sends back the impossibility of collation to the requester on the basis of the private information which could not be collated.

When the result of the answerback from the user agent has not been OK, on the other hand, the control advances to S480 for determining whether or not an answerback having contents requesting compensation to the requester (trader) as the condition for the answerback to the requester has been received from the user agent. The user agent makes three types of answerbacks, i.e., an answerback of OK, an answerback requesting compensation and an answerback rejecting an answerback to the requester. If this is the answerback rejecting an answerback to the requester, the control advances to S481 for performing processing of sending back answer rejection to the requester.

If this is the answerback requesting compensation, the control advances to S482 for performing processing of sending back the issued compensation request to the requester. Then, the server determines whether or not an answerback from the requester has been received through S483, and waits until receiving the answerback. The server determines whether or not negotiation has been established through S484 in a stage receiving the answerback. If no negotiation is established, the control advances to S481 for performing processing of sending back answer rejection to the requester. If determining that negotiation has been established, the server advances to S485 for performing processing of notifying that the negotiation has been established to the user. At the same time, the VP management server 9 of the final institution 7 stores the contents of compensation decided by the negotiation. Then, the control advances to S486.

FIG. 17B is a flow chart showing a subroutine program of the sale alternation processing for the private information shown in S404. The server determines whether or not a purchase request for the private information has been received through S498. If the trader sends the purchase request for the private information to the VP management server 9 of the financial institution 7, the control advances to S499 for performing processing of transmitting an electronic certificate of the financial institution 7 to the purchase requester. Then, the server performs processing of requesting the purchase requester to transmit an electronic certificate of the purchase requester through S500. If the purchase requester transmits the electronic certificate, the control advances to S502 for performing processing of requesting the user name to be purchased to the purchase requester. If the purchase requester transmits the user name to be purchased, the control advances to S504 for performing processing of calling the user agent of the transmitted user name from the XML store 50.

Then, the server performs processing of letting the user agent and the purchase requester directly negotiate with each other through S505. This negotiation is negotiation as to whether or not the private information may be provided to the purchase requester, what degree of compensation is requested in provision, whether the contents of compensation include payment of money or provision of services, etc. The server determines whether or not the negotiation has been established through S506, and performs processing of sending back sale rejection to the requester (purchase requester) through S507 if the same has not been established. When determining that the negotiation is established, the control advances to S508 for performing processing of assigning digital signatures of the respective ones of the user, the requester (purchase requester) and the financial institution 7 to the privacy policy including the user name, the purchase requester name, sale conditions such as compensation and the disclosure tolerance (circulation tolerance) for the private information and storing the same. Then, the server performs processing of assigning the digital signature of the financial institution 7 deciding sale and returning the same to the requester through S509.

As to the private information stored in the database 12a of the final institution 7, the final institution has made trueness/falseness check for storing only correct private information, and when providing the correct private information to the trader or providing a result of collation with the correct private information to the trader, the server assigns the digital signature of the financial institution 7 through S486 or S509. Therefore, it is quite obviously understood that private information assigned with no digital signature of the financial institution 7 is private information having a possibility of errors and private information assigned with the digital signature of the financial institution 7 is correct private information in the private information possessed by the trader.

FIG. 18 is a flow chart showing a subroutine program of the mail transfer and circulation check shown in S405. The server determines whether or not the site (trader) has sent a mail through S541. As described with reference to FIG. 4 etc., the server notifies the E-mail address of the VP him/herself to the site when the VP accesses the site with his/her real name, while providing the E-mal address opened for the trap type VP in the financial institution 7 to the site when he/she accesses the site with the trap type VP name. Consequently, it follows that the E-mail from the site is sent with the E-mail address opened for the trap type VP in the financial institution 7.

If there is a mail transmitted to the E-mail address opened for the trap type VP in the financial institution 7, the VP management server 9 makes a determination of YES through S514. Consequently, the control advances to S515 for performing processing of deducing the site name (trader name) corresponding to the addressee included in the received E-mail from the database 12a. The database 12a stores the name of the VP and the name of the site accessed by the VP in association with each other, as described with reference to FIG. 4. Through this association, the server performs the processing of deducing the corresponding site name (trader name) from the addressee of the mail.

Then, the server determines whether or not the deduced site name and the name of the site sending the E-mail match with each other through S516. While the former and the latter must originally match with each other, a site illegally obtaining illegally circulated private information may send an E-mail to the possessor of private information if the private information is illegally circulated. In this case, the deduced site name and the name of the site sending the mail do not match with each other.

When the deduced site name and the name of the site sending the mail do not match with each other, the server cannot immediately conclude that the private information has been illegally circulated. The site may have approval from the user who is the possessor of the private information as to that the private information may be circulated within certain constant circulation tolerance when providing the private information to the site. Therefore, the control advances to S522 similarly to the description with reference to S494 and S494a in FIG. 17 for performing processing of retrieving the corresponding private information in the XML store and checking whether or not the E-mail sender is included in the circulation tolerance set in the policy so that the control advances to S517 when determining that the same is included through S523 while the control advances to S519 when determining that the same is not included.

The server performs processing of adding/updating the value of illegally obtained private information by "1" in association with the name of the site sending the E-mail at S519, and performs processing of adding/updating the value of illegally distributed private information by "1" in association with the site name deduced through S515 through S520. Then, the server performs processing of notifying that the private information has been illegally handled and the detailed data thereof to the corresponding user through S521.

When determining that the private information has not been illegally circulated, on the other hand, the control advances to S517 for performing processing of deducing the mail address of the user corresponding to the addressee of the E-mail, and performs processing of transferring an E-mail to the deduced address through S518.

Figure 19:
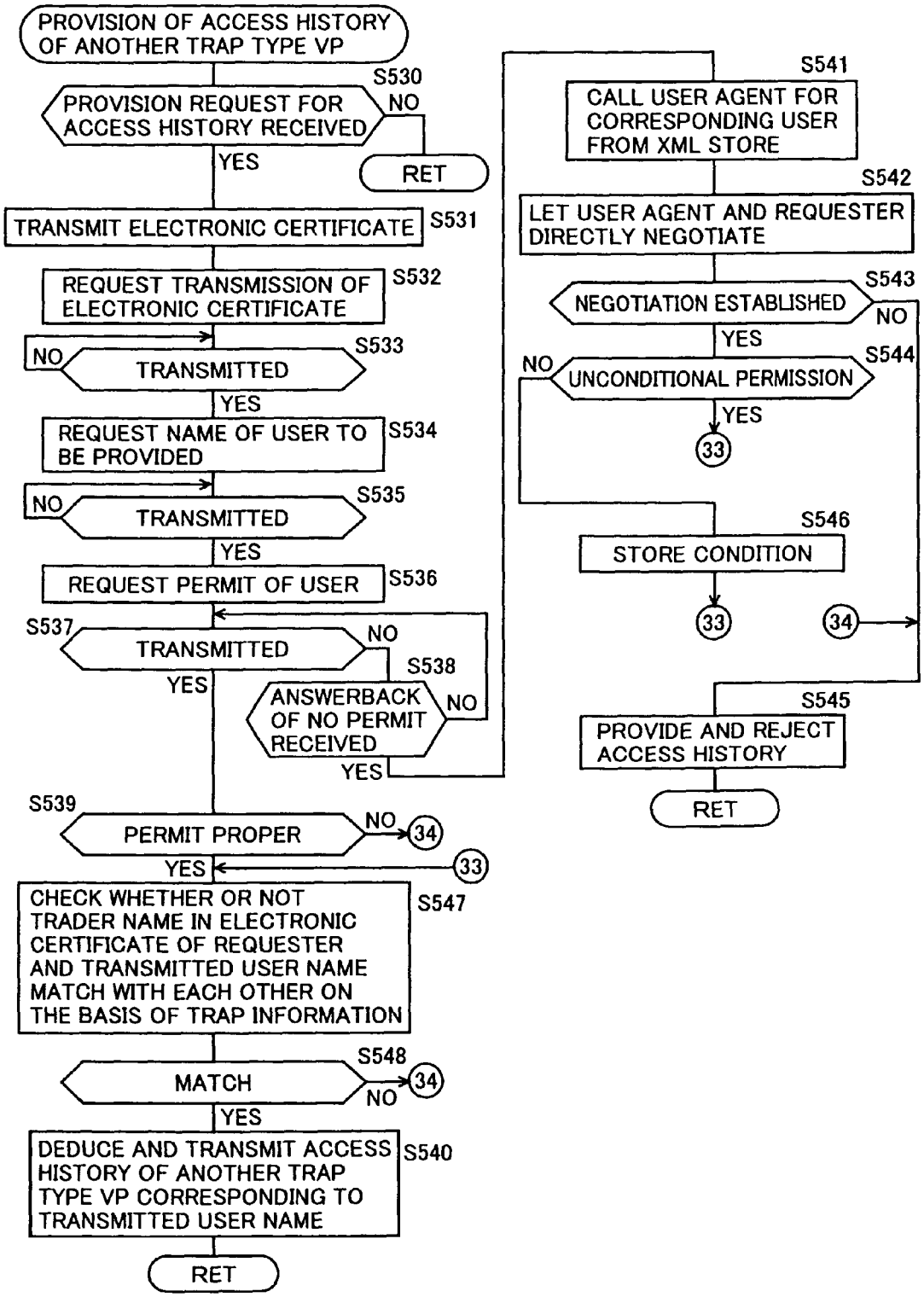
FIG. 19 is a flow chart showing a subroutine program of processing of providing an access history of another trap type VP.

FIG. 19 is a flow chart showing a subroutine program of the processing of providing the access history of another trap type VP shown in S406. When the VP accesses the site as the trap type VP, the IC terminal 19V stores the VP in correspondence to only the trap type VP as to coolies sent from the site, as described above (see FIG. 11). Therefore, the site accessed as the trap type VP can collect only the access history and a purchase history of the trap type VP alone, and cannot collect an action history (access history etc.) of the trap type VP acting on the network as another trap type VP or with the real name of the VP. If the financial institution 7 receives a request for provision of data of an action history on the network such as the access history of another trap type VP (including a VP employing his/her real name) from the site in this case, the server makes a determination of YES through S530 and the control advances to S531 for performing processing of transmitting an electronic certificate of the financial institution 7.

Then, the server performs processing of requesting the requester to transmit an electronic certificate of the requester through S532. The server makes a determination of YES through S533 in a stage when the requester transmits the electronic certificate, and the control advances to S534 for performing processing of requesting the name of the user to be provided to the requester. Then, the server advances to S535 for determining whether or not the name of the user has been transmitted from the requester, and advances to S536 when the same has been transmitted for performing processing of requesting the requester to transmit a permit of the user. When accessing the site and providing the private information as the trap type VP, the user may make an approval of provision of action history data on the network such as the access history of another trap type VP (including the VP employing his/her real name).

In other words, referring to FIG. 4, the VP may approve that he/she may also provide action history data on the network such as an access history of the VP in which E(B13), who is another trap type VP, has employed the real name B13P to the site MEC when he/she accesses the site MEC and provides his/her private information as E2(B13P) who is a trap type VP, for example. In this case, the user transmits an electronic permit therefor to the site. A digital signature of the user is assigned to this permit. If the site transmits the permit in response to the request through S536, the server makes a determination of YES through S537, and determines whether or not the permit is proper through S539. The server transmits a notification rejecting provision of the access history to the requester through S545 if the permit is improper, while the server performs processing of deducing action history data on the network such as an access history of another trap type VP (including the VP employing his/her real name) corresponding to the transmitted user name and transmitting the same to the requester through S540 if the permit is proper.

On the other hand, the site which is the requestor transmits an answerback of no permit to the financial institution 7 when the same has no permit of the user. Then, the server makes a determination of YES through S538 and the control advances to S541 for performing processing of calling the user agent for this user from the XML store 50, and performs processing of letting the user agent and the site which is the requestor directly negotiate with each other through S542.

Then, the server determines whether or not negotiation has been established through S543. If no negotiation has been established, the server transmits a notification for rejecting provision of the access history to the requester through S545. If negotiation has been established, on the other hand, the control advances to S544 for determining whether or not the user possessing the private information has made unconditional approval. If he/she has made unconditional approval, the control advances to S540 for performing processing of transmitting the action history data such as the access history to the requester. If the user has made conditional approval, on the other hand, the control advances to S546 for performing processing of storing the conditions therefor and thereafter advances to S540. When storing the conditions through S546, the server stores the names of the user and the requester who are the parties concerned, the decided conditions and the privacy policy of the requester including the disclosure tolerance (circulation tolerance) for the private information while assigning digital signatures of the parties concerned and the financial institution 7 thereto respectively.

Figure 20:
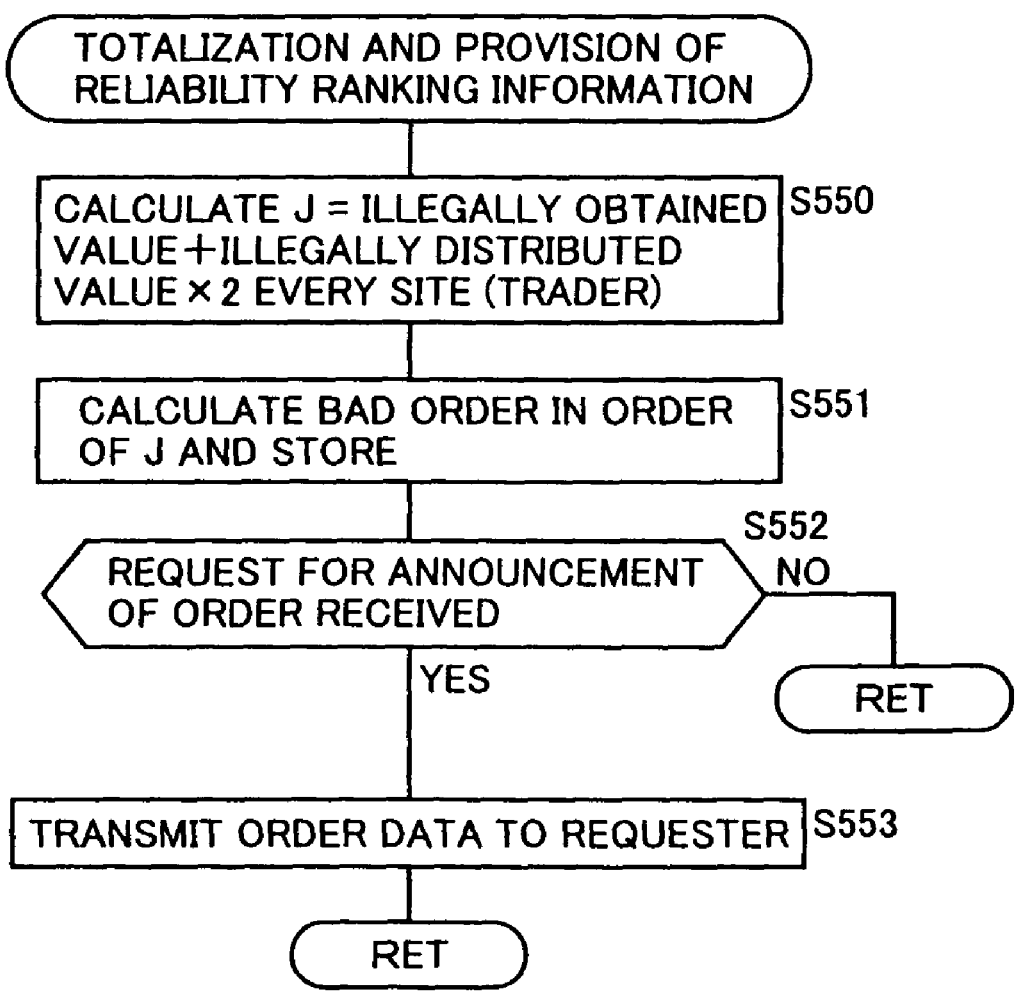
FIG. 20 is a flow chart showing a subroutine program of processing of totalizing and providing reliability ranking information.

FIG. 20 is a flow chart showing a subroutine program of the reliability ranking information totalization and provision processing shown in S407. This subroutine program is employed by the VP management server 9 for operating on the basis of the data stored in the database 12b. The server performs processing of calculating J=value of illegally obtained private information+value of illegally distributed private information×2 every site (trader) through S550. The server performs×2 since those illegally distributing (circulating) private information are more pernicious and punishable than those illegally obtaining the private information.

Then, the server performs processing of calculating bad order along the order of calculated J and storing the same in the database 12b every site (trader) through S551. Then, the server determines whether or not a request for announcement of the order has been received through S552. When the user possessing the private information, the trader or the like has sent a request for announcement of the order to the VP management server 9 of the financial institution 7, the control advances to S553 for performing processing of transmitting order data to the requester.

Figure 21:
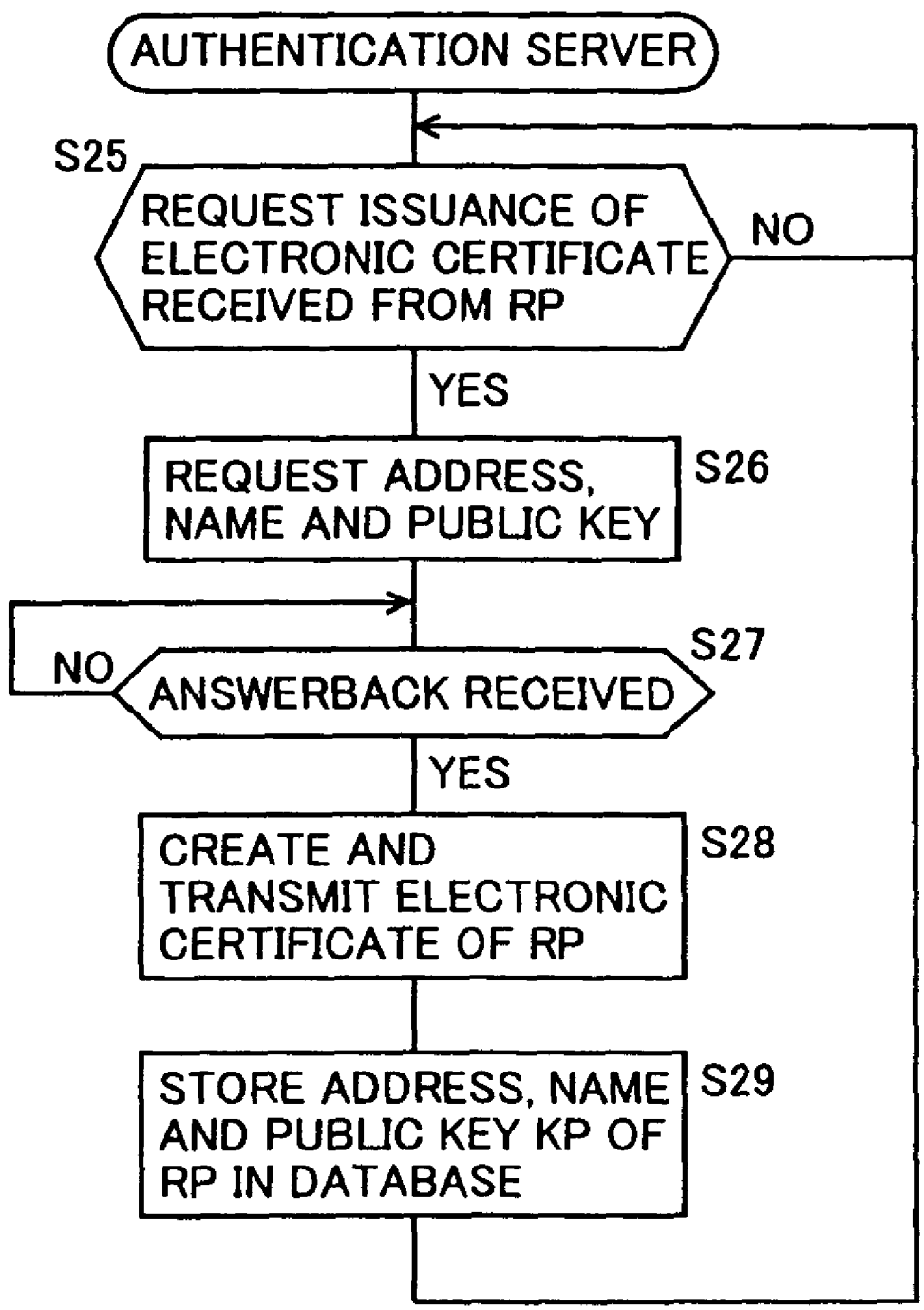
FIG. 21 is a flow chart showing processing operations of an authentication server.

FIG. 21 is a flow chart showing processing operations of the authentication server 11 shown in FIG. 3. First, the server determines whether or not a request for issuance of an electronic certificate has been received from the RP through S25, and waits until receiving the request. When the RP who is the user transmits a request for issuance of the electronic certificate for the RP from the browser phone 30 to the authentication server 11, the control advances to S26 for performing processing of transmitting a request for transmission of the address, the name and the public key of the RP to the browser phone 30. Then, the server advances to S27 for determining whether or not the address, the name and the public key of the RP are sent back from the browser phone 30, and waits until the same are sent back. The control advances to S28 in a stage receiving the same, for performing processing of creating the electronic certificate for the RP and transmitting the same to the browser phone 30. Then, the server advances to S29 for performing processing of storing the address, the name and the public key KP of the RP in the database 12b and returns to S25.

Figure 22:
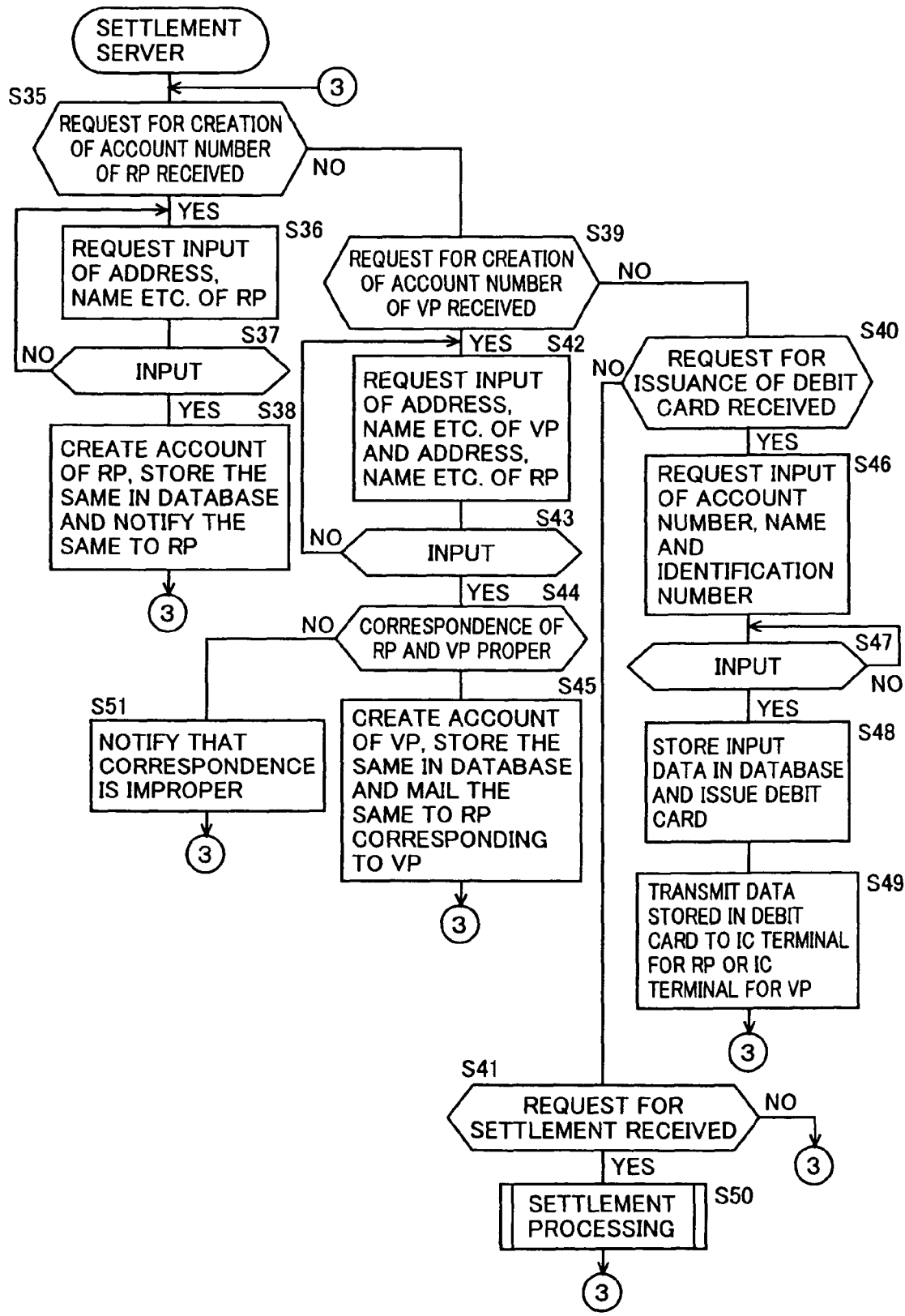
FIG. 22 is a flow chart showing processing operations of a settlement server.
Figure 23:
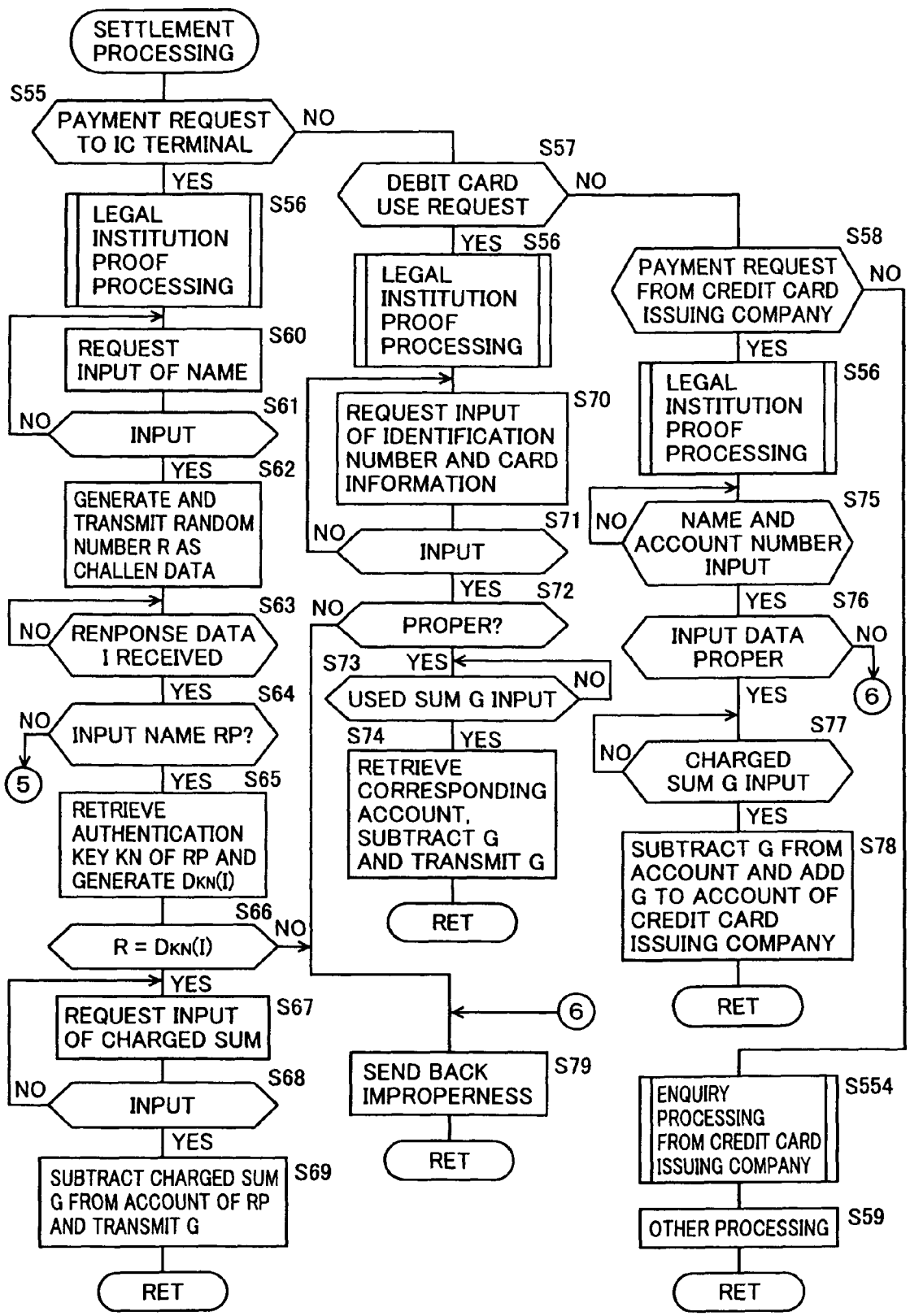
FIG. 23 is a flow chart showing a subroutine program of settlement processing.
Figure 24A:
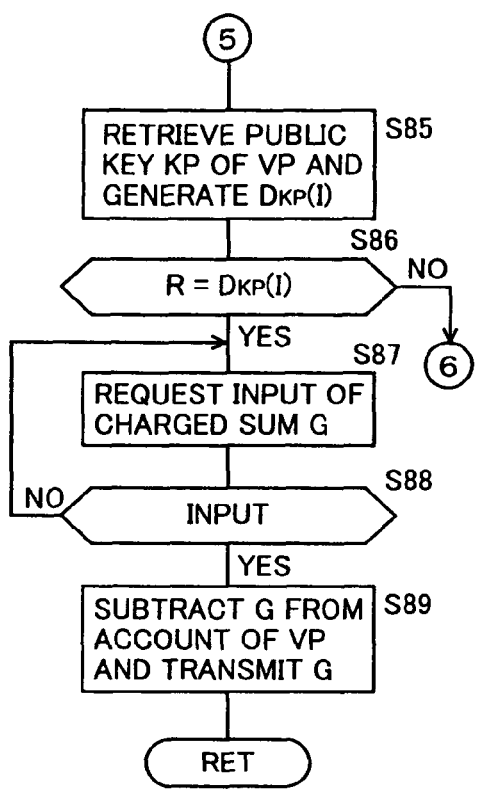
FIG. 24A shows part of the subroutine of settlement processing.

FIGS. 22 to 24 are flow charts showing processing operations of the settlement server 10 shown in FIG. 3. The server determines whether or not a request for creation of a bank account number of the RP has been received, advances to S39 if no request has been received for determining whether or not a request for creation of a bank account number of the VP has been received, advances to S40 if no request has been received for determining whether or not a request for issuance of a debit card has been received, advances to S40 if no request has been received for determining whether or not a settlement request has been received, and returns to S35 if no request has been received.

When the user goes to the financial institution 7 and makes a request for opening the bank account of the RP so that a request for creation of the bank account number of the RP is input in the process of the cycle of this loop of S35 to S41, the control advances to S36 for requesting input of the address, the name etc. of the RP, the control advances to S38 if the same are input for performing processing of creating the bank account of the RP and storing the same in the database 12a while notifying the same to the RP, and returns to S35.

If the user goes to the financial institution 7 and makes a request for opening the bank account of the VP so that a request for creation of the bank account number of the VP is input, the server advances to S42 for requesting input of the address, the name etc. of the VP and the address, the name etc. of the RP. The user manually inputs the information from a keyboard, or connects the IC terminal 19R for the RP or the IC terminal 19V for the VP to the settlement server 10 for automatically inputting these data. When the data are input, the control advances to S44 for confirming whether or not the correspondence between the RP and the VP is proper by making retrieval in the database 12a.

If the correspondence between the RP and the VP is not proper, the server advances to S51 for notifying that the correspondence is improper and returns to S35. If the correspondence between the RP and the VP is proper, on the other hand, the server advances to S45 for performing processing of creating the bank account of the VP and storing the same in the database 12a while sending the bank account to the RP corresponding to the VP and thereafter returns to S35.

When the user goes to the financial institution 7 and makes a request for issuance of a debit card so that a request for issuance of the debit card is input, the server makes a determination of YES through S40 and advances to S46 for making a request for input of the account number, the name and an identification number. When the user requests issuance of a debit card for the RP, he/she inputs the bank account number, the name and the identification number of the RP. When the user desires a request for issuance of a debit card for the VP, on the other hand, he/she inputs the bank account number of the VP, the name of the VP and the identification number of the VP. The user connects the IC terminal 19R for the RP or the IC terminal 19V for the VP to the settlement server 10 for automatically inputting these data.

When these data are input, the control advances to S48 for performing processing of storing the input data in the database 12a and issuing the debit card. Then, the server advances to S49 for performing processing of transmitting data storing the issued debit card to the IC terminal for the RP or the IC terminal for the VP and returns to S35.

If a settlement request is transmitted to the settlement server 10, the server makes a determination of YES through S41, advances to S50, performs settlement processing and thereafter returns to S35.

FIG. 23 is a flow chart showing a subroutine program of the settlement processing at S50 shown in FIG. 22. The settlement request includes a remittance request for partially remitting funds in the bank account to the IC terminal 19R for the RP or the IC terminal 19V for the VP, a request for settlement with the debit card, and a payment request for a credited sum from the credit card issuing company in a case of settling accounts with the credit card. First, the server determines whether or not a request for remittance to the IC terminal 19R or 19V has been received through S55, advances to S57 if no request has been received for determining whether or not a request for settlement with the debit card has been received, advances to S58 if no request has been received for determining whether or not a payment request has been received from the credit card issuing company, advances to S554 if no request has been received for performing enquiry processing from the credit card issuing company, and thereafter performs other processing through S59 for terminating this subroutine program.

When the user transmits a request for partially remitting the funds to the IC terminal 19R for the RP or the IC terminal 19V for the VP from the browser phone 30 or the like to the settlement server 10, the server makes a determination of YES through S55, advances to S56 for performing legal institution proof processing and thereafter advances to S60. At S60, the server performs processing of transmitting a request for input of the name to the browser phone 30 or the like. The browser phone 30 receiving this request transmits an output request for the name to the connected IC terminal 19R or 19V. Then, the connected IC terminal 19R or 19V transmits the name to the browser phone 30, and the browser phone 30 transmits the transmitted name to the settlement server 10. Then, the server makes a determination of YES through S61 and advances to S62 for performing processing of generating a random number R and transmitting the same to the browser phone 30 as challenge data.

The browser phone 30 receiving the random number R transmits the random number R to the connected IC terminal 19R or 19V, as described later. If the IC terminal receiving the random number R is the IC terminal 19R for the RP, the IC terminal encrypts R with the stored authentication key KN for generating response data I and outputs the same to the browser phone 30. The browser phone 30 transmits the output response data I to the settlement server 10. If the IC terminal receiving the random number R is the IC terminal 19V for the VP, on the other hand, the IC terminal encrypts the received random number R with the stored public key KP for generating response data I and outputs the same to the browser phone 30. The browser phone 30 transmits the output response data I to the settlement server 10.

When the response data I is transmitted, the server makes a determination of YES through S63, advances to S64 for determining whether or not the name input in response to S60 is that of the RP and advances to S65 if the name belongs to the RP for performing processing of retrieving the authentication key KN of the RP from the database 12 and decoding the received response data I with the authentication key KN, i.e., processing of generating DKN(I). Then, the server advances to S66 for determining whether or not R is equal to DKN(I). While R must be equal to DKN(I) if the user making the request for remittance to the IC terminal is a proper user registered in the database 12, R mismatches with DKN(I) if such illegal action has been taken that a person pretends to be the user registered in the database 12 to partially remit the funds of the bank account. In this case, the control advances to S79 for performing processing of sending back improperness to the browser phone 30 and terminates the subroutine program.

If R is equal to DKN(I), on the other hand, the control advances to S67 for performing processing of transmitting an input request for the charged sum to the browser phone 30, and the control advances to S69 when the browser phone 30 transmits the charged sum for performing processing of subtracting the charged sum G from the account of the RP and transmitting G to the browser phone 30 and terminates the subroutine program.

When the user makes remittance to the IC terminal 19V for the VP as the VP, he/she employs the real name of the VP. If the input name is the real name of the VP, the server makes a determination of NO through S64 so that the control advances to S85 of FIG. 9. At S85, the server performs processing of retrieving the public key KP of the VP from the database 12 and decoding the received response data I with the public key KP, i.e., processing of generating DKP(I). Then, the server advances to S86 for determining whether or not R is equal to DKP(I). If the person making the remittance request takes illegal action of pretending to be the VP registered in the database 12 and making remittance, it follows that the server makes a determination of NO through S86 and advances to S79 for sending back improperness to the browser phone 30. If making a determination of YES through S86, on the other hand, the server advances to S87 for performing processing of transmitting an input request for the charged sum G to the browser phone 30, advances to S89 if the browser phone 30 transmits the charged sum G for performing processing of subtracting G from the bank account of the VP and transmitting G to the browser phone 30 and thereafter terminates the subroutine program.

When the user performs a debit card use operation in order to settle accounts with the debit card, he/she transmits a debit card use request to the settlement server 10, which in turn makes a determination of YES through S57 and advances to S56 for performing legal institution proof processing. Then, the server advances to S70 for transmitting a request for input of the identification number and card information to the browser phone 30 of the user. If the browser phone 30 transmits the identification number of the debit card and the debit card information to the settlement server 10, the control advances to S72 for determining whether or not the transmitted data are proper, and advances to S79 if the same are improper.

If the data are proper, on the other hand, the server advances to S73 and waits for input of a used sum G. When the user inputs the used sum G and the same is transmitted to the settlement server 10, the control advances to S74 for performing processing of retrieving the corresponding account and subtracting G while transmitting G to the browser phone 30 of the user.

If the user settles accounts according to SET with the credit card with the real name of the RP or the VP as described later, the credit card issuing company 4 (see FIGS. 1 and 15) transmits a payment request for the credit sum to the settlement server 10. If the payment request is transmitted, the server makes a determination of YES through S58 for performing legal institution proof processing of S56 and thereafter advances to S75 for waiting for input of the name and the account number of the user. When the credit card issuing company 4 transmits the name and the account number of the user, the control advances to S76 for determining whether or not the input data are proper by making retrieval in the database 12. The server advances to S79 if the data are improper, while the same advances to S77 if the data are proper for waiting for input of the charged sum G. If the credit card issuing company 4 transmits the charged sum G, i.e., the total sum of the credit sum and commission, the control advances to S78 for performing processing of subtracting G from the account and adding the same to an account G of the credit card issuing company, i.e., fund transfer processing.

If the server makes a determination of NO through S58, enquiry processing from the credit issuing company 4 is performed through S554 and thereafter the server advances to S59 for performing other processing.

Figure 24B:
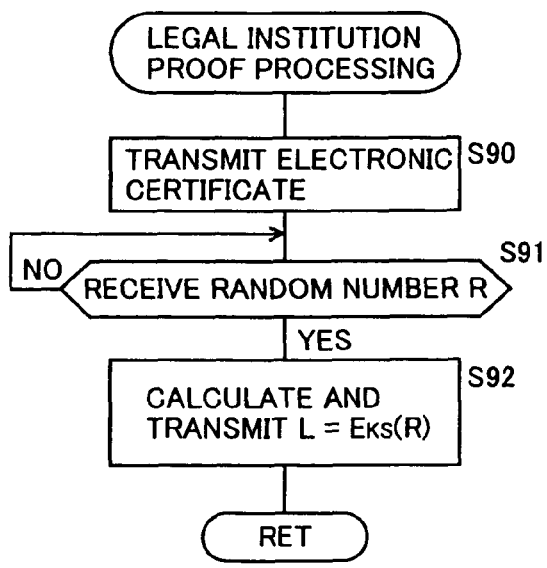
FIG. 24B is a flow chart showing a subroutine program of legal institution proof processing.

FIG. 24B is a flow chart showing a subroutine program of the legal institution proof processing shown in the aforementioned S1a, S19 and S56. First, the server performs processing of transmitting an electronic certificate of this institution through S90. The side receiving this electronic certificate generates a random number R and transmits the random number R. Then, the server makes a determination of YES through S91 and advances to S92 for performing processing of encrypting the received random number R with the secret key KS of this institution, i.e., processing of calculating L=EKS (R), and performs processing of sending back the calculated L.

The receiving side receiving this L can obtain R by decoding L with the public key KP of this institution in the already received electronic certificate. It is possible to check whether or not this is a legal institution by checking whether or not the R and the transmitted R are equal to each other. This is described later.

Figure 25:
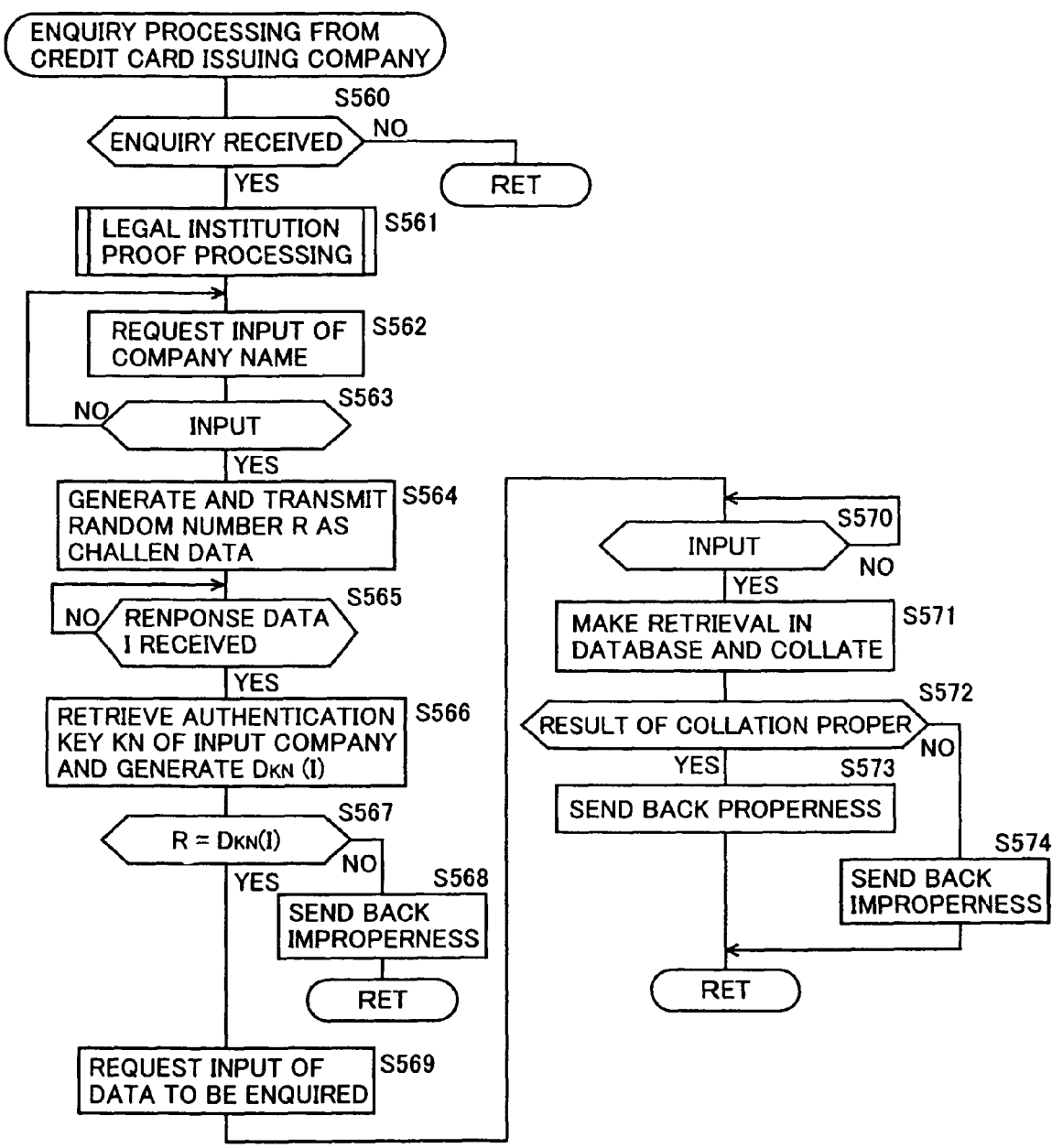
FIG. 25 is a flow chart showing a subroutine program of enquiry processing from a credit card issuing company.
Figure 26:
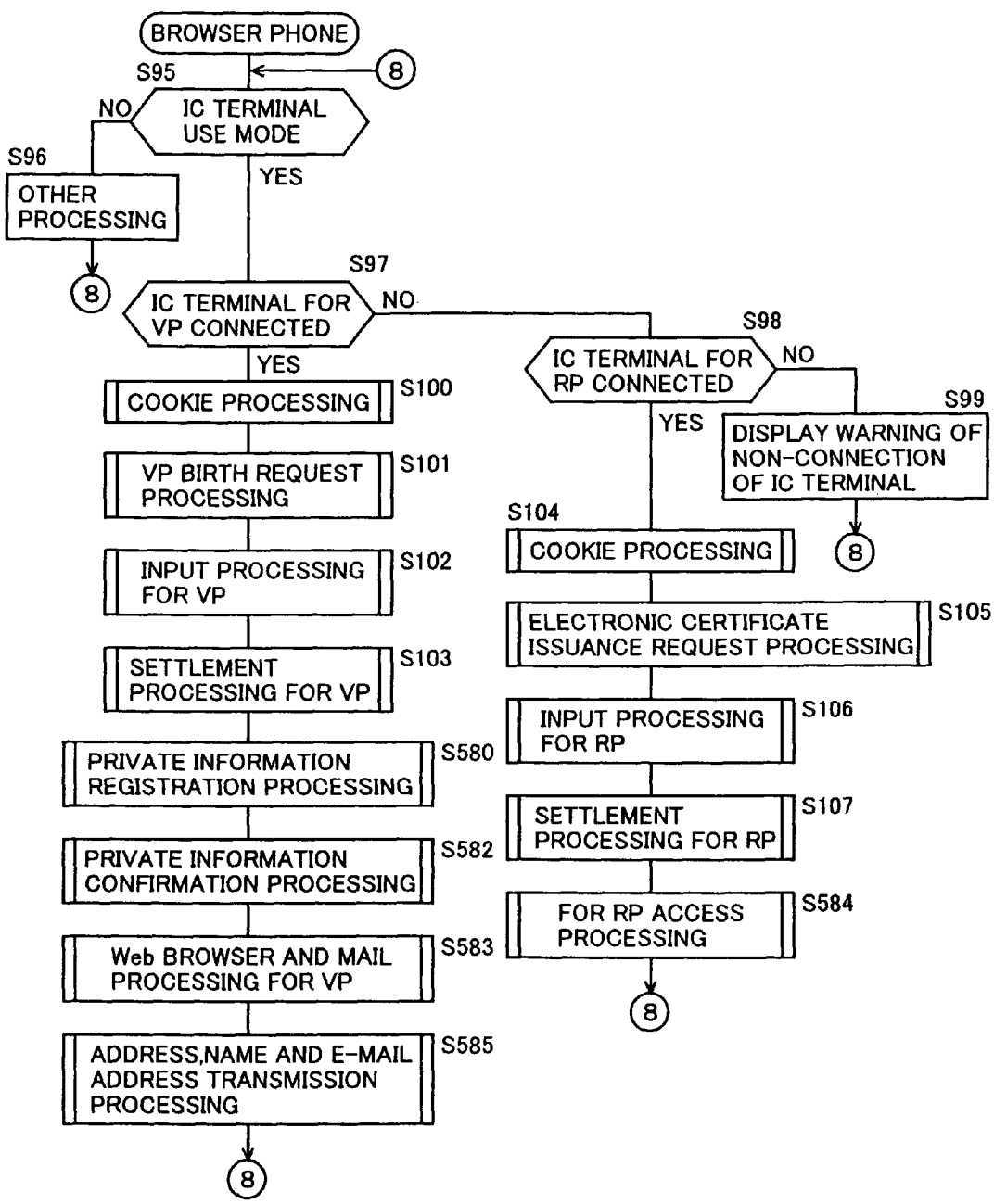
FIG. 26 is a flow chart showing processing operations of the browser phone.

FIG. 25 is a flow chart showing a subroutine program of the enquiry processing from the credit card company shown in S554. When the VP accesses the site as the trap type VP, makes electronic shopping or the like and settles accounts on credit, it follows that he/she employs not the credit number of the VP him/herself but an encrypted credit number created by encrypting the credit number of the VP him/herself with the secret key any number of times, as described above. For example, the VP accessing the site MTT as the trap type VP name E(B13P) as shown in FIG. 4 employs the virtual credit number E(3288) when making electronic shopping or the like and settling accounts on credit. The VP registers the credit number 3288 with respect to the credit card issuing company 4, but he/she does not register the encrypted credit number E(3288). When the virtual credit number E(3288) is transmitted to the credit card issuing company 4 following credit settlement, therefore, the credit card issuing company 4 cannot retrieve the virtual credit number E(3288) on its own for confirming trueness/falseness.

In this case, therefore, the credit card issuing company asks the financial institution 7 to enquire whether or not the virtual credit number is correct.

When receiving an enquiry from the credit card issuing company, the control advances to S561 for performing authentication processing similar to the aforementioned one in S561 to S568. If confirming the person in question as a result of authentication, the server makes a determination of YES through S567 and advances to S569 for transmitting an input request for enquired data to the credit card issuing company. This enquired data includes the aforementioned virtual credit number and the name of the trap type VP. When the name of this trap type VP is also input, it is possible to also enquire whether or not the name of the trap type VP and the virtual credit number correspond to each other.

When the credit card issuing company transmits the enquired data, the control advances to S571 for performing processing of making retrieval in the database 12a and making collation with the transmitted enquired data. Then, the server determines whether or not the transmitted enquired data is proper as a result of collation through S572, for sending back properness to the credit card issuing company through S573 if the data is proper while sending back improperness to the credit card issuing company through S574 if the data is improper as a result of collation. When sending back properness through S573, the server assigns a digital signature of the financial institution 7 indicating properness of the enquired data input through S570, and it follows that the data assigned with the digital signature is sent back to the enquiring credit card issuing company 4.

FIGS. 26 to 31 and 33 to 36 are flow charts for illustrating operations of the browser phone 30. The browser phone determines whether or not the same is in an IC terminal use mode through S95. The browser phone 30 is constituted to be switchable between an IC terminal use mode not operating unless at least either the IC terminal 19R for the RP or the IC terminal 19V for the VP is connected to the USB port and an IC terminal nonuse mode operable without connecting the IC terminal. The browser phone advances to S96 for performing other processing if the same is not in the IC nonuse mode while advancing to S98 if the same is in the IC terminal use mode for determining whether or not the IC terminal 19V for the VP is connected, advances to S98 if the same is not connected for determining whether or not the IC terminal 19R for the RP is connected, and the control advances to S99 if the same is not connected, i.e., if neither IC terminal is connected, for displaying a warning about nonuse of the IC terminal and thereafter returns to S95.

If the IC terminal 19V for the VP is connected, on the other hand, the control advances to S100 for performing cookie processing for the VP. This processing is described later with reference to FIG. 27. The browser phone 30 has no storage area for storing cookie data transmitted from the site. Therefore, the IC terminal 19V for the VP or the IC terminal 19R for the RP stores all that must be stored among cookie data transmitted from the site. Then, the control advances to S101, for performing VP birth request processing. This processing is described later with reference to FIG. 29. Then, the browser phone advances to S102, for performing input processing for VP. This processing is described later with reference to FIG. 31A. Then, the browser phone advances to S103 for performing settlement processing for the VP. This processing is described with reference to FIG. 33.

Then, the control advances to S580, for performing private information registration processing. This private information registration processing is processing of the browser phone 30 corresponding to the registration processing of the VP management server 9 shown in FIG. 13B. The browser phone performs processing of first performing person in question authentication processing on the VP and transmitting the private information of the VP to the VP management server 9 of the financial institution 7 and letting the same registered in the database 12a on condition that the VP management server 9 has confirmed person in question authentication.

Then, the control advances to S582 for performing confirmation processing for the private information. This processing is processing performed by the browser phone 30 in correspondence to the confirmation processing by the VP management server 9 of the financial institution 7 shown in FIG. 15. The browser phone performs processing of first making person in question authentication as the VP and then confirming his/her private information stored in the database 12a. If there is an error as a result of confirmation or the private information has been changed due to house-moving or change of occupation, on the other hand, the browser phone transits the change information to the VP management server 9 of the financial institution 7 through S582.

Then, the control advances to S583 for performing Web browser and mail processing for the VP. This processing is described later with reference to FIG. 36A. Then, the control advances to S585 for performing processing of transmitting the address, the name and the E-mail address. When the IC terminal 19R for the RP is connected to the USB port 18 of the browser phone 30, on the other hand, the browser phone makes a determination of YES through S98 and advances to S104 for performing cookie processing for the RP. This processing is described later with reference to FIG. 28B. Then, the browser phone advances to S105, for performing electronic certificate issuance request processing. This processing is described later with reference to FIG. 30B. Then, the control advances to S106 for performing input processing for the RP. This processing is described later with reference to FIG. 31B. Then, the browser phone advances to S107, for performing settlement processing for the RP. This processing is similar to the settlement processing for the VP, and illustration thereof is omitted. Then, the control advances to S584, for performing false RP access processing. This false RP access processing is described later with reference to FIG. 36B.

Figure 27:
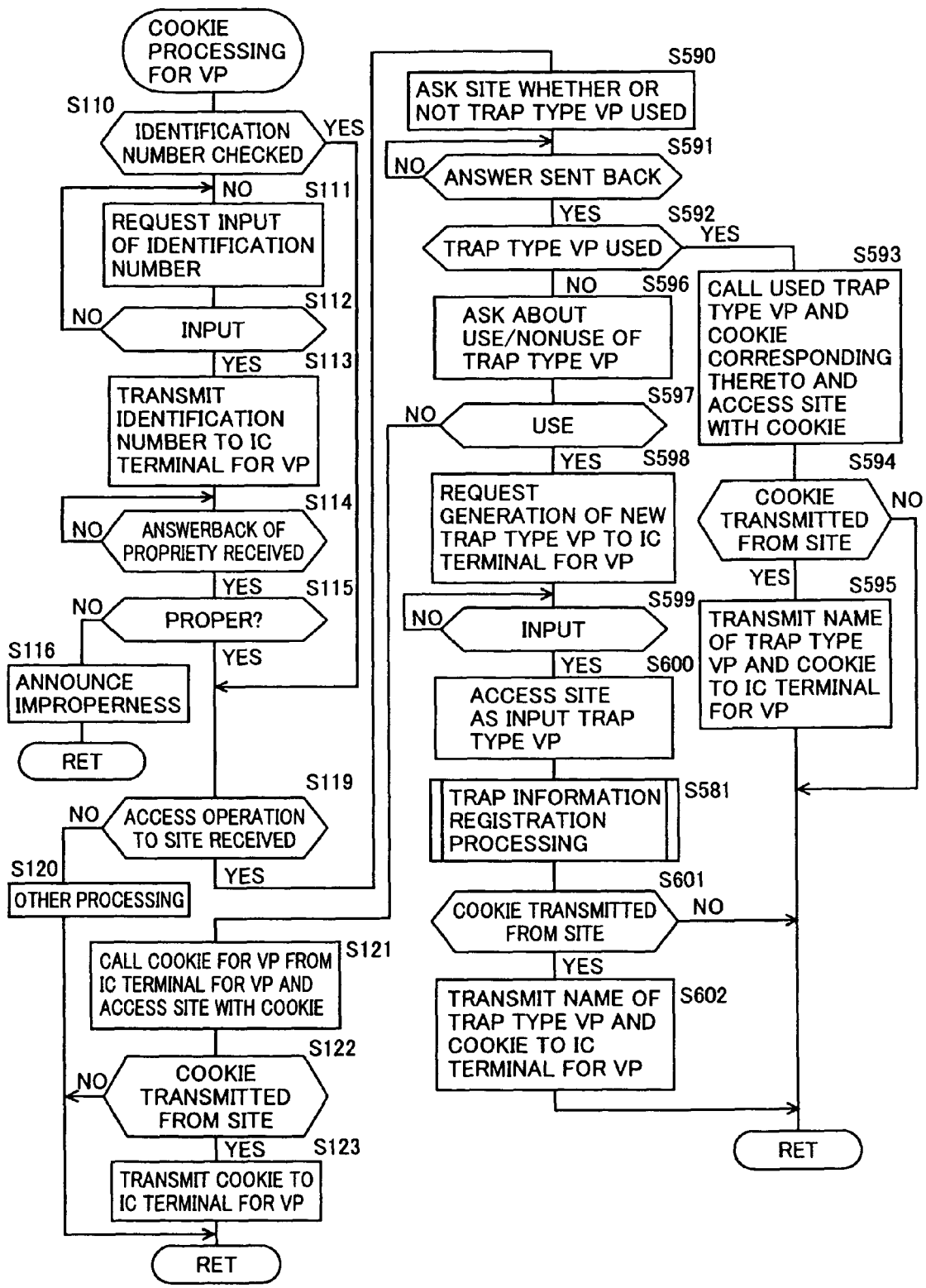
FIG. 27 is a flow chart showing a subroutine program of cookie processing for the VP.

FIG. 27 is a flow chart showing a subroutine program of the cookie processing shown in S102. The browser phone determines whether or not properness of the identification number has been checked through S110. The browser phone advances to S120 if the properness has been checked, while advancing to S111 if the properness has not been checked for displaying an input request for the identification number. When the user inputs the identification number of the IC terminal 19V for the VP from a keyboard 77 of the browser phone 30, the control advances to S113 for performing processing of transmitting the input identification number to the IC terminal 19V for the VP and waits until receiving an answerback of propriety from the IC terminal for the VP (S114). The IC terminal 19V for the VP receiving the identification number collates the stored identification number and the input identification number with each other and determines whether or not the same match with each other as described later, for sending back properness if the same match with each other while sending back improperness if the same mismatch with each other. The browser phone makes a determination of YES through S115 when properness is sent back, while the control advances to S116 if improperness is sent back so that the browser phone 30 makes announcement (display) of improperness.

The identification number is in a checked state only when the same is proper, and the control advances to S119 for determining whether or not an access operation to the Web site has been received, and the browser phone advances to S120 for performing other processing and terminating this subroutine program when no access operation has been received. When the access operation to the site has been received, on the other hand, the browser phone advances to S590 for performing processing of asking the IC terminal 19V for the VP whether or not the same already uses the trap type VP for the site. The IC terminal 19V for the VP stores the name of the accessed site and the name of the VP employed therefor in the storage area for the cookie data, as described with reference to FIG. 11. The IC terminal for the VP deduces whether or not the same uses the trap type VP for the site about which the browser phone 30 has enquired by making retrieval in this cookie data storage area. The IC terminal sends back the answer to the browser phone 30. Then, the control advances to S592 for determining whether or not the answer has such contents that the trap type VP is already used. If the answer has such contents that the trap type VP is already used, the control advances to S593 for performing processing of calling the used trap type VP and a cookie corresponding thereto from the cookie data storage area of the IC terminal for the VP and accessing the site with the cookie.

Then, the control advances to S594 for determining whether or not a cookie has been transmitted from the accessed site and terminates this subroutine program if no cookie has been transmitted. Even if accessing the site with cookie data, on the other hand, another cookie may be sent from the site when accessing another page of the site. When such a cookie is sent, the browser phone makes a determination of YES through S594 and the control advances to S595 for performing processing of transferring the name of the trap type VP and the sent cookie data to the IC terminal for the VP. The IC terminal for the VP performs processing of storing the transmitted cookie data in association with the transmitted name of the trap type VP.

When determining that this is a site for which the trap type VP has not yet been used through S592, the control advances to S596 for performing processing of asking the user about use/nonuse of the trap type VP. More specifically, a display part 76 of the browser phone 30 displays "use trap type VP?".

Then, the browser phone determines whether or not a use operation has been input from the keyboard 77 through S597. The control advances to S121 if an operation of nonuse has been performed, while the control advances to S598 for performing processing of requesting the IC terminal 19V for the VP for generation of a new trap type VP if an operation of use has been performed. This processing of S598 is performed for transmitting the name of the site accessed through S119 and an instruction requesting generation of the trap type VP to the IC terminal 19V for the VP.

When receiving this request, the IC terminal for the VP determines how may times the final one (E3(B13P)) in FIG. 11) of the VP names stored in the cookie data area has been encrypted (three times in FIG. 1) and encrypts the real name (B13P) of the VP name by an encryption count (four times in FIG. 11) larger by one than the encryption count for generating a new trap type VP name E4(B13P). The IC terminal outputs the generated new trap type VP to the browser phone 30. Then, the browser phone makes a determination of YES through S599 and advances to S600 for performing processing of accessing the site with the name of the trap type VP transmitted from the IC terminal for the VP. When requested for the name from the site, therefore, the browser phone transmits the new trap type VP name E4(B13). As to the address, however, the browser phone transmits the address of B13P, i.e., the address of the convenience store for the VP him/herself. As to the E-mail address, the browser phone transmits the E-mail address △△△△△ opened by the financial institution 7 for the trap type VP.

Then, the control advances to S581 for performing trap information registration processing. This trap information registration processing is processing for transmitting the newly generated trap type VP to the VP management server 9 of the financial institution 7 for making the same registered in the database 12a since the new trap type VP has been generated according to S598. This processing is processing of performing check processing for security similar to S143 to S145, S150 to S152 and S160 to S163 described later, for example, and thereafter transmitting data of the newly generated trap type VP, i.e., the trap type VP name, the name of the site for which the trap type VP name is employed, the public key, the virtual account number and the virtual credit number.

Then, the control advances to S601 for determining whether or not a cookie has been transmitted from the site. When the cookie has been transmitted, the control advances to S602 for performing processing of transmitting the trap type VP name used for the site and the transmitted cookie data to the IC terminal for the VP. The IC terminal for the VP performs processing of storing the transmitted cookie data in the area corresponding to the transmitted trap type VP name.

When determining that an operation of nonuse of the trap type VP has been made through S597, the control advances to S121 for performing processing of calling cookies for the VP, i.e., cookies (abc, hij, amz, rak . . . in FIG. 11) stored in correspondence to the real name (B13P in FIG. 11) of the VP from the IC terminal for the VP and accessing the site with these cookies.

In this case, it follows that the user employs the VP real name in the accessed site.

Then, the control advances to S122 for determining whether or not cookies have been transmitted from the site. When the site has transmitted cookies, the control advances to S123 for performing processing of transiting the transmitted cookies to the IC terminal 19V for the VP. When the cookie data are singly transmitted, the IC terminal 19V for the VP automatically performs processing of storing the transmitted cookie data in the storage area corresponding to the VP real name.

Figures 28A, 28B:
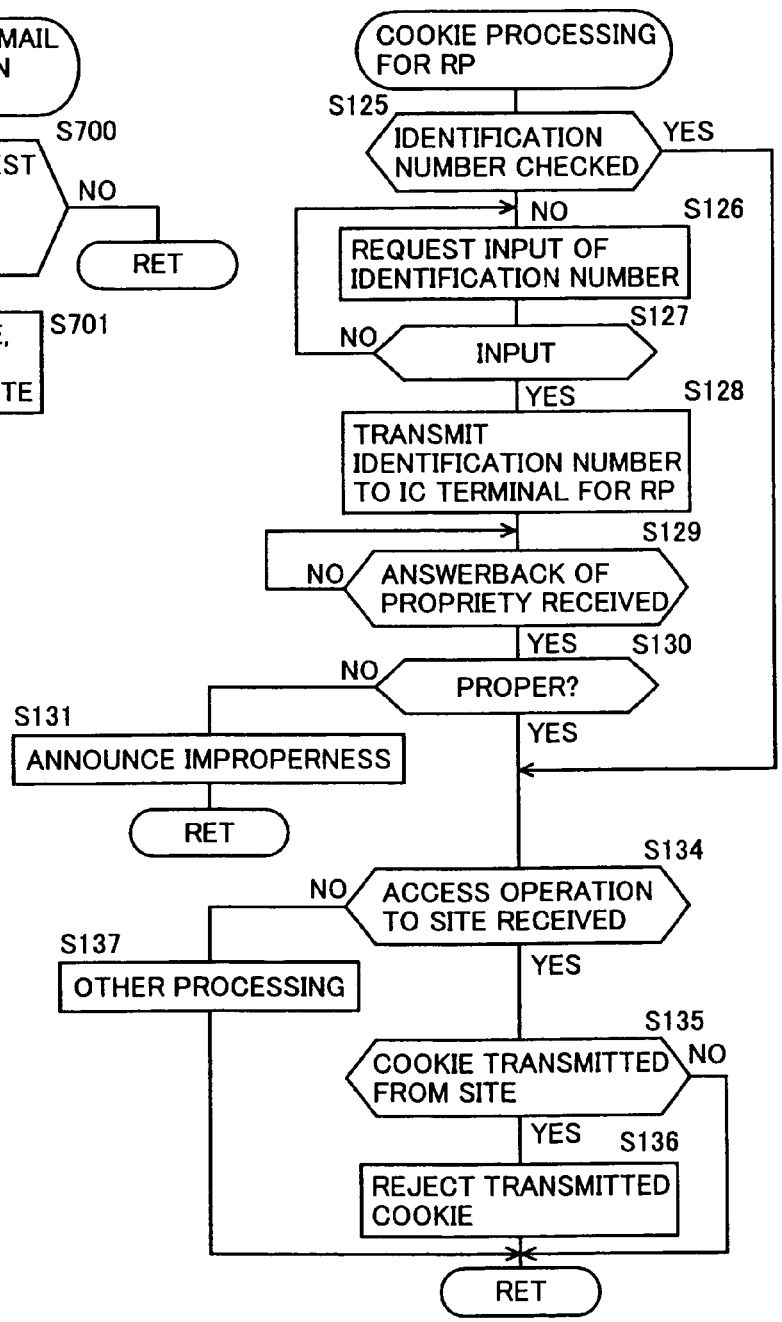
FIG. 28A is a flow chart showing a subroutine program of address, name and E-mail address transmission processing, an FIG. 28B is a flow chart showing a subroutine program of cookie processing for an RP.

FIG. 28A is a flow chart showing a subroutine program of the address, name and E-mail address transmission processing shown in S585. The browser phone determines whether or not a transmission request for the address, the name and the E-mail address has been received from the site through S700, and terminates this subroutine program when no request has been received. The control advances to S701 if the request has been received, for performing processing of transmitting the name, the address and the E-mail address of the VP used for the site. In the case of the example shown in FIG. 11, for example, the VP name used for the site MTT is E(B13P), and hence the browser phone transmits this name E(B13P). The address is the address of B13P, i.e., □△○ (see FIG. 3). As to the E-mail address, the browser phone transmits the E-mail address △△△△△ opened by the financial institution 7 for the trap type VP.

As a result of performing this cookie processing for the VP and the address, name and E-mail address transmission processing, it follows that, when accessing a certain site as the trap type VP, the previous trap type VP name is automatically employed for accessing the site as the previous trap type VP when thereafter accessing the site. Cookie data transmitted from the site also coheres to the trap type VP name corresponding to the site. More specifically, it follows that, once accessing the site MTT with the trap type VP name E(B13P) as shown in FIG. 11, this trap type VP name E(B13P) is thereafter necessarily employed when accessing MTT, for accessing MTT with a cookie mtt previously transmitted from MTT at this time. On the other hand, the VP cannot access MTT with his/her real name B13P. When the VP tries to make such access, the browser phone makes a determination of YES through S592 for automatically accessing the MTT as E(B13P) through S593.

When using the IC terminal 19V for the VP, the name, the address etc. of the RP are not collected by the site even if the name, the address etc. of the VP are collected by the site, and hence the user can also protect his/her privacy.

Further, it is possible to check illegal distribution etc. of the private information as described above by utilizing the trap type VP name.

FIG. 28B is a flow chart showing a subroutine program of the cookie processing for the RP shown in S104. The browser phone determines whether or not the identification number has been checked through S125, for making a determination of YES through S125 and advancing to S132 if properness of the identification number has already checked. If properness of the identification number has not yet been checked, on the other hand, the browser phone advances to S126 for requesting input of the identification number and advancing to S128 if the user inputs the identification number of the IC terminal 19R for the RP from the keyboard for performing processing of transmitting the input identification number to the IC terminal for the RP. Then, the browser phone waits until the IC terminal 19R for the RP sends back propriety of the identification number (S129).

When the IC terminal 19R for the RP sends back the result of determination of propriety of the identification number, the browser phone advances to S130 for determining whether or not this is an answerback of a result of properness, and advances to S131 if the number is improper for announcing (displaying) improperness. If this is an answerback of properness, on the other hand, the browser phone advances to S134 for determining whether or not an access operation to the site has been made, and performs other processing in S137 if no operation has been made. When an access operation for the site has been made, on the other hand, the browser phone advances to S135 for determining whether or not a cookie (tracking type cookie in this case) has been transmitted from the site. If the site has transmitted a cookie, the browser phone advances to S136 for performing processing of rejecting the transmitted cookie. When the IC terminal 19R for the RP is connected to the USB port 18 of the personal computer 30 and used, all cookies (tracking type cookies) transmitted from the site are rejected so that it is possible to prevent the cookies from being recorded in the IC terminal 19R for the RP.

Consequently, when the user acts on the network as the RP with the IC terminal 19R for the RP, the name of the RP which is the real name of the user, the address or the like is not collected with the clue of a tracking type cookie but the privacy of the user is protected.

Figure 29:
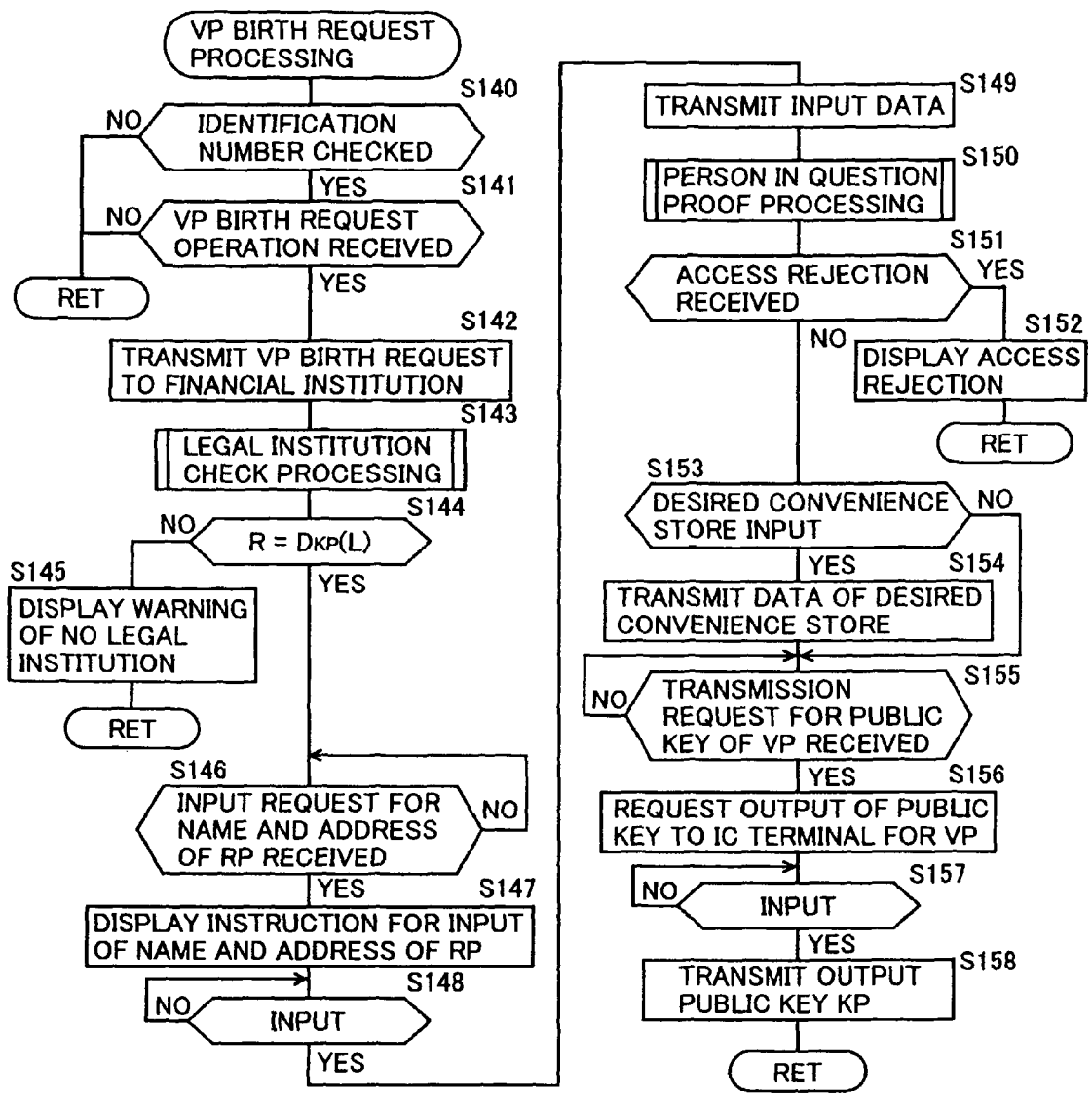
FIG. 29 is a flow chart showing a subroutine program of VP birth request processing.
Figure 30A:
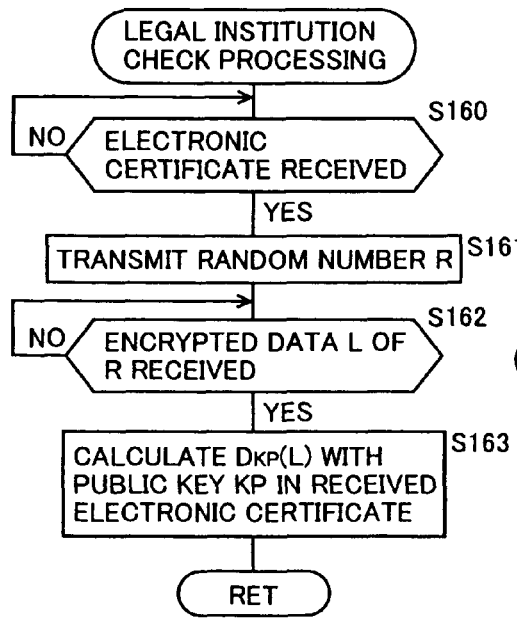
FIG. 30A is a flow chart showing a subroutine program of legal institution check processing, and Zu 30B is a flow chart showing a subroutine program of electronic certificate issuance request processing.

FIG. 29 is a flow chart showing a subroutine program of the VP birth request processing shown in S101. This VP birth request is processing for making a request for newly bearing a PV to the VP management server 9. The browser phone determines whether or not the identification number has been checked through S140, for advancing to S141 if the proper identification number has been checked while terminating this subroutine program if the proper identification number has not yet been checked. If the proper identification number has been checked, the browser phone advances to S141 for determining whether or not a V birth request operation has been made. If the user manipulates the keyboard of the browser phone 30 and makes the VP birth request operation, the control advances to S142 for performing processing of transmitting the VP birth request to the VP management server 9 of the financial institution 7. Then, the browser phone advances to S143 for performing legal institution check processing. This legal institution check processing is employed for checking whether or not the institution (the financial institution 7 in this case) of the other party is a legal institution for preventing illegal action of pretending to be the financial institution 7, and FIG. 30A shows a subroutine program thereof.

The subroutine program of the legal institution check processing is first described with reference to FIG. 30A. This legal institution check processing is a check side program corresponding to the legal institution proof processing shown in FIG. 24B. First, the browser phone determines whether or not an electronic certificate has been received through S160, and waits until receiving the same. In the legal institution proof processing, the electronic certificate is transmitted through S90 as shown in FIG. 24. If this electronic certificate is transmitted, the control advances to S161 for performing processing of generating and transmitting a random number R. Then, the institution performs processing of encrypting the received random number R with the secret key SK of this institution, calculating L and transmitting the same through S92, as shown in FIG. 24. When the browser phone 30 receives this encrypted data L of R, the control advances to S163 for performing processing of decoding L with the public key KP in the received electronic certificate, i.e., processing of calculating DKP(L).

The browser phone advances to S144 in FIG. 29, for determining whether or not R is equal to DKP(L). R must be equal to DKP(L) if this is a legal institution and the browser phone advances to S146 in this case, while the browser phone makes a determination of NO through S144 if others pretend to be the financial institution 7 and advances to S145 so that the browser phone 30 displays a warning about no legal institution and terminates this subroutine program.

When confirming that this is a legal institution, the browser phone advances to S146 for determining whether or not a request for input of the name and the address of the RP has been received and waits until receiving the same. As hereinabove described, the VP management server 9 transmits the input request for the name and the address of the RP when receiving the VP birth request (see S2), and the browser phone 30 makes a determination of YES through S146 when receiving the input request for the name and the address of the RP and the control advances to S147.

At S147, the browser phone 30 performs processing of displaying an instruction for input of the name and the address of the RP on the display thereof and waits until receiving the input (S148). The browser phone advances to S149 in a stage of receiving the input and performs processing of transmitting the input data to the VP management server 9 of the financial institution 7.

Then, the browser phone advances to S150 for performing person in question proof processing. This person in question proof processing is processing for proving whether or not the user making the VP birth request is the person in question him/herself, and FIG. 34A shows a subroutine program thereof. The subroutine program of the person in question certificate is now described with reference to FIG. 34A.

This person in question proof processing is performed in order to prove the person in question when the random number R is transmitted on the basis of the aforementioned S4, S62 or the like, on the basis of the random number. The browser phone determines whether or not the random number R has been received through S125 and waits until receiving the same. When receiving the random number R, the browser phone advances to S216 for performing processing of transmitting the received random number R to the IC terminal 19R or 19V. The IC terminal performs processing of encrypting the random number R with the stored authentication key KN or the public key KP for generating and outputting response data I as described later. When the response data I is output, the browser phone makes a determination of YES through S217 and advances to S218 for performing processing of transmitting the I to the VP management server 9.

When performing the VP birth request processing shown in FIG. 29, the IC terminal 19V for the VP is connected to the USB port 18 of the browser phone 30. In the person in question proof processing at the time of the VP birth request processing, the browser phone performs processing of encrypting the random number R with the authentication key KN of the RP stored in the IC terminal 19V for the VP. This is described later.

Consequently, the browser phone proves that this is the RP in the person in question proof at the time of the VP birth request processing of S150 in FIG. 29.

Then, the browser phone advances to S151 for determining whether or not access rejection has been received, and advances to S152 when receiving the access rejection, for displaying the access rejection. When access is allowed, on the other hand, the browser phone advances to S153 for determining whether or not the convenience store 2 desired by the user making the VP birth request is input. The address of the born VP is set to the address of the convenience store 2, and hence the user inputs information specifying the convenience store 2 from the keyboard of the browser phone 30 if there a convenience store 2 desired by him/her. If the information is input, the browser phone transmits the data of the desired convenience store 2 to the VP management server 9 through S154. If no input of the desired convenience store 2 has been received, the address of the convenience store 2 nearest to the address of the RP defines the address of the born VP.

Then, the browser phone advances to S155 for determining whether or not a transmission request for the public key of the VP has been received and waits until receiving the same. As hereinabove described, the VP management server 9 outputs a transmission request for the public key of the VP when receiving the birth request for the VP (see S30). When the browser phone 30 receives the transmission request, the control advances to S156 for outputting a public key output request to the IC terminal 19V for the VP. Then, the IC terminal 19V for the VP outputs the stored public key KP of the VP. If receiving this output, the control advances to S158 for transmitting the output public key KP to the VP management server 9 of the financial institution 7.

Figure 30B:
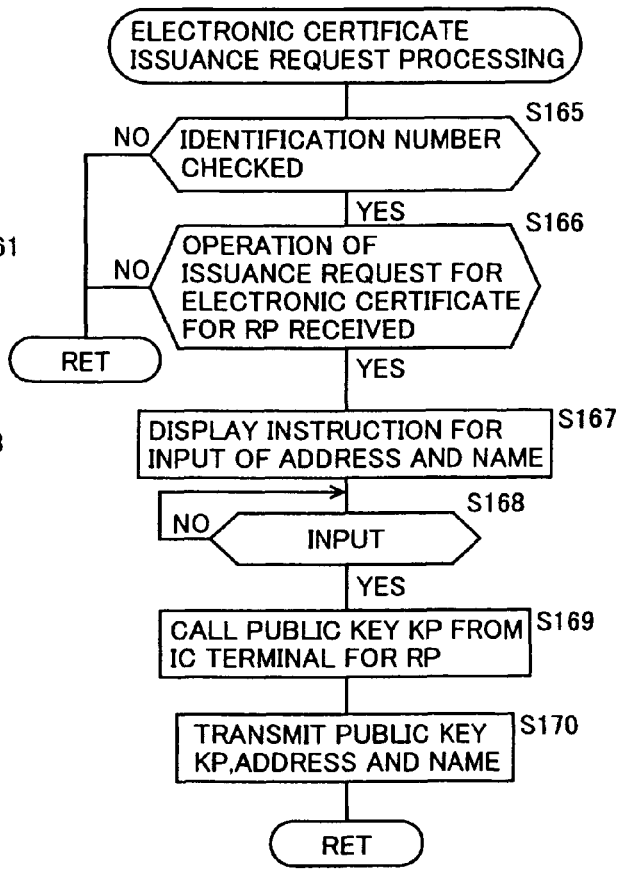

FIG. 30B is a flow chart showing a subroutine program of the electronic certificate issuance request processing shown in S105. The browser phone determines whether or not a proper identification number has been checked through S165 and terminates this subroutine program if the same has not yet been checked. If the proper identification number has been checked, on the other hand, the browser phone advances to S166 for determining whether or not an issuance request operation for an electronic certificate for the RP has been made. If the user has manipulated the keyboard of the browser phone 30 for making the issuance request, the control advances to S167 for displaying an instruction for input of the address and the name of the RP. If the user inputs the same from the keyboard, the control advances to S169 for performing processing of calling the public key KP from the IC terminal 19R for the RP. When performing this electronic certificate issuance request processing, the user must connect his/her IC terminal 19R for the RP to the USB port 18 of the browser phone 30. When the processing of S169 has been performed, the public key KP for the RP stored by the connected IC terminal 19R for the RP is output to the browser phone 30, which in turn transmits the output public key KP and the input address and name of the RP to the authentication server 11 of the financial institution 7 through S170.

Figure 31A:
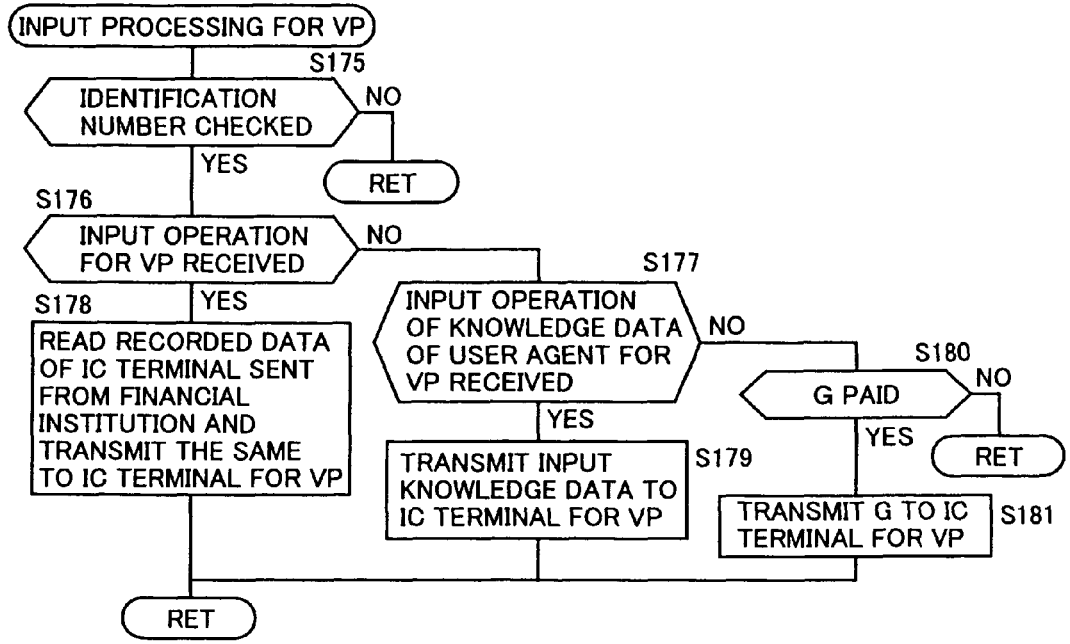
FIG. 31A is a flow chart showing a subroutine program of input processing for the VP, and Zu 31B is a flow chart showing a subroutine program of input processing for the RP.
Figure 31B:
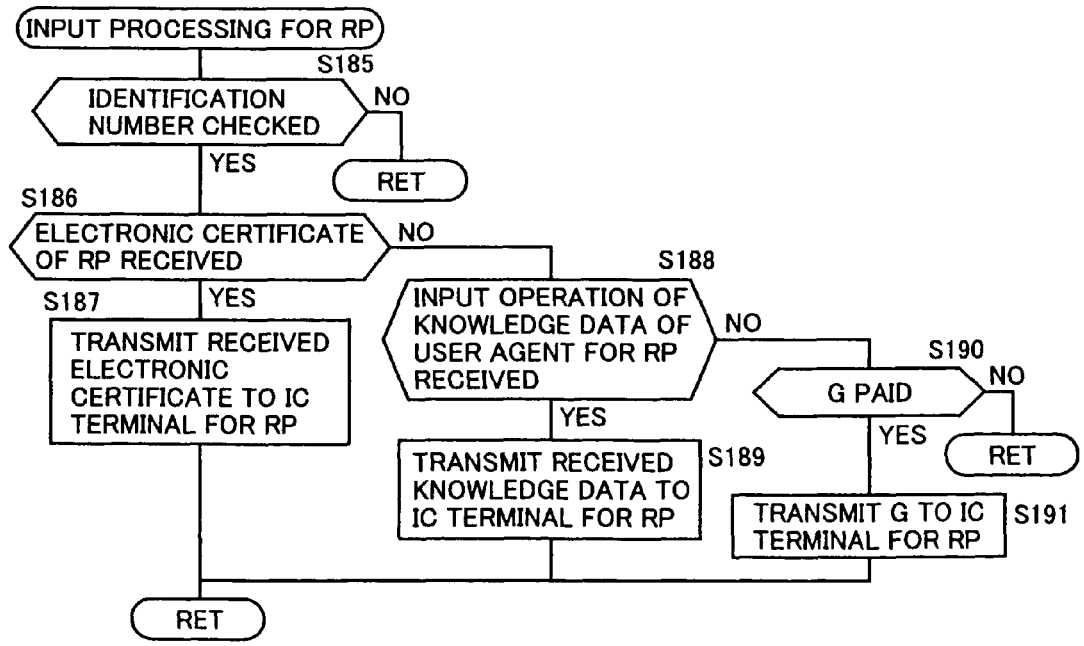

FIG. 31A shows a subroutine program of the input processing for the VP shown in S102, and FIG. 31B is a flow chart showing a subroutine program of the input processing for the RP shown in S106.

When performing the input processing for the VP, the IC terminal 19V for the VP must be connected to the USB port 18 of the browser phone 30. The browser phone determines whether or not the proper identification number has been checked through S175, and terminates this subroutine program if the proper identification number has not yet been checked. If the proper identification number has been checked, the browser phone advances to S176 for determining whether or not an input operation for the VP has been made. The IC terminal 19I storing the name and the address (the address of the convenience store 2) of the born VP, the name of the convenience store 2, the E-mail address and the electronic certificate is sent if the VP management server 9 of the financial institution 7 has performed the VP birth processing as hereinabove described, and when the user inserts the IC terminal 19I in the browser phone 30, the browser phone makes a determination of YES through S176 and advances to S178 for reading the data recorded in the IC terminal 19I and transmitting the same to the connected IC terminal 19V for the VP.

When the user makes an input operation of knowledge data of the user agent for the VP from the keyboard of the browser phone 30, the browser phone makes a determination of YES through S177 and advances to S179 for performing processing of transmitting the input knowledge data to the IC terminal 19V for the VP.

When the user partially remits funds from his/her account of the financial institution 7, the remitted sum G is transmitted to the browser phone 30 (see S69). If the remitted sum G is input in the browser phone 30, the browser phone makes a determination of YES through S180 and advances to S181 for performing processing of transferring the remitted sum G to the IC terminal 19V for the VP and adding/storing the same as a reload sum.

When performing the input processing for the RP, the IC terminal 19R for the RP must be connected to the USB port 18 of the browser phone 30. First, the browser phone determines whether or not the proper identification number has been checked through S185, and advances to S186 if the same has been checked for determining whether or not an electronic certificate for the RP has been received. If the user makes an issuance request for the electronic certificate for the RP to the authentication server, the electronic certificate for the RP is created and transmitted to the browser phone 30 as described above (see S28). When the electronic certificate is transmitted, the browser phone makes a determination of YES through S186 and advances to S187 for performing processing of transmitting the received electronic certificate to the IC terminal 19R for the RP and storing the same in the IC terminal for the RP.

When the user manipulates the keyboard of the browser phone 30 and makes an input operation of the knowledge data of the user agent for the RP, the browser phone makes a determination of YES through S188 and advances to S189 for performing processing of transmitting the input knowledge data to the IC terminal 19R for the RP so that the IC terminal 19R for the RP stores the input knowledge data.

When the user makes a payment request for partially remitting the funds in his/her account to the settlement server 10, the settlement server 10 transmits G which is the remitted sum to the browser phone 30 of the user as described above. Then, the browser phone makes a determination of YES through S190 and advances to S191 for performing processing of transmitting the remitted sum G to the IC terminal 19R for the RP and adding/updating G as a reload sum.

Figure 32:
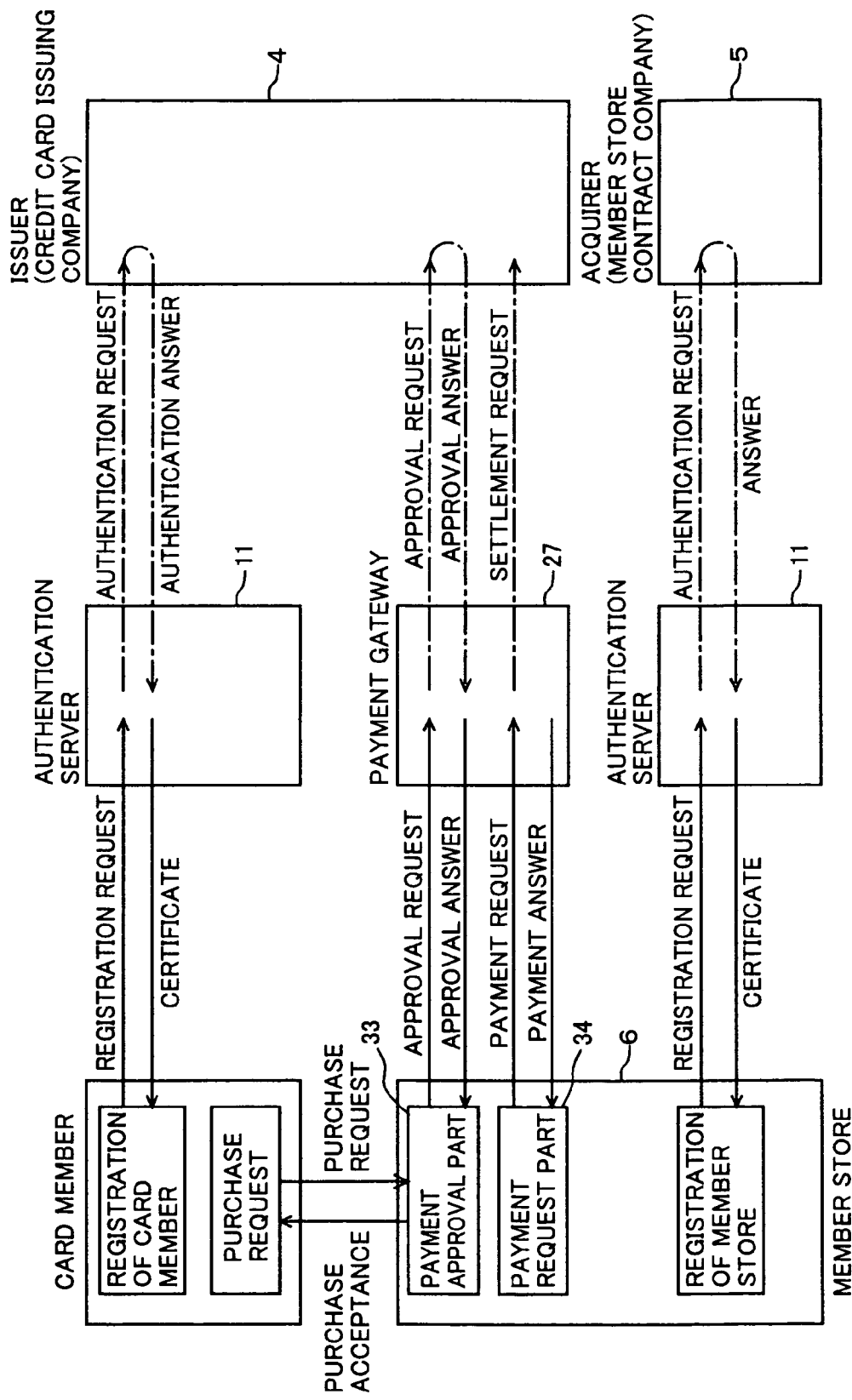
FIG. 32 is an explanatory diagram for illustrating an outline of settlement processing by SET.

FIG. 32 is a diagram showing the overall schematic system in a case where the user (the RP and the VP are present) makes payment with the credit card for settling accounts according to SET. When a card member performs an issuance procedure for a credit card, a server set in the credit card issuing company 4 determines that credit issuance has been applied and issues a credit card number to this card member. When the card member requests issuance of a credit card for the VP, the server of the credit card issuing company 4 asks him/her to input data of the name, the address etc. of the VP, and enquires whether or not he/she is a VP registered in the financial institution or the like to the financial institution 7 on the basis of the data. On condition that it has been confirmed that he/she is a normal VP stored in the database 12 of the financial institution 7, the server of the credit card issuing company 4 performs processing of issuing the credit number to the VP.

In other words, the server of the credit card issuing company 4 includes a credit number issuance step of issuing a credit number for a virtual person. The server also includes credit number issuance means issuing a credit number for a virtual person. Further, this credit number issuance step or credit number issuance means issues said credit number on condition that it has been confirmed that the virtual person for whom the credit number is to be issued is a normal virtual person registered in said prescribed institution. The user possessing credit cards (two types for the RP and the VP are present) issued by the credit card issuing company 4 issues a member registration request for making transaction according to SET to the authentication server 11. The authentication server 11 issues a request for authentication as to whether or not the user is a credit member of the credit card issuing company 4 to the credit card issuing company 4. If the credit card issuing company 4 sends back an answer of authentication indicating that the user is a credit card member to the authentication server 11, the authentication server 11 creates an electronic certificate for SET and sends the same to the card member.

In order to enable the member store 6 such as an electronic mall to make transaction according to SET, the member store first issues a member registration request for the transaction according to SET to the authentication server 11. The authentication server 11 transmits a request for authentication as to whether or not this member store 6 is a legal contract company to the member store contract company (acquirer) 5 under contract with the member store 6. When the member store contract company 5 sends back an answer of a legal member store, the authentication server 11 creates an electronic certificate for SET for the member store 6 and issues the same to the member store 6.

When the card member makes electronic shopping on the member store 6 and makes transaction according to SET in this state, the card member first transmits a purchase request for an article or a service to the member store 6. The member store 6 transmits an approval request as to whether or not the purchase request may be approved to the credit card issuing company 4 from a payment approval part 33 through a payment gateway 27. When the credit card issuing company 4 sends back an answer of approval to the member store 6 through the payment gateway 27, the member store 6 transmits approval of the purchase to the card member. Further, the member store 6 transmits a payment request to the payment gateway 27 from a payment request part 34. The payment gateway 27 transmits a settlement request responsive to the payment request to the credit card issuing company 4 while sending back a payment answer to the member store 6.

Between the card member and the member store 6, confirmation of a legal person in question is performed by transmitting electronic certificates thereof to each other when making purchase transaction for an article or a service.

When the credit card issuing company 4 issues a credit card to the RP as the user, card information of the credit card number etc. is input and stored in this user's IC terminal 19 for the RP. When the user receives issuance of a credit card from the credit card issuing company 4 as the VP, on the other hand, he/she must transit an electronic certificate issued for the VP to the credit card issuing company 4 for asking the financial institution 7 to prove his/her identity. When the credit card issuing company 4 thereafter issues a credit card, card information of the credit card such as the card number is input and stored in this user's IC terminal 19V for the VP.

The aforementioned electronic certificates for SET are also issued in two types of cases for the RP and the VP. The respectively issued electronic certificates for SET are input and stored in the respective IC terminals 19R and 19V.

Figure 33:
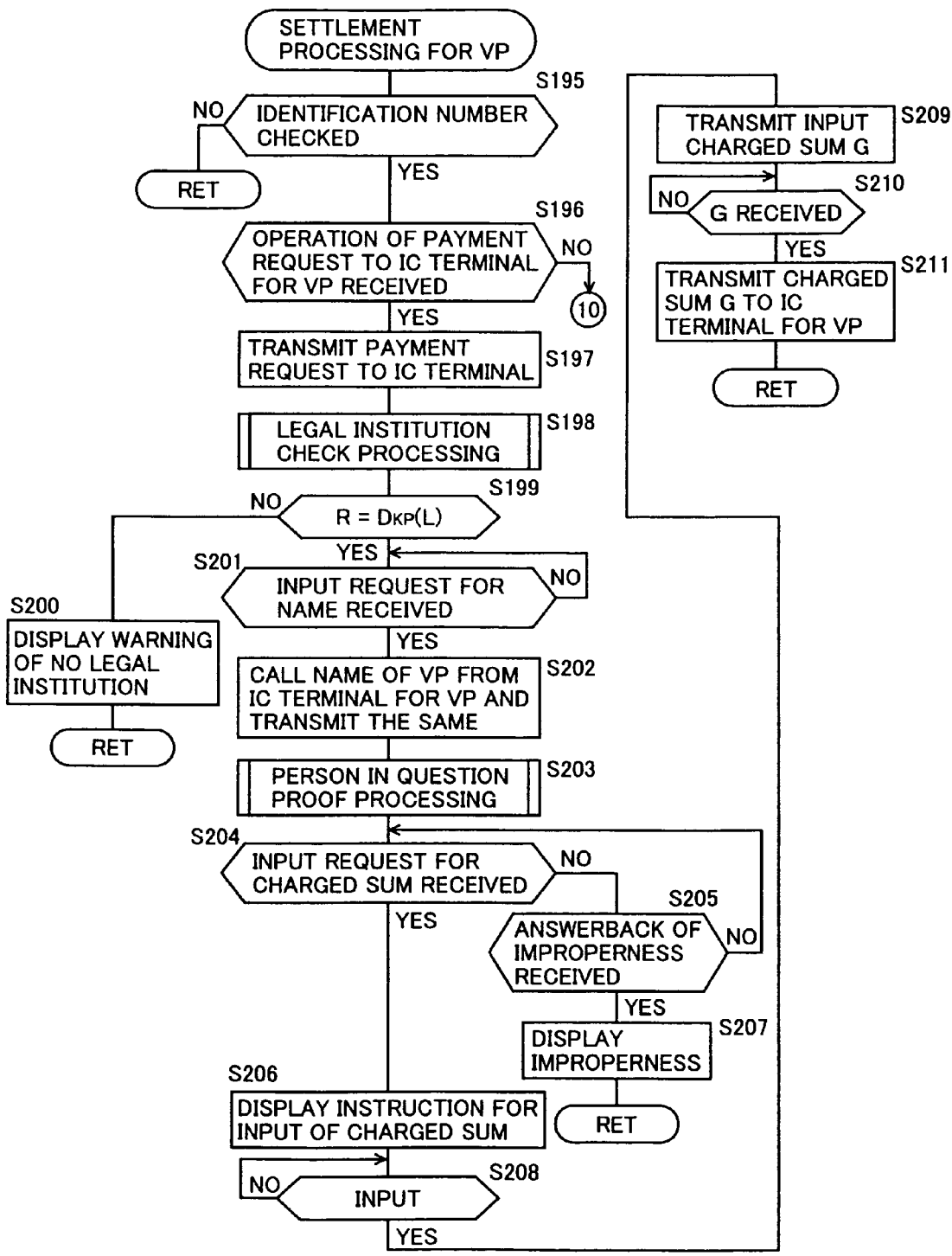
FIG. 33 is a flow chart showing a subroutine program of settlement processing for the VP.
Figure 35:
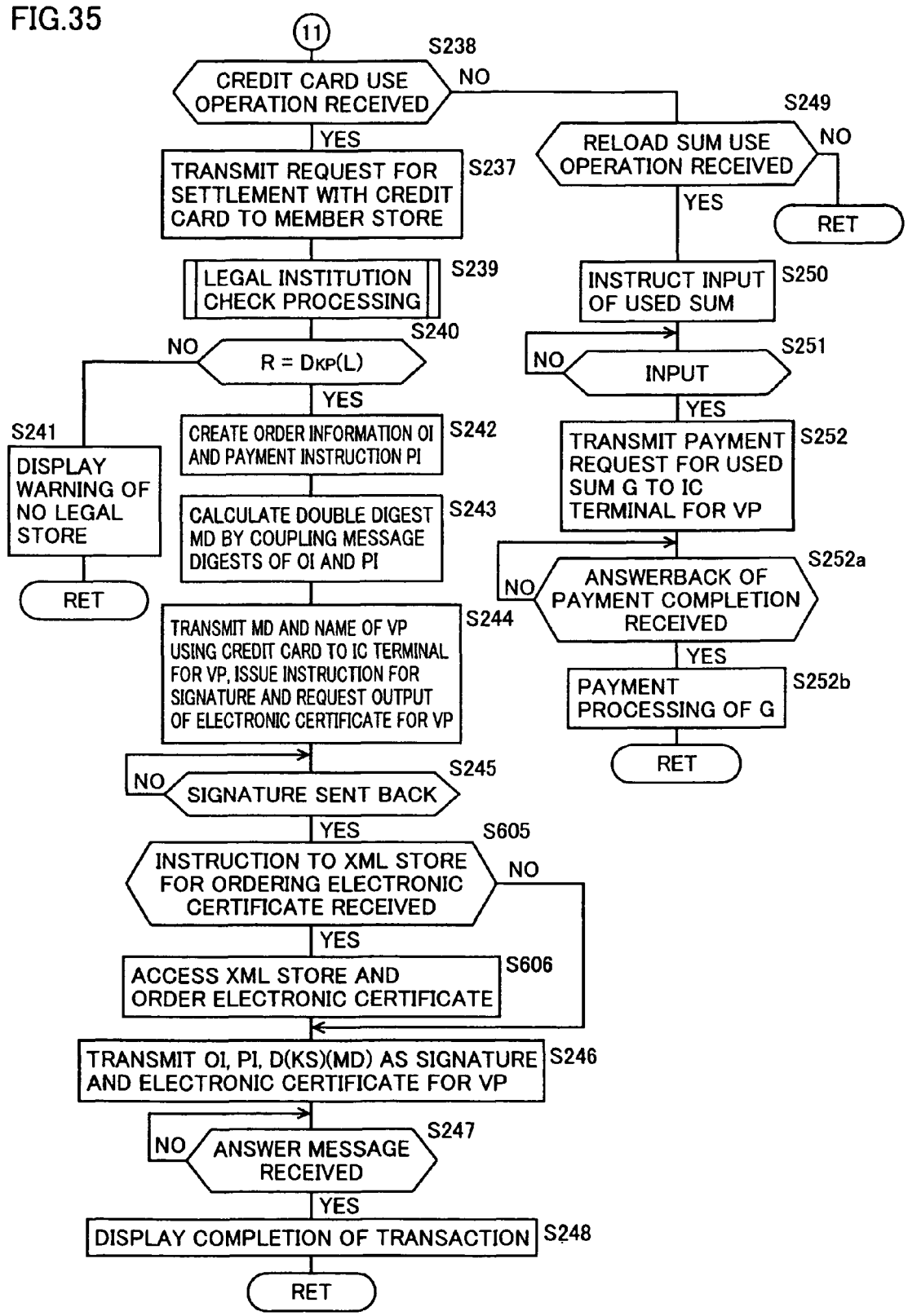
FIG. 35 is a flow chart showing part of the subroutine program of settlement processing for the VP.

FIG. 33 is a flow chart showing a subroutine program of the settlement processing for the VP shown in S103. First, the browser phone determines whether or not the proper identification number has been checked through S195 for terminating this subroutine program if the same has not yet been checked while advancing to S196 if the proper identification number has been checked.

This settlement processing for the VP has processing of partially withdrawing funds in the user's bank account in the financial institution 7 and reloading money to the IC terminal 19V for the VP, processing of settling accounts with a debit card, processing of settling accounts with a credit card and a case of settling accounts with the reload sum reloaded in the IC terminal 19V for the VP.

When the user performs an operation of partially withdrawing the funds in his/her bank account and reloading money to the IC terminal for the VP, the browser phone transmits a payment request therefor to the settlement server 10 of the financial institution 7 through S197. Then, the browser phone advances to S198 for performing legal institution check processing (see FIG. 30A).

Then, the browser phone advances to S199 for determining whether or not R is equal to DKP(L) and makes a determination of NO through S199 if this is not a legal institution for advancing to S200 and displaying a warning about no legal institution. If this it a legal institution, on the other hand, R is equal to DKP(L) and hence the control advances to S201 for determining whether or not an input request for the name has been received and waits until receiving the same. As hereinabove described, the settlement server 10 transmits an input request for the name when receiving a request for payment to the IC terminal (see S60). When this input request for the name is transmitted, the browser phone makes a determination of YES through S201 and advances to S202 for performing processing of calling the name of the VP from the IC terminal 19V for the VP and transmitting the same to the settlement server 10. Then, the browser phone advances to S203 for performing person in question proof processing (see FIG. 34A).

Then, the browser phone advances to S204 for determining whether or not an input request for a charged sum has been received, advances to S205 if no input request has been received for determining whether or not improperness has been sent back and returns to S204 if no improperness has been sent back. If the settlement server 10 determines that legality of the user cannot be confirmed in the process of the cycle of this loop of 204 and 205, the server sends back improperness (see S79). Consequently, the browser phone makes a determination of YES through S205 and advances to S207 for displaying improperness on the display of the personal computer. If the settlement server 10 determines that this is the legal person in question as a result of person in question authentication, on the other hand, the server transmits an input request for the charged sum to the browser phone 30 (see S87). Then, the browser phone makes a determination of YES through S204 and advances to S206.

At S206, the browser phone 30 performs processing of displaying an instruction for input of the charged sum on the display thereof. When the user inputs the charged sum from the keyboard, the browser phone makes a determination of YES through S208 and advances to S209 for performing processing of transmitting the input charged sum G to the settlement server 10. The settlement server 10 receiving the charged sum G performs processing of subtracting G from the account of the VP and transmitting G (see S89). Consequently, the browser phone makes a determination of YES through S210 and advances to S211 for performing processing of transmitting the paid sum G to the IC terminal 19V for the VP and adding/updating G to the reload sum.

When making a determination of NO through S196, the browser phone advances to S220 in FIG. 34B for determining whether or not a debit card use operation has been made. If the debit card use operation has been made, the browser phone advances to S235 for performing processing of transmitting a debit card use request to the settlement server 10. Then, the browser phone advances to S221 for performing legal institution check processing (see FIG. 30A). Then, the browser phone advances to S222 for determining whether or not R is equal DKP(L). If this is not a legal institution, the browser phone makes a determination of NO and advances to S223 for displaying a warning about no legal institution. If this is a legal institution, on the other hand, the control advances to S224 for determining whether or not an input request for the identification number of the debit card and card information has been received and waits until receiving the same. The settlement server 10 transmits an input request for the identification number and the card information to the browser phone 30 when receiving the debit card use request (see S70). When receiving transmission thereof, the control advances to S225 for displaying an instruction for input of the identification number on the display part 76 of the browser phone 30. When the user inputs the identification number of the debit card from the keyboard, the browser phone makes a determination of YES through S226 and advances to S227 for performing processing of reading the card information from the IC card 19V for the VP and transmitting the same to the settlement server 10 with the identification number.

Then, the browser phone advances to S228, for determining whether or not improperness has been sent back. The settlement server 10 receiving the identification number and the card information determines whether or not the same are proper (S72), and sends back improperness if the same are not proper (see S79). If improperness is sent back, the browser phone makes a determination of YES through S228 and advances to S229 for displaying improperness. If no improperness is sent back, on the other hand, the control advances to S230 for displaying an instruction for input of a used sum on the display of the personal computer. When the user inputs the used sum from the keyboard, the browser phone makes a determination of YES through S231 and advances to S232 for performing processing of transmitting the input used sum G to the settlement server 10.

The settlement server 10 receiving the used sum G performs processing of retrieving the bank account corresponding to the user, subtracting the used sum G and sending back the used sum G to the browser phone 30, as hereinabove described (S74).

Consequently, the browser phone makes a determination of YES through S233 and advances to S234 for performing processing of displaying completion of settlement on the display part 76 of the browser phone 30.

When making a determination of NO through S220, the control advances to S238. At S238, the browser phone determines whether or not a credit card use operation has been made. When the user manipulates the keyboard 77 of the browser phone 30 and inputs use of the credit card, the control advances to S237 for performing processing of transmitting a request for settlement with the credit card to the member store 6. This member store is a store from which the user tries to purchase an article or a service. Then, the control advances to S239 for performing legal institution check processing. This legal institution check processing is that shown in FIG. 30A. The member store 6 transmits an electronic certificate of this member store to the browser phone 30 of the customer in response to this legal institution check processing and encrypts the random number with its secret key KS when receiving the random number R, for transmitting the result L of encryption to the browser phone 30 of the customer.

The control advances to S240 for determining whether or not R is equal to DKP(L). If this is not a legal store (member store), the browser phone makes a determination of NO through S240 and advances to S241 for displaying a warning about no legal store. If this is a legal store (member store), on the other hand, the browser phone advances to S242 for creating order information OI and a payment instruction PI. The order information OI is information for specifying the object of purchase such as the article or the service and the number of the purchased articles or the like. The payment instruction PI is an instruction for making credit payment with a credit card of a certain credit number, for example.

Then, the browser phone advances to S243 for performing processing of calculating a double digest MD formed by coupling message digests for the order information OI and the payment instruction PI. Then, the browser phone advances to S244 for transmitting the double digest MD and the name of the VP using the credit card to the IC terminal 19V for the VP and issuing an instruction for a signature while issuing an output request for an electronic certificate for the VP.

The IC terminal 19V for the VP receiving the name of the VP using the credit card, the instruction for the signature and the output request for the electronic certificate collates the input name of the VP with the cookie data storage area to deduce how may times the real name 13P (see FIG. 11) of the VP has been encrypted for the VP name. The IC terminal encrypts the secret key with the secret key by this number of times and decodes the input MD with the encrypted secret key (KS) for generating the so-called double signature. This double signature is expressed as D(KS)(MD) for convenience. The IC terminal 19V for this VP outputs the D(KS)(MD) to the browser phone 30.

If the VP name input according to S244 has been the real name B13P of the VP, the IC terminal 19V for the VP storing the electronic certificate for this real name outputs the stored electronic certificate to the browser phone 30. If the VP name input according to S244 has been the trap type VP name, on the other hand, the IC terminal 19V for the VP stores no electronic certificate for the trap type VP name. The electronic certificate for the trap type VP name is stored in the XML store 50, as hereinabove described. In this case, therefore, the IC terminal 19V for the VP outputs an instruction for ordering the electronic certificate to the XML store 50 to the browser phone 30.

When receiving some answerback from the IC terminal 19V for the VP after outputting the request of S244 to the IC terminal 19V for the VP, the browser phone makes a determination of YES through S245 and the control advances to S605. At S605, the browser phone determines whether or not this has been the instruction for ordering the electronic certificate to the XML store 50 for advancing to S246 if this has not been the order instruction, while the control advances to S606 if this has been the order instruction. At S606, the browser phone accesses the XML store 50 for retrieving the electronic certificate corresponding to the trap type VP name and advances to S246 for performing processing of transmitting the order information OI, the payment instruction PI, the output D(KS)(MD) as the signature and the electronic certificate for the VP to the member store 6. The member store 6 confirms the information and transmits a purchase approval answer for approving the purchase request of the user to the browser phone 30 of the user. Then, the browser phone makes a determination of YES through S247 and advances to S248 for displaying completion of transaction.

When making determination of NO through S238, the browser phone advances to S249 for determining whether or not a reload sum use operation has been made. If the user makes a keyboard operation for using the reload sum stored in the IC terminal 19V for the VP, the control advances to S250 for displaying an instruction for input of the used sum on the display of the browser phone 30. When the user inputs the used sum from the keyboard, the browser phone makes a determination of YES through S251 and advances to S252 for performing processing of transmitting a payment request for the input used sum G to the IC terminal 19V for the VP.

When receiving the payment request, the IC terminal 19V for the VP subtracts/updates the reload sum by the used sum G and sends back a signal indicating completion of payment to the browser phone 30, as described later. Then, the browser phone makes a determination of YES through S252a and advances to S252b for performing G payment processing.

The settlement processing for the RP is processing having contents substantially identical to those of the aforementioned settlement processing for the VP, and hence illustration and redundant description are omitted.

Figure 36A:
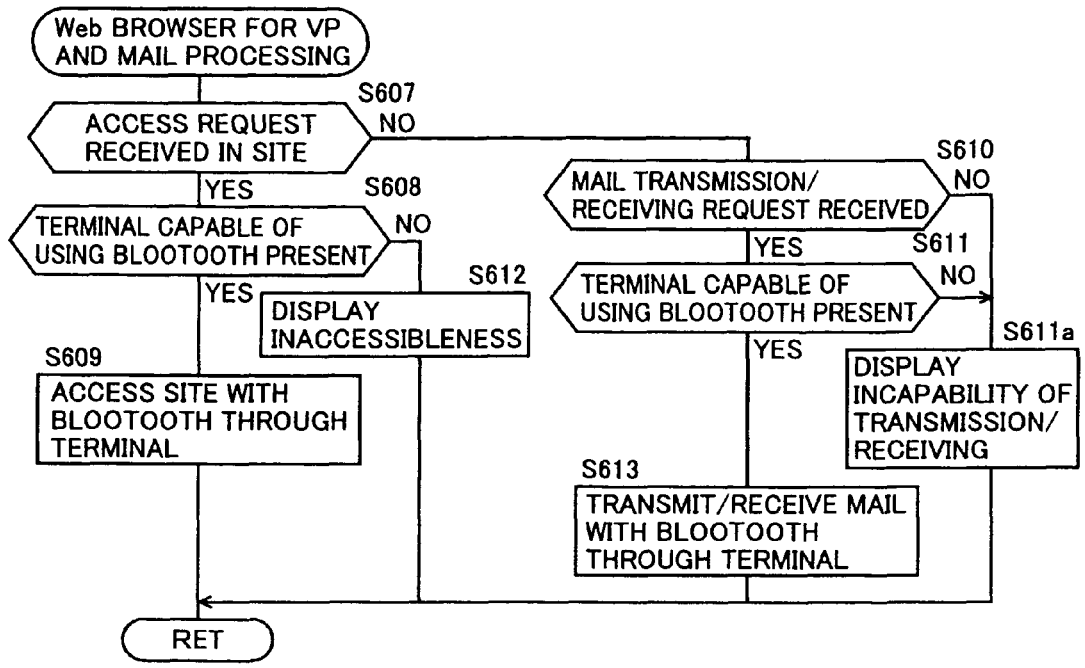
FIG. 36A is a flow chart showing a subroutine program of Web browser and mail processing for the VP, and Zu 36B is a flow chart showing a subroutine program of false RP access processing.

FIG. 36A is a flow chart showing a subroutine program of the Web browser and mail processing for the VP shown in S58. The browser phone determines whether or not a request for accessing the site has been received through S607. If no request has been received, the browser phone determines whether or not a request for transmitting a mail has been received. If no request has been received, the browser phone terminates this subroutine program.

If the user manipulates the keyboard 77 of the browser phone 30 and makes an operation of accessing the site, the browser phone makes a determination of YES through S607 and the control advances to S608. At S608, the browser phone determines whether or not a terminal capable of using Bluetooth (Bluetooth) is present in the vicinity. The browser phone 30 is normally equipped with Bluetooth, which is the code name of a near radio communication interface of about 10 meters. When determining that there is no terminal connected to a broadband/large capacity relay network 43 and capable of using Bluetooth within a radius of 10 meters through S608, the control advances to S612 for performing processing of displaying inaccessibility on the display 76 of the browser phone 30. If there is a terminal capable of using Bluetooth, on the other hand, the browser phone advances to S609 for performing processing of accessing the site through the terminal with Bluetooth.

When connecting the IC terminal 19V for the VP to the browser phone 30 and accessing the site from the browser phone 30 as the VP, the user accesses the site not through the base station 55 for portable telephones, the portable telephone network 45 and the gateway 53 but through the terminal connected to the broadband/large capacity relay network. This is because there is an apprehension that the current position is deduced with the clue of the radio waves transmitted from the browser phone 30. The browser phone 30, which is set to deduce the base station 55 nearest to the location of the browser phone 30 and transmit talking radio waves from this base station 55 in order to implement telecommunication between browser phones 30, is so constituted that positional information of the browser phone 30 can be specified. When employing such a browser phone 30 whose position is deducible to some extent and utilizing the browser phone 30 as the RP or accessing the site as the VP, there is an apprehension that it is statistically traced that a certain RP and a certain VP are regularly present on the same position and it is revealed that the RP and the VP are the same person.

When acting on the network as the VP with the browser phone 30, therefore, the user utilizes Bluetooth to enter the network through the terminal connected to the broadband/large capacity relay network 43 without utilizing the portable telephone network 54.

When the user manipulates the keyboard 77 of the browser phone 30 and makes a request for transmitting/receiving an E-mail, on the other hand, the browser phone makes a determination of YES through S610 and the control advances to S611 for determining whether or not a terminal capable of using Bluetooth is in the vicinity. The browser advances to S611a if there is no such terminal, performs control of displaying incapability of transmission/receiving of E-mails on the display part 76 and thereafter terminates this subroutine program. If a terminal capable of using Bluetooth is present in the vicinity, on the other hand, the control advances to S618 for performing processing of transmitting/receiving an E-mail with Bluetooth through the terminal.

Figure 36B:
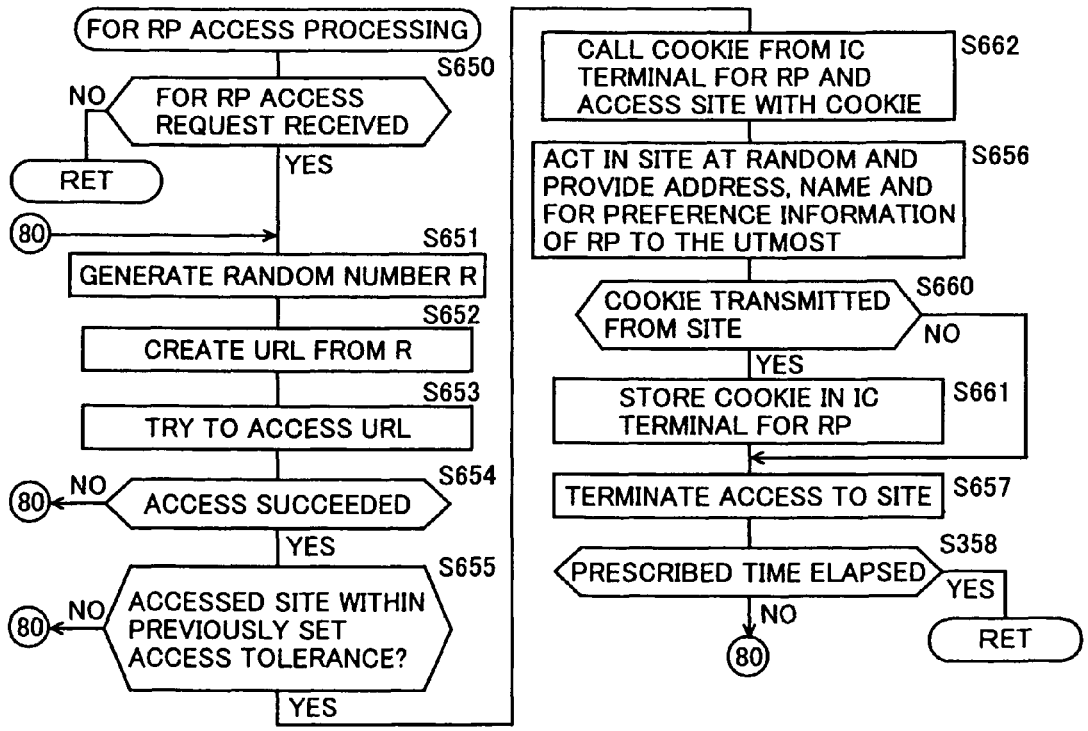

FIG. 36B is a flow chart showing a subroutine program of the false RP access processing shown in S584. When the user frequently acts on the network as the VP, there is an apprehension of occurrence of such inconvenience that a trader collecting detailed private information of the RP and the VP thoroughly matches the private information, deduces the RP name and the VP name having matching private information and predicts the name of the RP corresponding to the VP. As one solving method therefor, it is conceivable to reduce reliability of the private information of the RP. The false RP access processing automatically performs an operation of wandering from site to site at random with the name of the RP.

The browser phone determines whether or not a false RP access request has been received through S650, and terminates this subroutine program if no request has been received. When the user manipulates the keyboard 77 of the browser phone 30 and makes a false RP access request, the control advances to S651 for performing processing of generating a random number R. Then, the browser phone performs processing of creating a URL (Uniform Resource Locator) from this random number R. Then, the browser phone performs processing of trying to access the URL through S653. Then, the browser phone determines whether or not this access has succeeded through S654. This URL has been generated at random with the random number, and a site necessarily corresponding to the URL is not necessarily present. If there is no corresponding site, therefore, the browser phone makes a determination of NO through S654 and the control returns to S651 again for repeating the processing of S651 to S653.

When there has been a site corresponding to the URL generated at random through the circle of this loop of S561 to S564, the browser phone makes a determination of YES through S654 and advances to S655 for determining whether or not the site to be accessed is within previously set access tolerance. The use inputs/sets tolerance for allowing access with respect to the user agent stored in the IC terminal 19R for the RP, for example. He/she inputs/sets the access tolerance for allowing those other than sites related to the entertainment and amusement trades, for example. At S655, the browser phone performs processing of enquiring whether or not the site to be accessed is within the previously input/set access tolerance to the user agent stored in the IC terminal 19R for the RP connected to the browser phone 30. If the site is not within the access tolerance, the control returns to S651 again for trying to generate a URL with a random number and accessing the URL again.

If determining that the site is within the access tolerance through S655, the control advances to S662 for performing processing of calling a cookie from the IC terminal 19R for the RP and accessing the site with the cookie.

Then, the control advances to S656 for performing processing of accessing the site while acting at random in this site and providing the address and the name of the RP and false preference information to the site to the utmost. The browser phone performs this processing in association with the user agent in the IC terminal 19R for the RP connected to the browser phone 30. Then, the control advances to S660 for determining whether or not a cookie has been transmitted from the site. The control advances to S657 if no cookie has been transmitted, while the control advances to S661 if a cookie has been transmitted for performing processing of storing the transmitted cookie in the IC terminal 19R for the RP and thereafter advances to S657.

Then, the browser phone performs processing of terminating the access to the site through S657 and determines whether or not a prescribed time has elapsed through S658 for returning to S651 again if the prescribed time has not yet elapsed while terminating this subroutine program when determining that the prescribed time has elapsed.

Also when the user accesses the site as the RP, the browser phone may automatically transmit the address, the name and the E-mail address of the RP to the site in response to a transmission request for the address, the name and the E-mail address from the site similarly to FIG. 28A. At this time, the browser phone may transmit the address, the name and the E-mail address of the RP on condition that a user confirmation operation has been made.

Figure 37B:
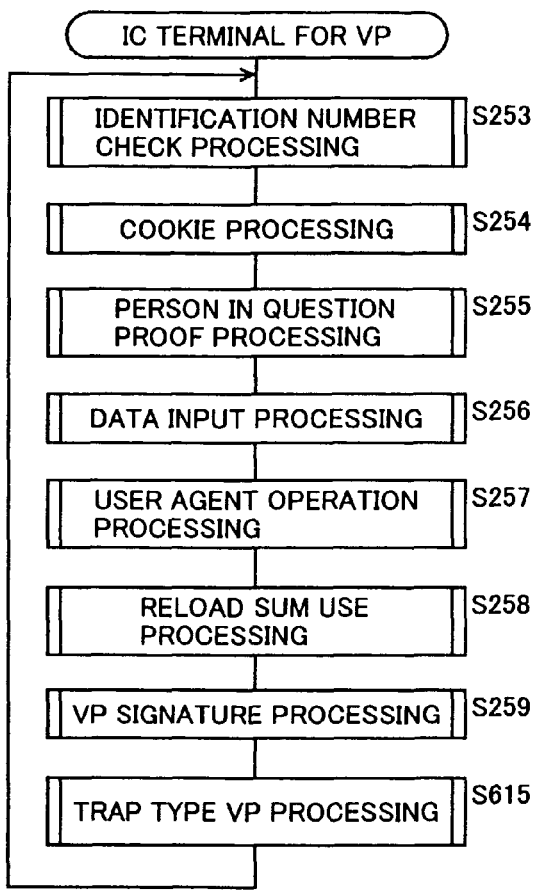
FIG. 37A is a flow chart showing processing operations of the IC terminal for the VP, and Zu 37B is a flow chart showing processing operations of an IC terminal for the RP.
Figure 37A:
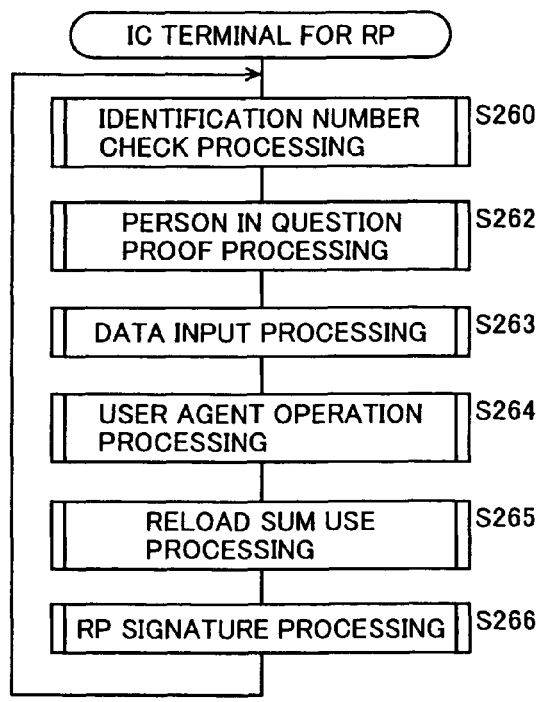

Referring to FIG. 37A, the IC terminal 19V for the VP performs identification number check processing through S253. Then, the IC terminal advances to S254 for performing cookie processing. Then, the IC terminal advances to S255 for performing person in question proof processing. Then, the IC terminal advances to S256 for performing data input processing. Then, the IC terminal advances to S257 for performing user agent operation processing. Then, the IC terminal advances to S258 for performing reload sum use processing. Then, the IC terminal advances to S259 for performing signature processing. Then, the IC terminal performs trap type VP processing through S615. This processing is described later with reference to FIG. 41.

Referring to FIG. 37B, the IC terminal 19R for the RP performs identification number check processing through S260, performs person in question proof processing through S262, performs data input processing through S263, performs user agent operation processing through S264 and performs reload sum use processing through S265. Then, the IC terminal advances to S266 for performing signature processing.

Figure 38A:
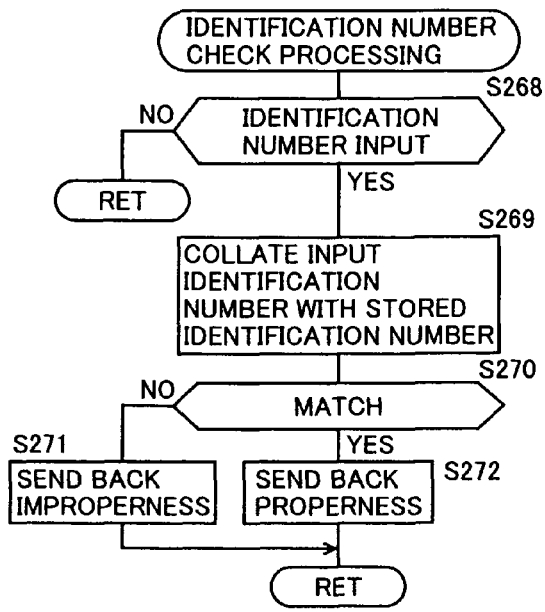
FIG. 38A is a flow chart showing a subroutine program of identification number check processing.

FIG. 38A is a flow chart showing a subroutine program of the identification number check processing shown in S253 and S260. The IC terminal determines whether or not the identification number has been input through S268 and terminates the subroutine program as such if the same has not been input. If the identification number is input, on the other hand, the IC terminal advances to S269 for performing processing of collating the input identification number with the stored identification number. Then, the IC terminal advances to S270 for determining whether or not the numbers match with each other as a result of collation and advances to S271 if the numbers mismatch with each other for performing processing of transmitting improperness to the browser phone 30. If the numbers match with each other, on the other hand, the IC terminal advances to S272 for sending back properness.

Figure 38B:
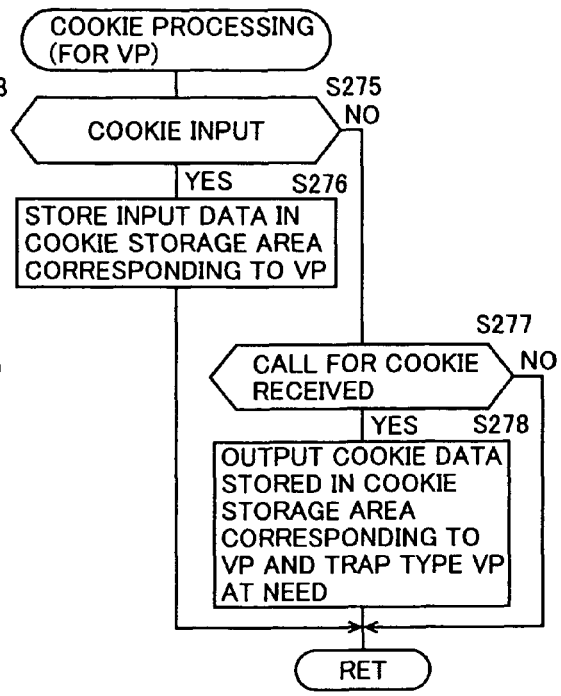
FIG. 38B is a subroutine program of cookie processing (for the VP), Zu 38C is a flow chart showing a subroutine program of person in question proof processing (for the VP), and Zu 38D is a flow chart showing a subroutine program of person in question proof processing (for the RP).

FIG. 38B is a flow chart showing a subroutine program of the cookie processing (for the VP) shown in S254. The IC terminal determines whether or not a cookie is input through S275. If the browser phone 30 has a record of a cookie when the IC terminal 19V for the VP is connected to the browser phone 30, the recorded cookie data is transmitted to the IC terminal 19V for the VP as hereinabove described (see S118). Also when the user accesses the site with the browser phone 30 and the site transmits a cookie, the browser phone transmits the transmitted cookie data to the IC terminal 19V for the VP (see S123). When the cookie is transmitted through S118 or 123, the IC terminal 19V for the VP makes a determination of YES through S275 and advances to S276 for performing processing of storing the input cookie data in the cookie storage area corresponding to the VP name.

When making a determination of NO through S275, on the other hand, the IC terminal advances to S277 for determining whether or not a cookie is called. When accessing the site with the browser phone 30, the user calls a cookie from the IC terminal 19V for the VP and accesses the site with the cookie (see S121). When the processing for calling the cookie is performed, the IC terminal makes a determination of YES through S277 and advances to S278 for performing processing of outputting the cookie data stored in the cookie storage area corresponding to the VP name and the trap type VP name at need to the browser phone 30.

Figure 38C:
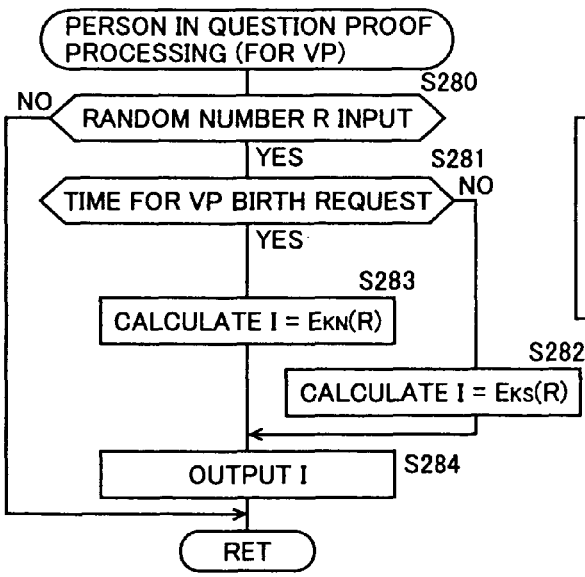

FIG. 38C is a flow chart showing a subroutine program of the person in question processing (for the VP) shown in S255. The IC terminal determines whether or not a random number R has been input through S280 and terminates this subroutine program if no random number has been input. The IC terminal advances to S281 if the random number R has been input, for determining whether or not it is a VP birth request time. If it is a VP birth request time, it is necessary to prove that the RP is the legal person in question with the authentication key KN of the RP, as described with reference to S6 and S151. Therefore, the IC terminal advances to S283 if it is the VP birth request time, for performing processing of encrypting the input random number R with the authentication key KN of the RP and generating I, i.e., processing of calculating I=EKN (R). The IC terminal performs processing of outputting the calculated I to the browser phone 30 through To 284.

If it is not the VP birth request time, on the other hand, the IC terminal makes a determination of NO through S281 and advances to S282 for performing processing of encrypting the input random number R with the secret key KS of the VP for calculating I, i.e., processing of calculating I=ESK(R) in order to prove that the VP is the legal person in question. The IC terminal performs processing of outputting the calculated I to the browser phone 30 through S248.

Figure 38D:
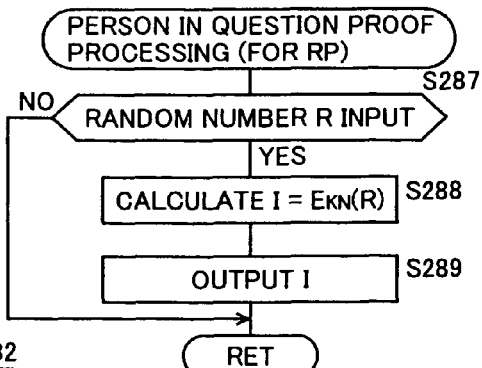

FIG. 38D is a flow chart showing a subroutine program of the person in question proof processing (for the RP) shown in S262. The IC terminal determines whether or not a random number R has been input through S287, and terminates this subroutine program if no random number has been input. If the random number has been input, on the other hand, the control advances to S288 for performing processing of encrypting the input R with the authentication key KN stored in the IC terminal 19R for the RP and calculating I, i.e., processing of calculating I=EKN(R). Then, the IC terminal advances to S289 for performing processing of outputting the calculated I to the browser phone 30.

Figure 39A:
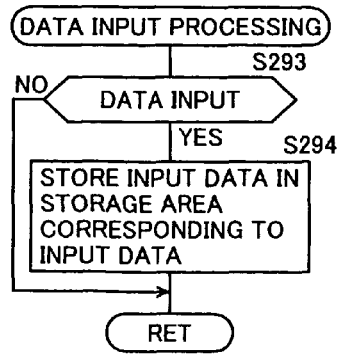
FIG. 39A is a flow chart showing a subroutine program of data input processing.

FIG. 39A is a flow chart showing a subroutine program of the data input processing shown in S256 and S263. The IC terminal determines whether or not data input has been made through S293. The input data includes record data of a CD-ROM recording data related to the VP created by the VP management server 9, the knowledge data of the user agent (see S179 and S189), the charged sum G (see S181 and S191) etc., as hereinabove described. When these data are input, the control advances to S294 for performing processing of storing the input data in the storage area corresponding to the input data.

Figure 39B:
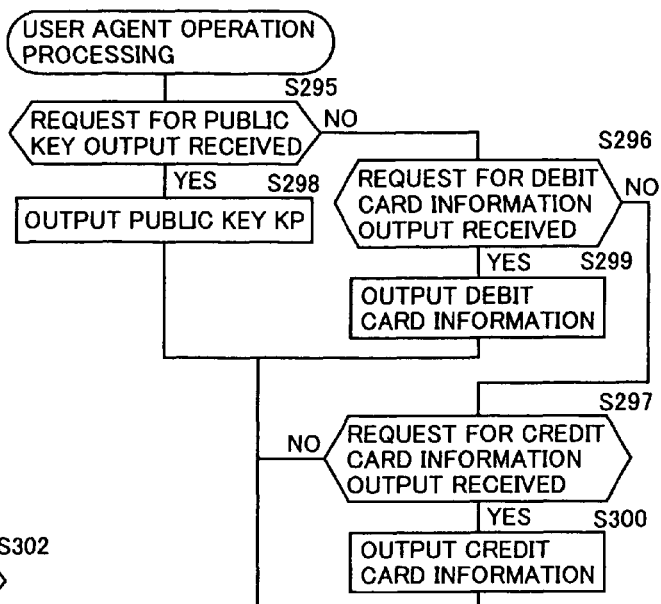
FIG. 39B is a flow chart showing a subroutine program of user agent operation processing.

FIG. 39B is a flow chart showing a subroutine program of the user agent operation processing shown in S257 and S264. The IC terminal determines whether or not a public key output request has been received through S295. When the output request for the public key has been received, the IC terminal advances to S298 for performing processing of outputting the stored public key KP. When making a determination of NO through S295, the IC terminal advances to S296 for determining whether or not an output request for debit card information has been received. If the same has been received, the IC terminal advances to S299 for performing processing of outputting the stored debit card information.

When making a determination of NO through S296, the IC terminal advances to S297 for determining whether or not an output request for credit card information has been received. If the request has been received, the IC terminal advances to S300 for performing processing of outputting the stored credit card information. Then, the IC terminal advances to S301 for performing other operation processing. This other operation processing is described later with reference to FIG. 40.

Figure 39C:
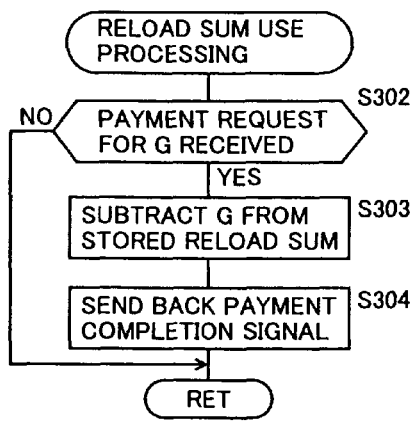
FIG. 39C is a flow chart showing a subroutine program of reload sum use processing.

FIG. 39C is a flow chart showing a subroutine program of the reload sum use processing shown in S258 and S265. The IC terminal determines whether or not a request for remitting the charged sum G has been received through S302, and terminates this subroutine program if no request has been received. If the request has been received, the IC terminal advances to S303 for performing processing of subtracting G from the stored reload sum and advances to S304 for performing processing of sending back a payment completion signal.

Figure 39D:
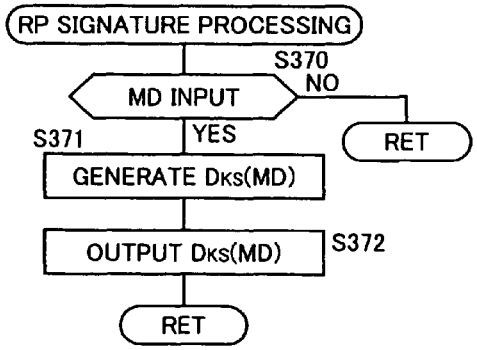
FIG. 39D is a flow chart showing a subroutine program of RP signature processing.

FIG. 39D is a flow chart showing a subroutine program of the signature processing shown in S259 and S266. The IC terminal determines whether or not the message digest MD has been input through S370, and terminates this subroutine program if the same has not been input. If the MD is transmitted to the IC terminal through S244 or the like, on the other hand, the IC terminal makes a determination of YES through S370 and advances to S371 for performing processing of decoding the input message digest MD with the secret key KS and generating an electronic signature. Then, the IC terminal advances to S372 for performing processing of outputting the electronic signature DSK(MD).

Figure 39E:
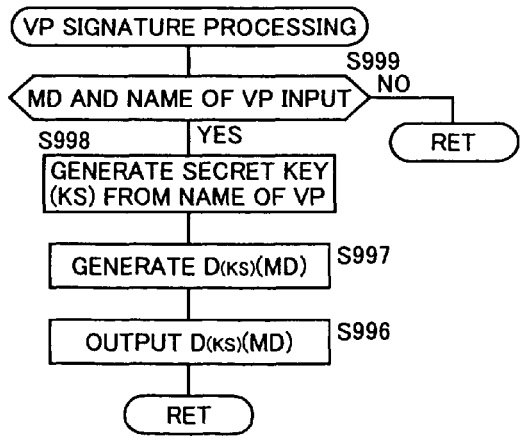
FIG. 39E is a flow chart showing a subroutine of VP signature processing.

FIG. 39E is a flow chart showing a subroutine program of the VP signature processing shown in S259. The IC terminal determines whether or not the message digest MD and the VP name have been input from the browser phone 30, and terminates this subroutine program if the same have not been input.

If the MD and the VP name have been input, the control advances to S998 for performing processing of generating a secret key (KS) from the input VP name. More specifically, the IC terminal 19V for the VP makes retrieval in the cookie data storage area on the basis of the input VP name to deduce how many times the real name 13P (see FIG. 11) has been encrypted for the input VP name. The IC terminal encrypts the secret key of the VP with the secret key of the VP by the deduced encryption count and generates the secret key (KS).

Then, the control advances to S997 for performing processing of decoding the message digest MD with the secret key (KS) and generating a double signature. Then, the control advances to S998 for performing processing of outputting the double signature D(KS)(MD) to the browser phone 30.

Figure 40:
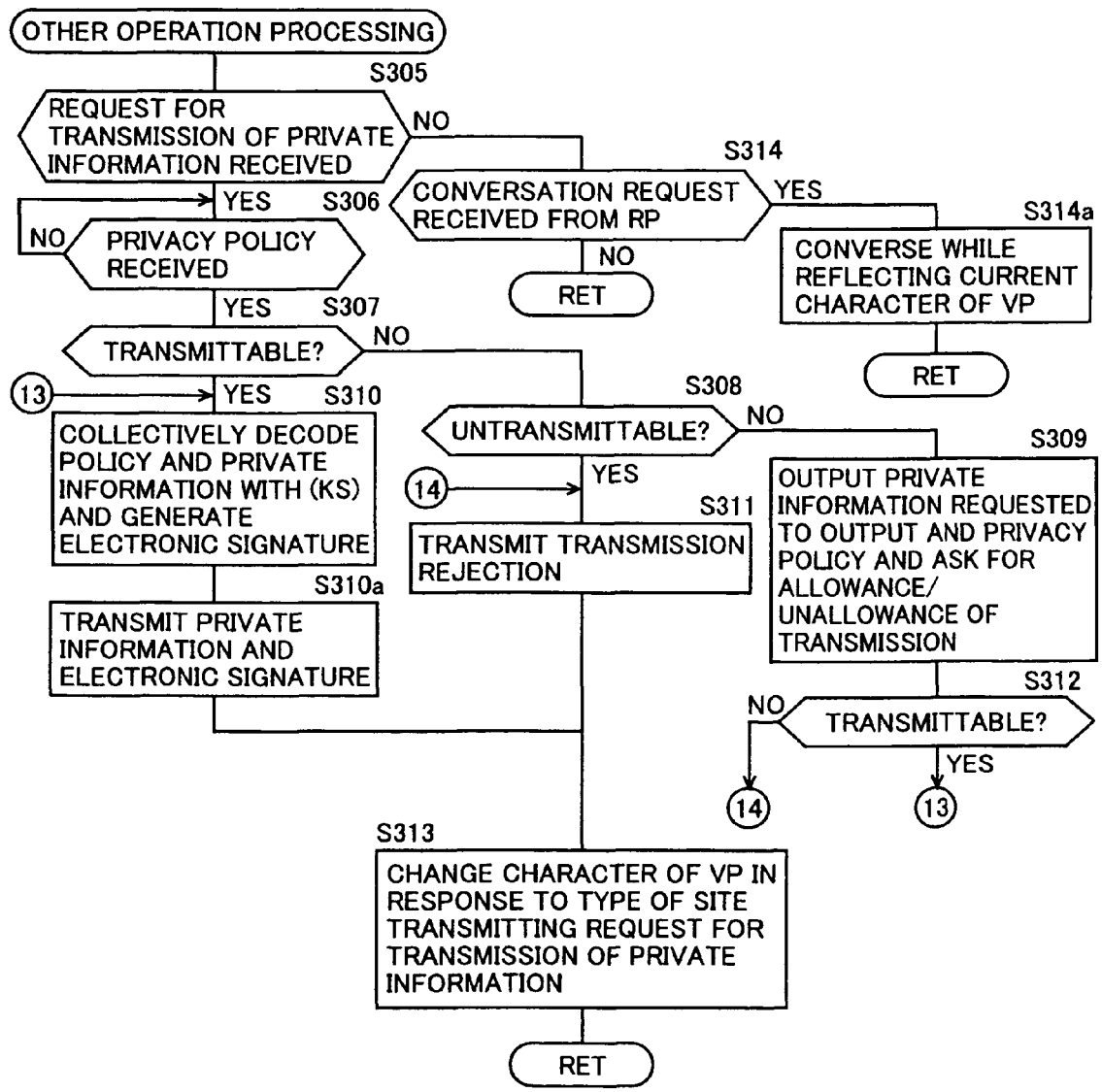
FIG. 40 is a flow chart showing a subroutine program of other operation processing.

FIG. 40 is a flow chart showing a subroutine program of the other operation processing described in S301. The IC terminal determines whether or not a transmission request for private information has been received through S305. This private information denotes the knowledge data for the user agent shown in FIG. 10, and denotes the private information such as the age, the occupation, various preference information and the family structure, for example. The IC terminal processes the address, the name and the E-mail address of the VP through S700 and S701. When the user accesses the member store 6, the life support center 8 or other various sites, the site may request the private information. When receiving a request for the private information, the control advances to S306 for determining whether or not a privacy policy has been received. When requesting the private information, the site transmits a privacy policy explicitly showing the object of collecting the private information, the range of utilization etc. to the user. When receiving this privacy policy, the control advances to S307 for determining whether or not the private information is transmittable.

As to this determination, the user previously inputs/sets in whatever case the private information is transmittable in the IC terminal 19R or 19V, which in turn makes a determination on the basis of the input/set data. When making a determination of YES through S307 on the basis of the type of the private information for which the transmission request has been made or the contents of the privacy policy, the IC terminal advances to S310 for performing processing of collectively decoding the privacy policy and the private information with the secret key KS of the IC terminal 19R or 19V and generating an electronic signature. Then, the IC terminal advances to S310 for performing processing of transmitting the requested private information and the electronic signature to the site.

Then, the control advances to S313 for performing processing of changing the character of the VP in response to the type of the site transmitting the transmission request for the private information. The IC terminal 19V for the VP stores a program as the user agent, while storing a program, frequently employed in the field of game software, of varying the character of the VP with the type of the site accessed by the user. When the user frequently accesses an academic site as the VP, for example, the character of the VP becomes intelligent and scholarly. When the user frequently accesses a site related to the entertainment and amusement trades, for example, the character of the VP becomes dissolute and broken.

When making a determination of NO through S307, the IC terminal advances to S308 for determining whether or not the required private information cannot be output, and advances to S311 when determining that the same cannot be output for performing processing of transmitting transmission rejection to the site and thereafter advancing to S313.

When the user agent stored in the IC terminals 19R and 19V cannot determine whether the private information can be or cannot be transmitted, the control advances to S309 for performing processing of outputting the private information for which the output request has been made and the privacy policy to the display of the browser phone 30 and asking the user him/herself for approval/disapproval of transmission. The user observing the display inputs whether or not the private information is transmittable from the keyboard. The IC terminal makes a determination of YES through S312 and advances to S310 if transmittability is input, while making a determination of NO through S312 and advances to S311 if inhibition of transmission is input.

When making a determination of NO through S305, the IC terminal advances to S314 for determining whether or not a conversation request has been received from the RP who is the user. When the user wishes to talk with the VP (user agent for the VP), he/she inputs an operation for requesting conversation from the keyboard. Then, the IC terminal makes a determination of YES through S314 and advances to S314a, for enabling conversation while reflecting the current accuracy of the VP.

Figure 41:
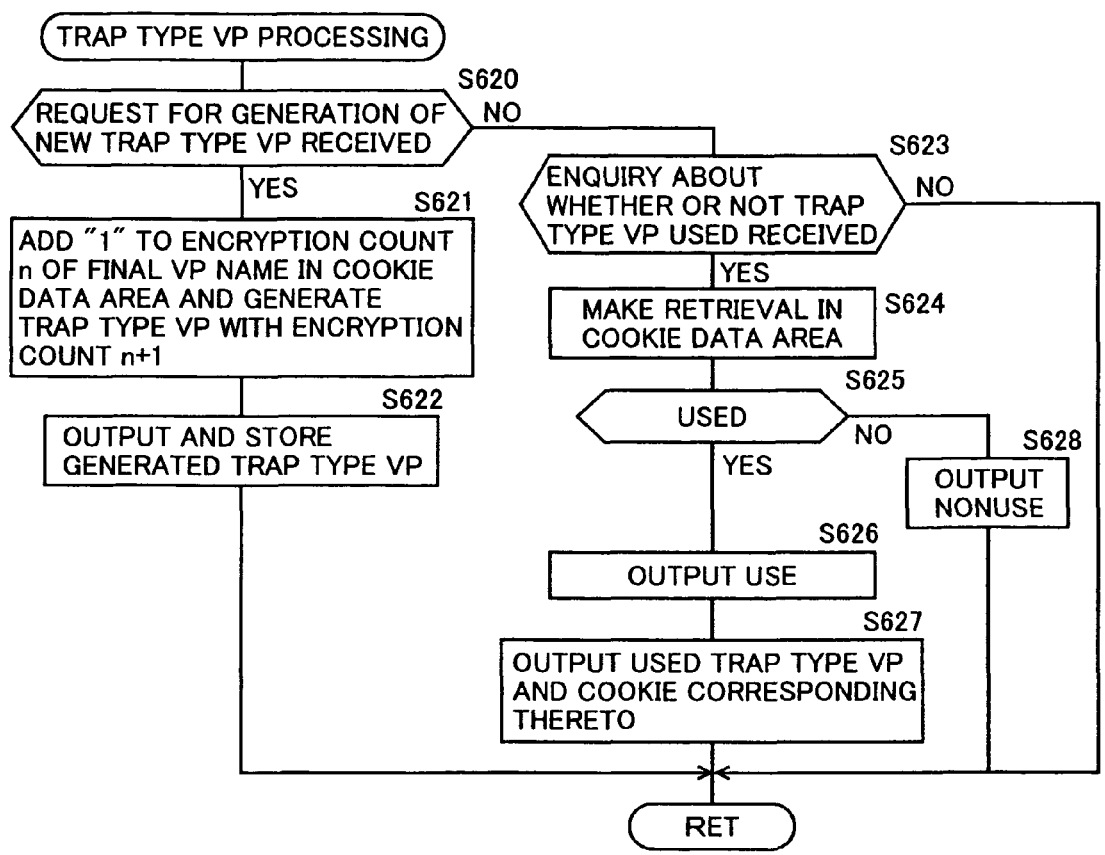
FIG. 41 is a flow chart showing a subroutine program of trap type VP processing.

FIG. 41 is a flow chart showing a subroutine program of the trap type VP processing shown in S615. The IC terminal determines whether or not a request for generation of a new trap type VP has been received through S620 and advances to S623 if no request has been received for determining whether or not there has been enquiry about whether or not the trap type VP is already used and terminating this subroutine program if no enquiry has been received.

When the browser phone 30 issues a request for generation of a new trap type VP to the IC terminal 19V for the VP according to S598, the IC terminal makes a determination of YES through S620 and the control advances to S621. At S621, the IC terminal performs processing of adding "1" to the encryption count n for the final VP name in the cookie data area of the IC terminal 19V for the VP and encrypting the real name of the VP with the secret key by n+1 times for generating a new trap type VP name. In the case of FIG. 11, for example, the encryption count for the final VP name E3(B13P) in the cookie data area is 3, and the IC terminal performs processing of adding "1" thereto for setting the encryption count to 4 and encrypting the real name B13P of the VP four times for generating a new trap type VP name E4(B13P).

Then, the IC terminal advances to S622 for performing processing of outputting the generated trap type VP to the browser phone 30 while storing the same in a space area.

When the browser phone 30 makes enquiry about whether or not a trap type VP has already been used for the site to be accessed at present to the IC terminal 19V for the VP according to S590, the IC terminal makes a determination of YES through S623 and the control advances to S624. At the time of this enquiry, the browser phone 30 also transmits the name of the site to be accessed at present to the IC terminal 19V for VP. At S624, the IC terminal performs processing of making retrieval in the cookie data area (see FIG. 11). The control advances to S625, for determining whether or not a trap type VP name has already been used for the transmitted site name. If the site name transmitted from the browser phone 30 is MEC, for example, it is understood that the trap type VP name E2(B13P) has already been used with reference to FIG. 11.

When determining that the trap type VP name has already been used, the control advances to S626 for outputting that the same has already been used to the browser phone 30 while performing processing of outputting the used trap type VP and cookie data corresponding thereto to the browser phone 30 through S627. In the case of FIG. 11, for example, the IC terminal outputs E2(B13P) to the browser phone 30 as the trap type VP while outputting cookie data mec to the browser phone 30 if the transmitted site name is MEC.

When no trap type VP has yet been used for the site name transmitted form the browser phone 30 as a result of retrieval in the cookie data area of FIG. 11, the IC terminal makes a determination of NO through S625 and the control advances to S628 for performing processing of outputting nonuse to the browser phone 30.

Figure 42:
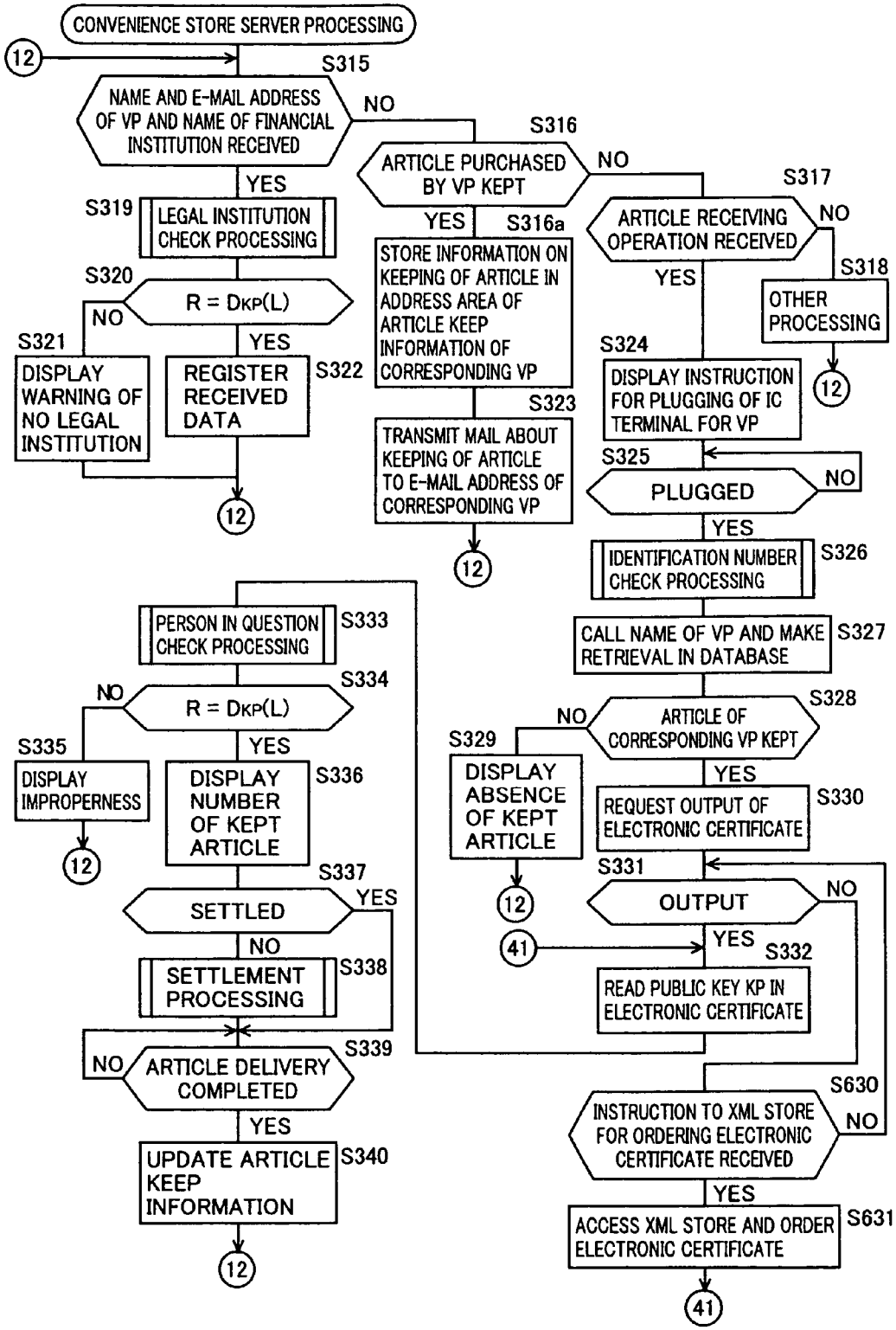
FIG. 42 is a flow chart showing processing operations of a convenience store server.

FIGS. 42 and 43 are flow charts for illustrating processing operations of the server 16 of the convenience store 2. The server determines whether or not the name and the E-mail address of the VP and the name of the financial institution have been received through S315, advances to S316 when the same have not been received for determining whether or not the store has kept an article purchased by the VP, advances to S317 when keeping no article for determining whether or not an article receiving operation has been made, advances to S318 if no operation has been made for performing other processing, and thereafter returns to S315.

If the settlement server 10 transmits the name and the E-mail address of the created VP and the name of the corresponding financial institution to the convenience store 2 (see S18) in the process of the cycle of this loop of S315 to S318, the server makes a determination of YES through S315, advances to S319 for performing legal institution check processing and thereafter advances to S320.

The server determines whether or not R is equal to DKP(L) at S320 for making a determination of NO if this is not a legal institution and advances to S321 for displaying a warning about no legal institution. If this is a legal institution, on the other hand, the server makes a determination of YES through S320 and advances to S322 for performing processing of registering received data in the database 17.

When the user has made electronic shopping, for example, as the VP, the purchased article has been delivered to the convenience store 2 set as the address of the VP and the convenience store 2 has kept the article, the server makes a determination of YES through S316 and advances to S316a for performing processing of storing information on keeping of the article in an address area of article keep information for the corresponding VP. At this time, the server also stores information as to whether or not payment for this article has been completed. Then, the control advances to S323 for performing processing of deducing the E-mail address of this VP and transmitting a mail stating that the article has been kept to the E-mail address. The VP can recognize that the purchased article has been delivered to the convenience store by reading the E-mail and goes to the convenience store for receiving the article.

When the user goes to the convenience store 2 as the VP and makes an operation for receiving the delivered article, the server makes a determination of YES through S317. The control advances to S324 for displaying an instruction for inserting the IC terminal 19V for the VP. The user observing the same inserts and connects his/her IC terminal 19V for the VP into and to the USB port of the terminal 73. Then, the server makes a determination of YES through S325 and advances to S326 for performing identification number check processing. The user inputs the identification number for the VP from a keyboard provided on the terminal 73. The control advances to S327 on condition that the identification number matches and is proper, for performing processing of calling the name for the VP from the connected IC terminal 19V for the VP and making retrieval in the database 17 on the basis thereof. Then, the server determines whether or not the address area for the article keep information of the corresponding VP records article keep information through S328. If there is no article keep information, the server advances to S329 for displaying that no article is kept. If there is article keep information, on the other hand, the server advances to S330 for issuing an output request for an electronic certificate to the IC terminal 19V for the VP. The IC terminal 19V for the VP receiving the request outputs the stored electronic certificate to the server 16. Then, the server makes a determination of YES through S331, advances to S332 for reading the public key KP in the output electronic certificate and performs person in question check processing through S333.

The inserted IC terminal 19V for the VP stores the electronic certificate for the real name of the VP but stores no electronic certificate for the trap type VP as hereinabove described, and the electronic certificate for the trap type VP is stored in the XML store 50. When the user makes electronic shopping or the like with the real name of the VP and the purchased article is delivered to the convenience store 2, the name of the VP called according to S327 is the real name of the VP. In this case, the IC terminal 19V for the VP can output the electronic certificate in response to the request through S330. In this case, the server makes a determination of YES through S331 and the control advances to S332. When the user makes electronic shopping with the name of the trap type VP and the purchased article is delivered to the convenience store 2, on the other hand, it follows that he/she goes to the convenience store 2 for receiving the article as the trap type VP. In this case, the name of the VP called from the IC terminal 19V for the VP through S327 is the name of the trap type VP. Consequently, the server issues an output request for the electronic certificate corresponding to the name of the trap type VP to the IV terminal 19V for the VP through S330. In this case, the IC terminal 19V for the VP outputs an instruction for getting the electronic certificate from the XML store 50.

When receiving this output, the control advances to S631 for performing processing of accessing the XML store 50 for getting the corresponding electronic certificate and thereafter the control advances to S332.

Then, the server advances to S334 for determining whether or not R is equal to DKP(I). In a case of an illegal pretending VP, the server makes a determination of NO through S334 and advances to S335 for displaying improperness. In a case of a proper VP, on the other hand, the control advances to S336 for displaying the number of the kept article and determines whether or not payment has been completed in relation to the article through S337 for advancing to S339 if the payment has been completed while advancing to S338 for performing settlement processing if no payment has yet been completed.

At S339, the server determines whether or not delivery of the article has been completed. The salesperson of the convenience store 2 observes the number of the kept article displayed through S336, finds out the article having the corresponding number, transfers the article to the customer and thereafter performs an article transfer completion operation. Then, the server makes a determination of YES through S339, advances to S340 for updating the address area of the database 17 for the article keep information to a state keeping no article and thereafter returns to S315.

Figure 43A:
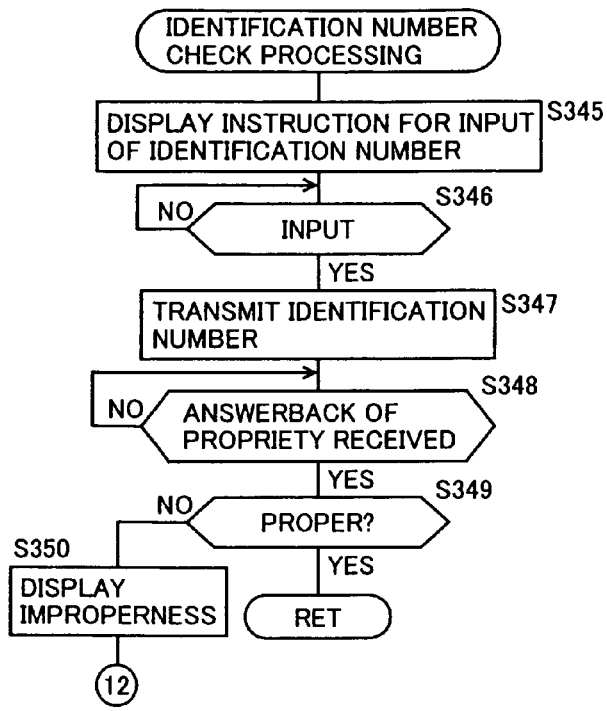
FIG. 43A is a flow chart showing a subroutine program of identification number check processing.

FIG. 43A shows the identification number check processing of S326. The server displays an input instruction for the identification number through S345, advances to S347 when the user inputs the same for transmitting the input identification number to the IC terminal 19V for the VP connected to the server 16, and advances to S349 if a result of determination of propriety of the identification number is sent back from the IC terminal 19V for the VP. The server determines whether or not this is a proper result of determination at S349 for displaying improperness through S350 and returning to S315 if the same is improper while terminating this subroutine so that the control advances to S327 if the same is proper.

Figure 43B:
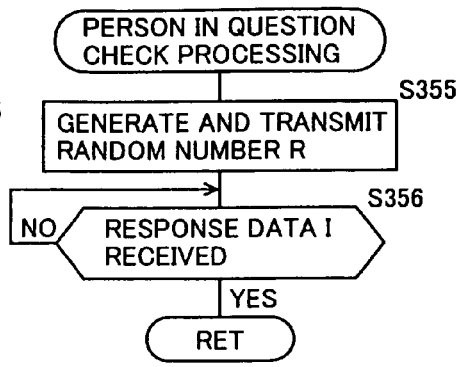
FIG. 43B is a flow chart showing a subroutine program of person in question check processing.

FIG. 43B shows the person in question check processing of S333. The server performs processing of generating a random number R and transmitting the same to the IC terminal for the VP through S355 and waits until the IC terminal for the VP sends back response data I for challenge data R. When I is sent back, the server terminates this subroutine.

Figure 43C:
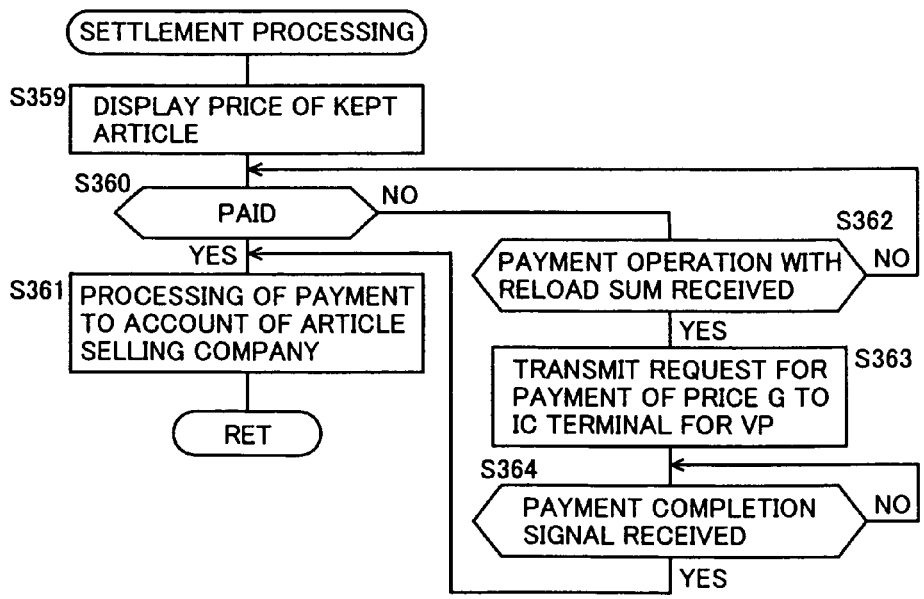
FIG. 43C is a flow chart showing a subroutine program of settlement processing.

FIG. 43C shows the settlement processing of S338. The server performs processing of displaying the price of the kept article through S359 and advances to S360 for determining whether or not payment is made. The server advances to S362 if no payment is made for determining whether or not a payment operation with a reload sum has been made and returns to S360 if no operation has been made. If the user pays in cash and the salesperson of the convenience store makes an operation of the payment, the server makes a determination of YES through S360 and advances to S361 for performing payment processing toward the account of the article selling company and terminating this subroutine program.

When the user performs an operation for making payment with the reload sum stored in the IC terminal 19 for the VP, on the other hand, the server makes a determination of YES through S362 and advances to S363 for performing processing of transmitting a payment request for the price G to the IC terminal 19V for the VP. Then, the server advances to S364 for determining whether or not a payment completion signal has been output from the IC terminal 19V for the VP and waits until the same is output. When receiving the payment completion signal, the server makes a determination of YES through S364 and advances to S361.

Another embodiment is now described. This embodiment is a simple system completing a system of private information protection by a user terminal such as a browser phone 30 or a personal computer of the user, an IC terminal 19 and a Web site. The difference between this embodiment and the aforementioned embodiment resides in that an E-mail address of a trap type VP is identical to an E-mail address for the real name of a VP. Therefore, a financial institution 7 may not transfer an E-mail addressed to the trap type VP. Further, the trap type VP employs a name created by encrypting the name of a site accessed by the trap type VP with a secret key employed for the real name of the VP. The trap type VP also employs an account number and a credit number identical to an account number and a credit number employed by the VP with his/her real name.

Figure 44A:
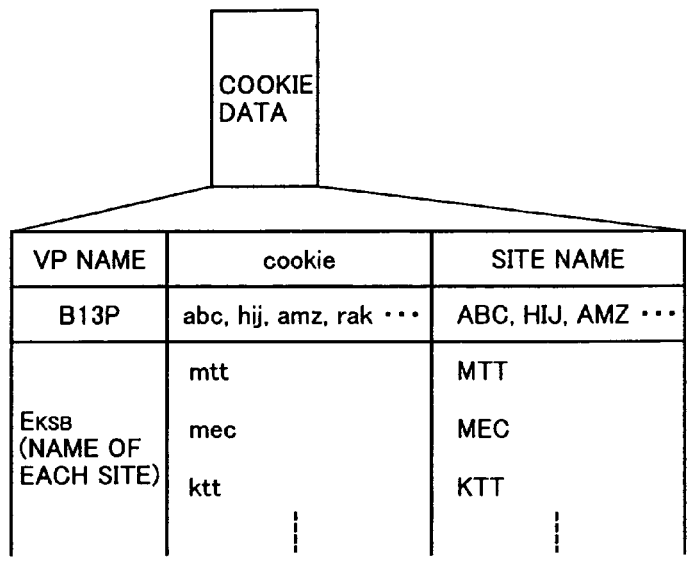
FIG. 44A shows trap information stored in an IC terminal for a VP.

FIG. 44A is a diagram showing information stored in a cookie storage area of an EEPROM 26 of an IC terminal 19V for the VP. This cookie storage area stores only the real name B13P of the VP as the VP name, while storing no trap type VP name. The name of the trap type VP is created by encrypting the site accessed by the trap type VP with the secret key KSB of the VP of the real name. The count of this encryption is not restricted to one but may be a certain set count of at least twice. When storing only the name of the site accessed by the trap type VP, therefore, the name of the trap type VP corresponding to the site name can be calculated according to an operation formula of EKSB(site name) every time at need without storing the same. A secret key for the trap type VP is created by decoding the site name corresponding to the trap type VP with the secret key KSB of the VP of the real name. Therefore, it is not necessary to minutely store a public key and the secret key in the IC terminal 19V for the VP in correspondence to the trap type VP but the same can be calculated according to an operation formula secret key=DKSB(site name) every time at need. Therefore, an XML store 50 may not store "encryption count".

Figure 44B:
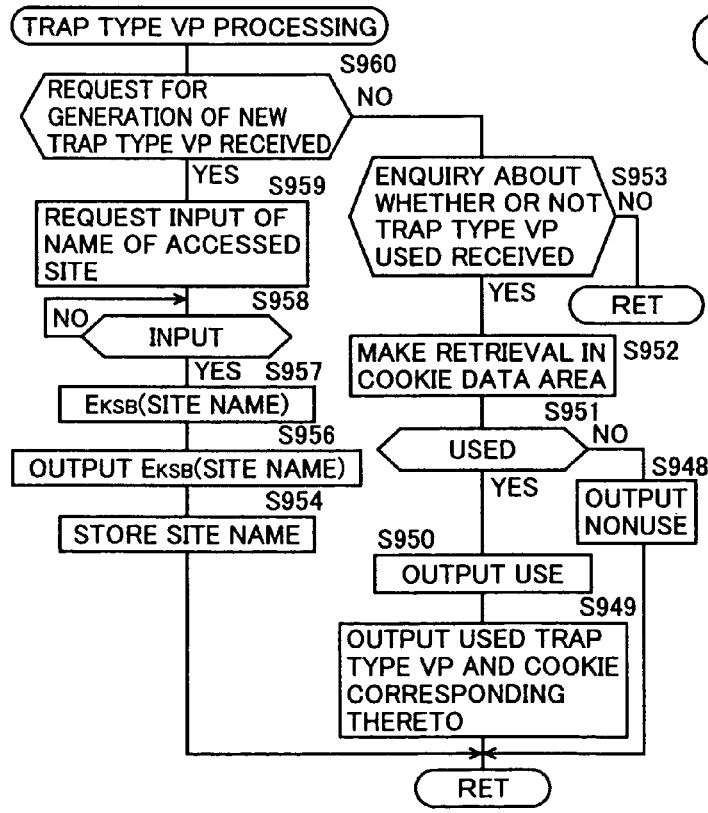
FIG. 44B is a flow chart showing a subroutine program of trap type VP processing.

FIG. 44B is a flow chart showing a subroutine program of trap type VP processing. This subroutine program is another embodiment of the trap type VP processing shown in FIG. 41. The IC terminal determines whether or not a request for generation of a new trap type VP has been received from the browser phone 30 through S960 and the control advances to S959 if the request has been received for issuing an input request for the name of the accessed site to the browser phone 30. When the browser phone 30 transmits the name of the accessed site, the control advances to S957 for performing processing of encrypting the transmitted site name with a secret key KSB of the real name B13P of the VP and calculating EKSB(site name) which is a new trap type VP name. Then, the control advances to S956 for performing processing of outputting the calculated new trap type VP name to the browser phone 30, and performs processing of storing the input site name in a cookie storage area through S954.

S953 to S948 are the same control as S623 to S628 shown in FIG. 41, and hence redundant description is omitted.

Figure 44C:
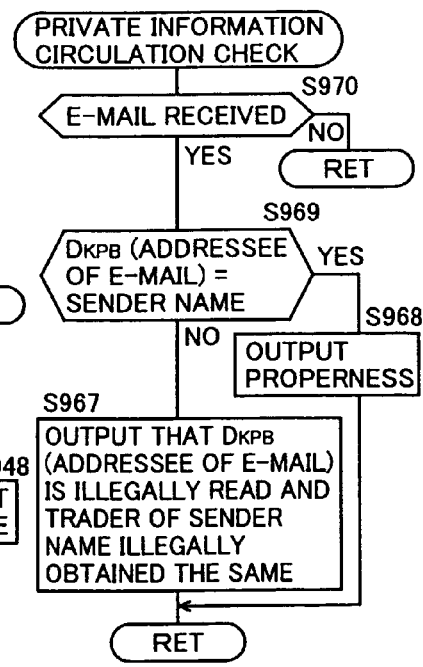
FIG. 44C is a flow chart showing control operations of the IC terminal for the VP.

FIG. 44C is a flow chart showing a subroutine program of private information circulation check performed by the IC terminal 19V for the VP. The IC terminal determines whether or not an E-mail has been received through S970 and terminates this subroutine program if no E-mail has been received. If receiving an E-mail addressed to the trap type VP, the browser phone 30 inputs the E-mail data in the IC terminal for the VP. Then, the control advances to S969 for performing an operation of DKPB(addressee) by decoding the addressee of the input E-mail with a public key KPB employed for the real name of the VP and determining whether or not the result of the operation matches with the name of the sender of the E-mail.

The addressee of the E-mail is the trap type VP name, and this trap type VP name has been created by encrypting the name of the site accessed by the trap type VP with the secret key KSB of the VP. When the site accessed by the trap type VP with this name has transmitted the E-mail to the trap type VP, therefore, the IC terminal must make a determination of YES through S969. In this case, the IC terminal outputs properness to the browser phone 30 through S968, and a display part 76 of the browser phone 30 displays this purport. When a site other than the site accessed by the trap type VP with the name transmits an E-mail addressed to the trap type VP name, on the other hand, the IC terminal makes a determination of NO through S969 and the control advances to S967. At S967, the IC terminal performs processing of decoding the addressee of the E-mail with the public key KPB of the VP of the real name. Consequently, it follows that the trap type VP name which is the addressee of the E-mail is decoded with the public key KPB and a site name of a plaintext is calculated. This site name is the name of the site accessed with the VP name employed for the addressee of the E-mail, and it is conceivable that the accessed site has illegally circulated private information to the sender of the E-mail. Therefore, the IC terminal outputs the purport that DKPB (addressee) has been illegally circulated and illegally obtained by the trader having the name of the sender through S967. The browser phone 30 displays this purport on the display part 76.

When making a determination of NO through S969, the IC terminal may advance to S967 only when making a determination of NO through S949a after performing the aforementioned processing of S494 and S494a of FIG. 17.

Figure 45:
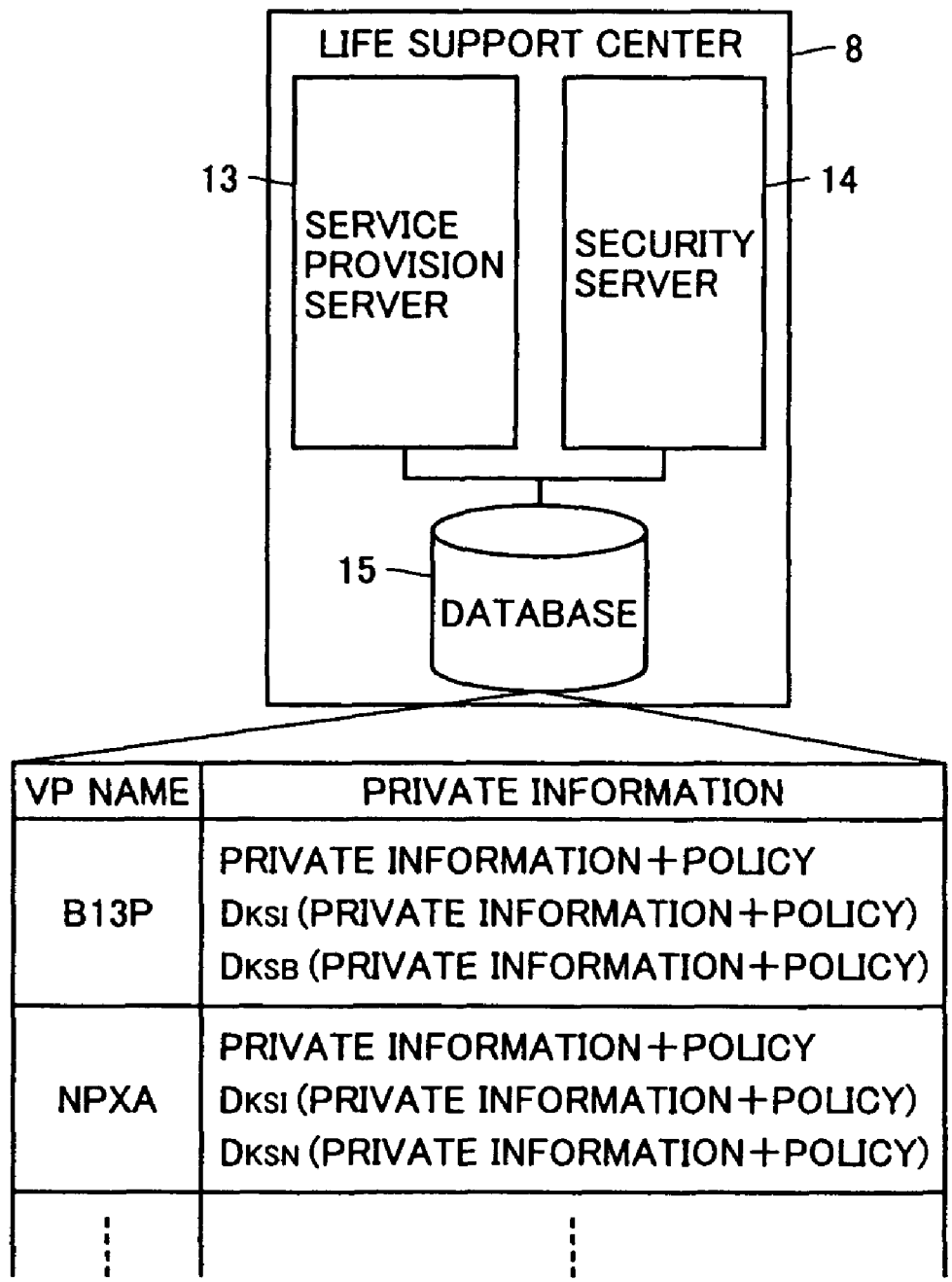
FIG. 45 is a diagram showing the structure of a life support center.

In the life support center 8 shown in FIG. 1, a service provision server 13 and a security server 14 are connected to a database 15 as shown in FIG. 45, so that the service provision server 13 provides the aforementioned recommendation service for a dream, a life plan, a type of occupation etc. and the security server 14 performs security management in collection of private information necessary for the service provision. The database 15 stores the collected private information.

The information stored in the database 15 has the private information of the VP, a privacy policy, a signature of the life support center created by decoding both information with a secret key KS1 of the life support center and a signature of the VP created by decoding both information with a secret key KS of the VP in association with the name of the VP.

Figure 46A:
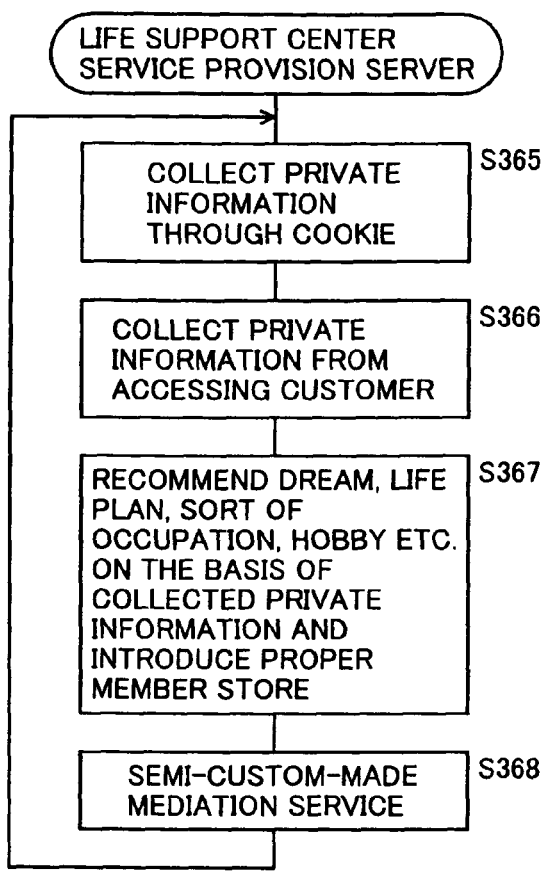
FIG. 46 is a flow chart showing control operations of a server set in the life support center.
Figure 46B:
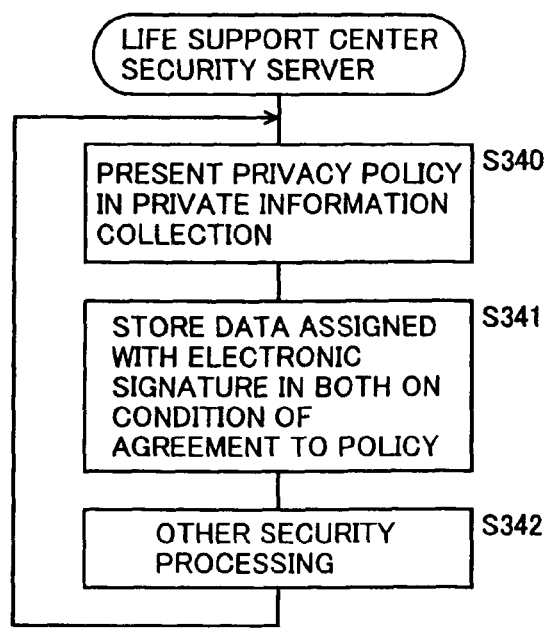

FIG. 46A is a flow chart showing processing operations of the service provision server 13 of the life support center 8, and FIG. 46B is a flow chart showing processing operations of the security server 14 of the life support center 8.

Referring to FIG. 46A, the server performs processing of collecting private information with cookies through S365, performs processing of collecting private information directly from an accessing customer through S366 and performs processing of recommending a dream, a life plan, a type of occupation, a hobby etc. suitable for this customer on the basis of the collected private information and introducing member stores (new middlemen) meaningful for implementing these through S367.

When the user accesses any introduced member store (new middleman), the service provision server 13 provides this member store (new middleman) with the private information of the user required when this member store (new middleman) recommends an article or a service to this user.

More specifically, the server first asks the customer to input his/her character and private information necessary for recommending a dream of desire (whether desire for wealth or desire for honor, whether or not desire for self implementation is high, etc.) for directly collecting the private collection from the customer through S366. Then, the server deduces VPs having common character, desire etc. from among users already stored in the database 15 as VPs, retrieves the dreams of these VPs and recommends the same to the customer (the VP as the user). The user selects a desired one from the recommended ones if any, while the user him/herself thinks out a dream suitable for him/her with reference to the recommended ones and inputs the same if there is none.

Assuming that this dream selected by the user is "to independently start business in a field allowing the best use of techniques and laws", for example, the service provision server 13 lists occupations such as the patent attorney satisfying the conditions as occupations allowing the best use of techniques and laws and independent start of business while creating and recommending a plan of life design necessary for independently starting business. In this planning of the life design, the server first asks the user to input data of his/her family to create life plans of all family members, then asks the user to input his/her annual income to create a plan of money to live on from the annual income etc., then asks the user to input his/her family structure, the ages of the family members etc. to create a fund plan for children on the basis of the input information, then creates a plan for funds for the user's own house and then creates a plan for event funds. Further, the server also recommends insurance, investment trust etc.

Following the aforementioned recommendation for the type of occupation such as the patent attorney, the service provision server 13 recommends literature, educational institutions etc. necessary therefor. At this time, the server recommends member stores (new middlemen) recommending expert books of laws and techniques.

Then, the service provision server 13 deduces VPs who are patent attorneys, for example, and similar in character and desire to the user and retrieves private information of the VPs related to the hobbies and leisure for recommending the same to this user in order.

When the user defines a hobby or leisure, the server recommends member stores (new middlemen) recommending goods, guidebooks etc. necessary for the defined hobby.

A conventional recommendation service system for articles etc. has deduced customer data matching with data such as marks given by a user when evaluating specific articles and purchase history data of the user on the basis of the data for recommending articles highly evaluated or previously purchased by the deduced customers. In other words, this system has employed a method of recommending specific article data on the basis of specific article data.

However, this service provision server 13, gradually guiding the user to customer data of a subordinate concept (specific article needs) from customer data of a superordinate concept (dream, for example) for recommending a member store (new middleman) recommending final articles suiting the article needs when the article needs are decided, employs a guidance type recommendation system from the superordinate concept to the subordinate concept. Thus, the server can make more suitable recommendation while collecting integrated customer information of the user (customer) from the superordinate concept to the subordinate concept.

If the service provision server 13 retrieves VPs matching with customer information of the customer on a superordinate concept level of dreams, types of occupation, hobbies etc., for example, when the recommended member store (new middleman) recommends specific articles or information and provides these VPs to the member store (new middle man) so that the member store chooses VPs who are provided and registered in a database of the member store (new middleman) and recommends articles highly evaluated or purchased by these VPs to the customer (user), more meaningful recommendation of specific articles is enabled.

Then, the server provides a semi-custom-made mediation service at S368. This semi-custom-made mediation service is a service of grouping and classifying those having common private information from among customers (VPs as users) stored in the database 15 of the life support center 8, grasping VPs belonging to a certain group as a group of customers having common needs so that the group of customers in the certain group present desires and ideas for certain articles and services in common and ask a supplier 1 to create services or articles suitable for the desires and ideas in a custom-made manner. As compared with such a complete custom-made system that a single customer (user) presents desires and ideas with respect to a certain article and the supplier creates an article suitable for the desires and ideas, this service can advantageously reduce the cost since the created articles or services are purchased by a plurality of users.

Referring to FIG. 46B, the security server 14 of the life support center 8 performs processing of presenting a privacy policy to the corresponding user (customer) in private information collection through S340. Then, the server performs processing of storing data assigned with electronic signatures by both sides in the database 15 on condition of agreement on the privacy policy through S341. Then, the server performs other security processing through S342.

The server classifies the private information collected according to S341 every name of the customer (the VP as the user) as in the table of FIG. 1 showing the information stored in the database 15, for storing the private information and the privacy policy corresponding thereto, an electronic signature created by decoding the same with a secret key KS1 of the life support center 8 and an electronic signature created by decoding the private information and the privacy policy with a secret key KSD of this VP.

The server collects and stores the private information in the aforementioned manner so that, even if this private information is circulated and handed to another trader, for example, it is possible to check whether or not the information is circulated while keeping the privacy policy included in the private information, whether or not the private information is utilized while keeping the privacy policy etc. by checking the private information. If the privacy policy included in the private information is tampered, on the other hand, the matching property of the electronic signature of the life support center 8 included in the private information and the electronic signature of the VP possessing the private information breaks and hence it is possible to easily determine that the same is tampered. Thus, it is possible to prevent the private information from illegal buying and selling or illegal use to the utmost.

Figure 47A:
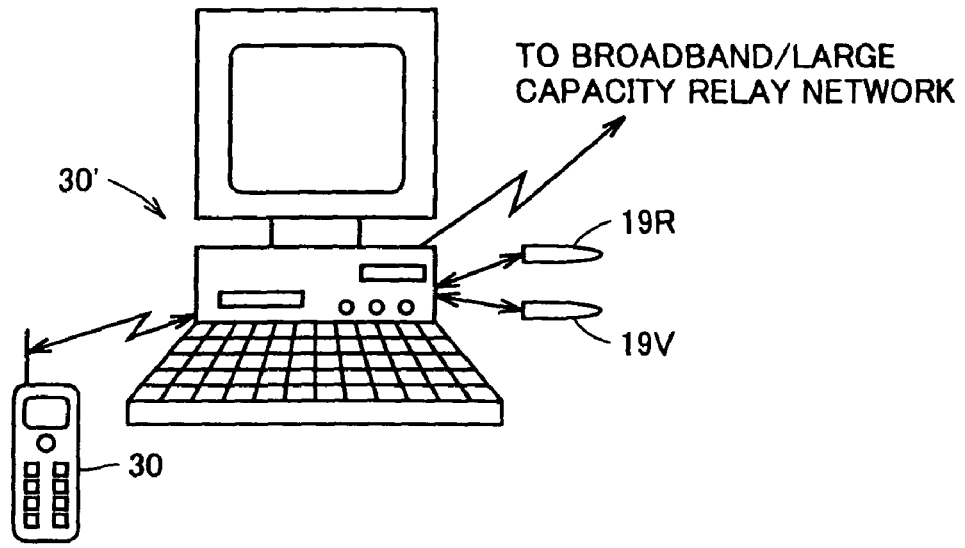
FIG. 47, showing another embodiment, illustrates explanatory diagrams showing a method of utilizing an IC terminal.

FIG. 47A is an explanatory diagram showing a method of entering a network through a personal computer 30' which is an exemplary terminal connected to a broadband/large capacity relay network 43. The browser phone 30 and the personal computer 30' are constituted to be capable of making communication with each other according to the aforementioned Bluetooth. The IC terminals 19R and 19V are connected not to the browser phone 30 but either one of the IC terminals 19R and 19V is connected to a USB port of the personal computer 30'. Data transfer between the browser phone 30 and the IC terminals 19R and 19V is performed according to Bluetooth through the personal computer 30'. Similarly to the above, the user can enter the network and act on the network as the VP by manipulating the browser phone 30 in the state connecting the IC terminal 19V for the VP to the USB port of the personal computer 30'. Further, the user can enter the network and act on the network as the RP by manipulating the browser phone 30 similarly to the above in a state connecting the IC terminal 19R for the RP to the USB port of the personal compute 30'.

Thus, the IC terminals 19R and 19B are connected not to the browser phone 30 but to the personal computer 30' which is an exemplary terminal connected to the broadband/large capacity relay network, whereby it follows that the personal computer 30' takes charge of power consumption of the IC terminals 19R and 19V, power consumption of the browser phone 30 can be saved and such inconvenience that a battery of the browser phone 30 immediately runs out of electricity can be prevented. The terminal connected to the network is not restricted to this personal computer 30' but may alternatively be the vending machine 58, the server 59, the facsimile 61 or the like, for example, described with reference to FIG. 2 or the like.

Figure 47B:
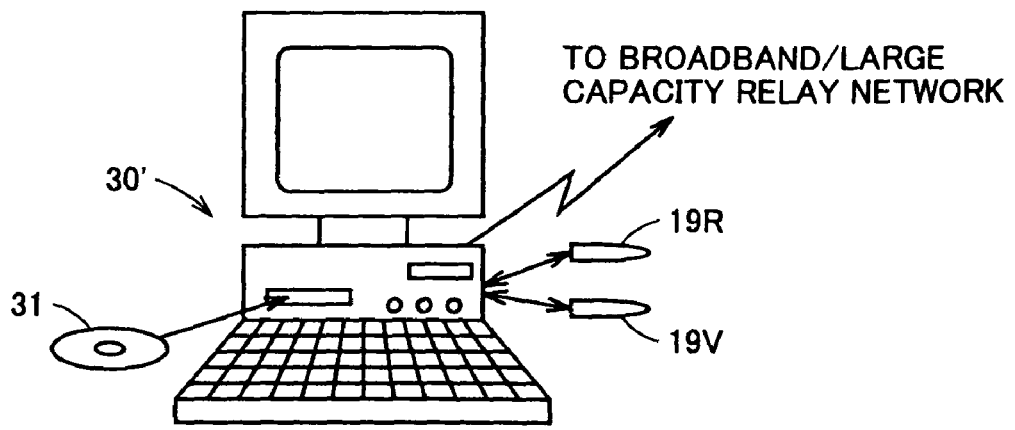

FIG. 47B is an explanatory diagram showing still another embodiment in a case of employing a personal computer 30' in place of the browser phone 30. A CD-ROM 31 which is an exemplary recording medium stores the data stored in the IC terminal 19I shown in FIG. 9 and dedicated application software necessary for operating IC terminals 19R and 19V, so that the CD-ROM 31 is inserted in the personal computer 30' for installing the application software. Consequently, the user can enter a network and act in the network as an RP or a VP similarly to the above by employing the personal computer 30' in place of the browser phone 30. At this time, the browser phone 30 has no storage area storing cookies while the personal computer 30' has a storage area (hard disk) storing cookies as the difference between the browser phone 30 and the personal computer 30'. If the personal computer 30' already stores cookies when the IC terminal 19V for the VP is connected to a USB port of the personal computer 30', therefore, it is necessary to erase or temporarily freeze the stored cookies to make control so that the already stored cookie data are not transmitted to a site when the user accesses the site or the like as the VP.

Modifications, characteristic points etc. in each of the aforementioned embodiments are now enumerated.

(1) In the case of a portable transmitter-receiver such as the browser phone (portable telephone) 30 or a PHS (Personal Handy-phone System) transmitting/receiving information to/from the nearby base station by radio as described above, the current location of the portable transmitter-receiver is deducible to some extent in order to specify the nearby base station. When taking action on the network such as that of accessing a site as the VP with such a portable transmitter-receiver, there is an apprehension that the position is specified to some extend while utilizing the portable transmitter-receiver as the VP. Consequently, there is an apprehension that such a statistic result that a certain VP is regularly located on the same place as a certain RP is deduced and the relation between the VP and the RP is revealed.

Therefore, the present invention employs the following means:

A portable transmitter-receiver carried by a user for performing transmission/receiving with a nearby base station by radio and capable of entering a network through this base station, which portable transmitter-receiver (browser phone 30 or the like) comprising:

a processing function (S100 to S103, S580, S582 to S585) for a virtual person for allowing a real person (real person) in the actual world to pretend to be the virtual person (virtual person) and act as the virtual person when acting on the network, and comprising different route enter means (S607 to S613) for the virtual person for performing processing of directly making radio communication (Bluetooth) with respect to a terminal connected to the network when the user enters the network as the virtual person with this processing function for the virtual person and entering the network not through an enter route from said base station but from said terminal.

As a result of employing such means, the user is enabled to make entrance not through the enter route from the base station but from a different route with the different route enter means for the virtual person when entering the network as the virtual person, whereby it is possible to prevent such inconvenience that the position of the virtual person is specified to the utmost.

As means attaining such an effect, the following may be employed:

A program for operating a processor (CPU 197) comprised in a portable transmitter-receiver (browser phone 30 or the like) carried by a user for performing transmission/receiving with a nearby base station by radio and capable of entering a network, for letting said processor function as:

virtual person processing means (S100 to S103, S580, S582 to S585) performing processing of enabling a real person (real person) in the actual world to pretend to be a virtual person (virtual person) and act as the virtual person when acting on the network, and different route enter means (S607 to S613) for the virtual person directly making radio communication with a terminal connected to the network when the user enters the network as the virtual person with the virtual person processing means for entering the network not through an enter route from said base station but from said terminal.

(2) A trader utilizing private information of a user needs to confirm whether or not the private information to be provided actually has correct contents.

Therefore, the present invention employs the following means:

A private information system including:

trueness/falseness check processing means (S420) performing processing for checking trueness/falseness of private information when the user makes a registration request for the private information to a prescribed institution, digital signature means (S425) assigning a digital signature of said prescribed institution to private information determined as correct as a result of processing by the trueness/falseness check means, private information storage means (S425, database 12*a*) storing said private information assigned with the digital signature in a mode capable of specifying the user of this private information, and retrieval means retrieving, in response to a request from a requester specifying a certain user name, private information corresponding to this user name from said private information storage means.

This private information system may further include the following means:

Trueness/falseness check means (S471, S472) retrieving, when said requester requests check of trueness/falseness of possessed private information, private information corresponding to the private information possessed by said requester to be subjected to the check from said private information storage means and collating this retrieved private information and the private information of said requester with each other for checking trueness/falseness, result notification means (S487) notifying a result of trueness/falseness by said trueness/falseness check means to said requester, digital signature means (S486) assigning a digital signature of said prescribed institution to the private information when the result of check of said trueness/falseness check means and the private information of said requester have correct contents, means (S476, S477) performing processing for asking whether or not the result of trueness/falseness check by said trueness/falseness check means may be notified to said requester to the user corresponding to the private information subjected to the trueness/falseness check, negotiation processing means (S504 to S506) performing, when receiving a purchase request for private information stored in said private information storage means from a requester, processing for making negotiation related to the price of this purchase, transmission means (S509) transmitting the private information to be purchased to the purchase requester with a digital signature of said prescribed institution for this private information when negotiation is established as a result of negotiation by said negotiation processing means, and storage means (S508) assigning digital signatures of the respective ones of a user corresponding to the private information to be purchased, said purchase requester and said prescribed institution to the established conditions when the negotiation is established as the result of said negotiation processing means and storing the same.

(3) When the user frequently acts on the network as the VP, there is an apprehension of such inconvenience that a trader collecting detailed private information of both of the RP and the VP thoroughly makes matching check of both private information, deduces the RP name and the VP name having matching private information and predicts the name of the RP corresponding to the VP. Therefore, the present invention employs the following solving means:

A private information protector employed for a private information protection method enabling a real person (real person) in the actual world to pretend to be a virtual person (virtual person) and act as the virtual person when acting on a network, including:

access means (S651 to S662) accessing a site not intended by the real person in response to a request from said real person.

As a result of employing such means, it follows that access to the site not intended by the real person is automatically performed and reliability of private information of this real person can be reduced. Consequently, reliability of a result of matching check of both private information of the real person and the virtual person can be reduced.

This private information protector may further include the following means:

action means (S656) taking action not intended by said real person in a site accessed with said access means, private information provision processing means (S656) performing processing of providing the real name (Taro) of said real person to the site accessed with said access means, cookie acceptance processing means (S660, S661) performing processing for accepting and storing identification data (cookie) transmitted from the site accessed with said access means for identifying the user, and access inhibition means (S655) comprised in said access means for determining whether or not the accessed site is within access tolerance previously set by the user and not accessing the site if the site is not within the access tolerance.

While this private information protector is constituted by the user terminal (browser phone 30 or the like) in the aforementioned embodiment, the present invention is not restricted to this but a prescribed service institution providing a false RP access processing service in response to a request from the user, for example, may be set for performing the aforementioned operations of the access means, the action means etc. when this service institution receives a request from the user. Further, preference information different from the preference information of the real person may be provided to the site.

(4) The term "person" or "private" employed in the present invention is a wide concept including not only a natural person but also a corporate body. The term "pseudonym" employed in the present invention denotes the name of the virtual person (VP), and the name of the virtual person and the pseudonym of the real person denote the same concept. Therefore, it follows that the name, the E-mail address and the electronic certificate of the virtual person are an address, an E-mail address and an electronic certificate for the real person acting on the network with the pseudonym.

The term "private information protector" employed in the present invention is a wide concept including not only a single apparatus but also a system so constructed that a plurality of apparatuses cooperatively operate in order to attain a certain object.

(5) while the financial institution 7 is provided with the VP management function, the settlement function and the authentication function in this embodiment as shown in FIG. 1, the VP management function may be independently separated from the financial institution 7 so that another prescribed institution having the duty of confidentiality other than the financial institution substitutionally takes charge of the VP management function. The substitutional prescribed institution may be a public institution such as a public agency. Further, the electronic certificate issuing function of issuing electronic certificates to the RP and the VP may be independently separated from the financial institution 7 so that a dedicated authentication station substitutionally takes charge of this function.

While this embodiment employs the address of the convenience store 2 as the address of the VP, a place of collection and delivery for goods in a post office or a distribution trader, for example, may substitutionally be employed as the address of the VP. Further, a dedicated institution defining the address of the VP may be newly set.

While the financial institution 7 serving as an exemplary prescribed institution performs the processing of creating the VP in this embodiment, the present invention is not restricted to this but the user him/herself may create (bear) the VP with his/her terminal (browser phone 30 or the like) for registering VP information such as the name, the address, the public key, the account number and the E-mail address of the created VP to the prescribed institution such as the financial institution 7.

The created VP may not necessarily be registered in the prescribed institution.

(6) The IC terminal 19R or 19V serving as an exemplary processor may be constituted by a portable terminal such as an IC card, a portable telephone or a PHS or a PDA (Personal digital Assistant). When constituting the IC terminal by such a portable terminal, two types of terminals including a portable terminal for the VP and a portable terminal for the RP may be prepared, while the portable terminal may be constituted to be switchable to a VP mode or an RP mode so that a single type of portable terminal is sufficient.

In place of installment of the application software by the IC terminal 19I shown in FIG. 9, this application software may be downloaded to the browser phone 30 or the like from a supplier of this application software through the network.

(7) While this embodiment is so constituted as to automatically create and issue the electronic certificate for the VP in creation of the VP as shown in FIG. 12, the electronic certificate for the VP may alternatively be first created/issued when receiving an issuance request for the electronic certificate from the user.

While this embodiment employs the authentication key KN of the RP when performing person in question authentication of the RP as shown in FIG. 23 etc., person in question authentication of the RP may alternatively be performed with the public key in the electronic certificate if the RP has received issuance of the electronic certificate.

(8) The browser phone 30 may be replaced with a personal computer.

The E-mail address ΔΔΔΔΔ opened by the financial institution 7 for the trap type VP may not be only a single type E-mail address but may be prepared in a plurality of types for using the same every trap type VP name. S620 to S622 or S960 to S956 constitute new pseudonym generation means generating a pseudonym not theretofore used when receiving a request for generating a new pseudonym (trap type VP name). S431 to S441 or S954 constitutes pseudonym registration means registering the pseudonym when a pseudonym registration institution (financial institution 7 or EEPROM 26) registering the pseudonym generated by said new pseudonym generation means receives a request for registering a newly generated pseudonym.

The aforementioned S450 to S460 constitute private information transmission means transmitting private information corresponding to a user to this user when the user makes a request for confirming his/her private information to a registration institution registering the private information of the user on condition that the user has been confirmed as the person in question as a result of person in question authentication by person in question authentication means (S452 to S458) performing person in question authentication of the user.

The trap type VP name shown in FIG. 44A may be created by compositing the site name with the secret key KSB of the VP.

In other words, the trap type VP name may be generated by performing an operation of DKSB(site name) through S957. In this case, it follows that a determination is made according to an operational formula EKPB(addressee of E-mail)=name of sender through S969. Processing of outputting that EKPB (addressee of E-mail) has been illegally distributed and illegally obtained by the trader having the name of the sender is performed at S967.

The aforementioned S957 constitutes pseudonym generation means generating a pseudonym generated by encrypting or decoding the name of a site accessed by the user through the network with a key (secret key KSB) usable by this user for the site.

While the aforementioned embodiment employs the pseudonym (trap type VP name) as identification information which is information capable of specifying identification information employed by the user for specifying the site accessed by him/her through the network for providing his/her private information and included in, when a person obtaining said private information sends a mail to the user possessing the private information, this mail, a plurality of E-mail addresses or addresses (post-office box etc.) for direct mails used every site may be employed in place of or in addition to the same.

(9) A private information protection system protecting private information on a network (broadband/large capacity relay network 43), including:

virtual person creation processing means (S1 to S12) performing processing of creating a prescribed virtual person for allowing a real person (real person) in the actual world to pretend to be the virtual person (virtual person) and act as the virtual person when acting on the network, and registration processing means (S15) performing processing of registering information capable of specifying the association between said real person and said virtual person in a prescribed institution having the duty of confidentiality.

(10) Said prescribed institution is the financial institution 7.

(11) A private information protection system protecting private information on a network (broadband/large capacity relay network 43), including:

virtual person creation processing means (S1 to S12) performing processing of creating a prescribed virtual person for allowing a real person (real person) in the actual world to pretend to be the virtual person (virtual person) and act as the virtual person when acting on the network, and electronic certificate issuance processing means (S16) performing processing for issuing an electronic certificate for said virtual person.

(12) A private information protection system protecting private information on a network (broadband/large capacity relay network 43), including;

virtual person creation processing means (S1 to S12) performing processing for creating a prescribed virtual person for allowing a real person (real person) in the actual world to pretend to be the virtual person (virtual person) and act as the virtual person when acting on the network, and address set means (S9 to S12) performing processing for setting the address of said virtual person to a different address from said real person.

(13) The address of said virtual person is the address of a prescribed convenience store (S9 to S11).

(14) A private information protection system protecting private information on a network (broadband/large capacity relay network 43), including:

virtual person creation processing means (S1 to S12) performing processing for creating a prescribed virtual person for allowing a real person (real person) in the actual world to pretend to be the virtual person (virtual person) and act as the virtual person when acting on the network, and credit number issuance processing means (card issuing company 4) performing processing for issuing a credit number for said virtual person, for allowing payment on credit as said virtual person through the credit number issued by said credit number issuance processing means (S58, S56, S75 to S78).

(15) A private information protection system protecting private information on a network (broadband/large capacity relay network 43), including:

virtual person creation processing means (S1 to S12) performing processing of creating a prescribed virtual person for allowing a real person (real person) in the actual world to pretend to be the virtual person (virtual person) and act as the virtual person when acting on the network, and account opening processing means (S39, S42 to S45) performing processing for opening a bank account for said virtual person, for allowing settlement of accounts as said virtual person through funds in the account opened by said account opening processing means (S55 to S57, S60 to S74).

(16) A private information protection system protecting private information on a network (broadband/large capacity relay network 43), including:

virtual person creation processing means (S1 to S12) performing processing for creating a prescribed virtual person for allowing a real person (real person) in the actual world to pretend to be the virtual person (virtual person) and act as the virtual person when acting on the network, for rendering acceptance limitation for identification data (cookie) transmitted from a site for identifying a user variable with a case of acting on the network as said real person and with a case of acting on the network as said virtual person (S110 to S123, S125 to S137).

(17) A processor (VP management server 9) employed for protection of private information on a network (broadband/large capacity relay network 43), including:

request acceptance means (S1) accepting a request for creating a prescribed virtual person for allowing a real person (real person) in the actual world to pretend to be the virtual person (virtual person) and act as the virtual person when acting on the network, virtual person creation processing means (S1*a* to S12) performing processing for creating the virtual person on condition that the request is accepted by the request acceptance means (on condition that a determination of YES has been made through S1), and association storage processing means (S15) performing processing for storing information capable of specifying the association between the virtual person created by the virtual person creation processing means and said real person corresponding to this virtual person as a database.

(18) A processor (VP management server 9) for protecting private information on a network (broadband/large capacity relay network 43), including:

public key storage processing means (S15) performing processing for accepting (S14) input of a public key (KB) of a prescribed virtual person created for allowing a real person (real person) in the actual world to pretend to be the virtual person (virtual person) and act as the virtual person when acting on the network and storing the input public key in a database, and electronic certificate creation/issuance processing means (S16) for performing processing of creating and issuing an electronic certificate for said virtual person corresponding to said stored public key, wherein the electronic certificate creation/issuance processing means performs the processing of creating and issuing the electronic certificate (performs processing of S16) on condition that this is registered said virtual person for whom information capable of specifying the association between said real person and said virtual person is registered in a prescribed institution (financial institution 7) having the duty of confidentiality (on condition that a determination of YES has been made through S7).

(19) A processor (server of member store 6) for protecting private information on a network (broadband/large capacity relay network 43), including:

payment approval processing means (payment approval part 33) for performing approval processing for payment when a purchase request by credit payment is made through a credit number issued for a prescribed virtual person created for allowing a real person (real person) in the actual world to pretend to be the virtual person (virtual person) and act as the virtual person when acting on the network, and payment request processing means (payment request part 33) performing processing for issuing a request for credit payment approved by the payment approval processing means to a credit card issuing company 4, wherein said payment approval processing means approves payment after confirming an electronic certificate issued for said virtual person.

(20) A processor (settlement server 10) for protecting private information on a network (broadband/large capacity relay network 43), including:

charge request acceptance processing means (S55) performing processing for accepting a charge request charging funds in a bank account opened for a prescribed virtual person created for allowing a real person (real person) in the actual world to pretend to be the virtual person (virtual person) and act as the virtual person when acting on the network for settling accounts, and charge processing means (S69) performing processing for deducing the bank account corresponding to corresponding said virtual person and remitting a fund corresponding to the sum G of the charge request from the funds in said bank account when the charge request acceptance processing means accepts the charge request.

(21) A processor (server 16) for protecting private information on a network (broadband/large capacity relay network 43), said processor is set on an address (address of convenience store 2) of a prescribed virtual person created for allowing a real person (real person) in the actual world to pretend to be the virtual person (virtual person) and act as the virtual person when acting on the network and different from that of said real person, and includes:

storage processing means (S322) performing processing for storing information capable of specifying said virtual person employing the address where said processor is set as his/her address in a database 17;

keep information storage processing means (S316a) performing processing for storing information capable of specifying that an article purchased by the virtual person stored in the storage processing means and delivered to the address where said processor is set has been kept in a database, and delivery approval processing means (S336) confirming, when receiving a delivery request for said kept article (when making a determination of YES through S317), that a virtual person issuing said delivery request is the virtual person stored in said database (S327) and performing processing for issuing approval for delivery of the corresponding article on condition that it is a virtual person handling the article (on condition that a determination of YES has been made through S328).

(22) A program or a computer-readable recording medium storing this program, which is a program for protecting private information on a network (broadband/large capacity relay network 43) or a recording medium (CD-ROM 31) recording this program, for letting a computer (personal computer 30) function as:

creation request determination means (S141) determining whether or not a request operation for creating a prescribed virtual person for allowing a real person (real person) in the actual world to pretend to be the virtual person (virtual person) and act as the virtual person when acting on the network has been received, birth request transmission means (S142) performing processing for transmitting a birth request for said virtual person to a prescribed institution (financial institution 7) when said creation request determination means determines that the creation request has been received, and prescribed information transmission means (S147 to S149) performing processing for transmitting information capable of specifying said real person making the birth request for said virtual person and necessary for bearing said virtual person to said prescribed institution.

(23) A processor (IC terminal 19V for VP) for protecting private information on a network (broadband/large capacity relay network 43), said processor is a portable processor enabled to transfer and receive information to and from a terminal (personal computer 30) of a user (enabled to transfer and receive information through USB port 18) and carried by the user, and used when said user who is a real person (real person) in the actual world pretends to be a prescribed virtual person and acts on the network as this virtual person, and constituted to be capable of storing, when identification data (cookie) transmitted from a site for identifying the user is transmitted to said terminal, said identification data on behalf of this terminal (S276).

(24) Further, the processor is constituted to be capable of outputting said stored identification data (cookie data) when the user accesses a site through said terminal (personal computer 30) and transmitting the stored identification data to said site at need (S278).

(25) Said processor (IC terminal 19V for VP) further includes:

an input/output part (I/O port 21) for enabling the terminal of said user to input/output information, and identification information storage means (S276) storing, when said identification information is input from the terminal of said user (when a determination of YES is made through S275), the input identification information.

(26) Said processor (IC terminal 19V for VP) further includes:

identification information external output means (S278) externally outputting stored said identification information when an output instruction for said identification information is input from the terminal of said user (when a determination of YES is made through S277).

(27) Said processor (IC terminal 19V for VP) further includes:

information external output means (S298, S310 etc.) storing information related to said virtual person (name and address of VP, E-mail address of VP, public key and secret key of VP, age and occupation of VP etc.), and externally outputting said stored information related to the virtual person when an output instruction for the information related to said virtual person is input (when a determination of YES is made through S295, S305 etc.).

The aforementioned legal institution proof processing, legal institution check processing, person in question proof processing, person in question check processing through S4 to S7 etc. constitute person in question authentication means for confirming the person in question and preventing pretending.

S13 to S16 constitute virtual person electronic certificate issuance means creating and issuing an electronic certificate for the virtual person (virtual person). S25 to S28 constitute real person electronic certificate issuance means creating and issuing an electronic certificate for the real person (real person) existing in the actual world.

S39 to S45 constitute bank account creation processing means performing processing for creating a bank account for the virtual person (virtual person).

S40 to S49 constitute debit card issuance processing means performing processing for issuing a debit card for the real person (real person) or the virtual person (virtual person). S55 to S69 constitute fund withdrawal processing means performing processing for partially withdrawing funds in the bank account of the virtual person (virtual person) with respect to the processor (IC terminal 19V for VP) carried by the virtual person (virtual person).

S57 to S74 constitute debit card settlement processing means performing processing for settling accounts with the debit card of the virtual person (virtual person). S57 to S78 constitute credit card settlement processing means performing processing for settling accounts with the credit card of the virtual person (virtual person). This credit cared settlement processing means settles accounts according to Secure Electronic Transaction (SET).

(28) While this embodiment limits or rejects acceptance of cookies as shown in FIG. 28, control may be made to inhibit or limit an operation of transmitting already stored cookies to the site when the user re-accesses the site, in place of or in addition to the same. In other words, the private information protection system according to the present invention may vary transmission limitation for transmitting identification data, transmitted from the site for identifying the user and already stored, with a case of acting on the network as the real person and a case of acting on the network as the virtual person.

S140 to S158 constitute birth request processing means for performing processing for the user for making a birth request for his/her virtual person (virtual person). S9 to S12 constitute address decision processing means performing processing for deciding an address which is the address of the born virtual person (virtual person) and different from the address of the real person (real person) who is the birth requester. This address decision processing means decides the address of a convenience store as the address of the virtual person (virtual person). Further, this address decision processing means can decide the address of a convenience store desired by the real person (real person) who is the birth requester as the address of the virtual person (virtual person). In addition, this address decision processing means can decide the address of a convenience store near to the address of the real person (real person) who is the birth requester as the address of the virtual person (virtual person).

S305 to s312 constitute private information automatic output means provided in said processor (IC terminal 19R for RP, IC terminal 19V for VP) carried by the user and capable of performing processing of choosing corresponding virtual information from stored private information and outputting the same when receiving a transmission request for private information of the user possessing this processor as the real person (real person) or private information as the virtual person (virtual person). This private information automatic output means includes automatic determination processing means (S307, 308, 310, 311) performing processing for automatically determining whether or not the target private information for the transmission request may be transmitted. The user can previously input/set what type of private information may be output, and this automatic determination processing means makes an automatic determination according to the input setting. When no automatic determination can be made, this automatic determination processing means performs processing of outputting the requested private information and a transmitted privacy policy for requiring approval for transmission to the user (S309).

S313 constitutes virtual person character change formation means provided in the processor for the virtual person (virtual person) carried by the user for changing the character of the virtual person formed by this processor in response to use situations of this processor. This virtual person character change formation means changes the character in response to the type of the site accessed by the user as the virtual person (virtual person).

S314 and S314a constitute character-reflective conversation implementation processing means performing processing of implementing conversation with the virtual person (virtual person) while reflecting the current character formed by said character change formation means when the user requests conversation with the virtual person (virtual person).

The convenience store 2 constitutes an article keeping place keeping an article purchased by the virtual person (virtual person) on the network when this article is delivered. The database 17 constitutes virtual person registration means registering the virtual person (virtual person) for whom the article is kept in said article keeping place. This virtual person registration means stores keep specification information classified every virtual person (virtual person) for specifying whether or not an article is kept. The means further stores settlement specification information for specifying whether or not settlement of this article has been completed. The means makes classification every said virtual person (virtual person) and stores the E-mail address of this virtual person (virtual person).

S323 constitutes E-mail transmission processing means provided on said article keeping place for performing processing for transmitting an E-mail stating that the article has been kept to the E-mail address of the virtual person (virtual person) for whom the article is kept. S317 to S340 constitute article delivery processing means provided on said article keeping place for performing processing for delivering the corresponding article to the user when the user comes to receive the article as the virtual person (virtual person). This article delivery means performs delivery processing on condition that it has been possible to confirm that the virtual person (virtual person) of the user coming to receive the article is the person in question. Said article delivery processing means determines whether or not the delivered article has already been settled and performs article delivery processing on condition that settlement has been made if the same has not yet been settled.

(29) While this embodiment rejects all transmitted cookies when the IC terminal 19R for the RP is connected as shown in FIG. 11, the user may be rendered settable for partially accepting cookies in response to the types etc. thereof. For example, the present invention may be constituted to be settable to reject only trace type cookies and accept other cookies.

While the embodiment is further constituted to store all cookies in the IC terminal 19V for the VP when the IC terminal 19V for the VP is connected, the present invention may substitutionally be constituted to enable adjustment setting by the user for storing only trace type cookies in the IC terminal 19V for the VP while storing other cookies in the personal computer 30, for example.

S132 and S133 constitute cookie record announce means announcing, when the user acts on the network as the real person (real person) through the terminal and this terminal records cookies, this purport. S135 and S136 constitute cookie rejection means performing processing, when the user acts on the network as the real person (real person) through the terminal and cookies are transmitted to said terminal, for rendering the cookies rejectable. This cookie rejection means, which may reject all cookies, may be constituted to be adjustable/settable by the user to be capable of rejecting only trace type cookies, for example.

While this embodiment limits or rejects acceptance of cookies as shown in FIG. 11, control may be so performed as to inhibit or limit an operation of transmitting already stored cookies to the site when the user re-accesses the site, in place of or in addition to the same. In other words, the private information protection system according to the present invention may be rendered capable of varying transmission limitation for transmitting identification data, transmitted from the site for identifying the user and already stored, to said site with a case of acting on the network as the real person and a case of acting on the network as the virtual person.

(30) The service provision server 13 of said life support center 8 constitutes life support means collecting private information of the user and supporting the life of the near on the basis of the private information. This life support means performs recommendation processing in order from superordination to subordination for recommending superodinate items (dreams and life design of user, for example) forming the basis of the life of the user, than recommending subordinate items (type of occupation, course etc., for example) and then recommending further subordinate items (hobbies, for example). Further, the life support processing means performs processing of recommending consumption support traders (member stores such as new middlemen) related to the recommended items. In this recommendation, the means provides collected private information of the user to said recommended consumption support traders.

S340 constitutes privacy policy presentation means presenting a privacy policy to the user when collecting the private information of the user. S341 constitutes private information collection/storage means collecting and storing the private information of the user on condition that agreement to the privacy policy presented by said privacy policy presentation means has been obtained from the user. This private information collection/storage means stores an electronic signature of the private information collecting trader and an electronic signature of said user as a set of information with respect to the private information of the user, said privacy policy presented to the user, said private information and said privacy policy.

The embodiments disclosed this time must be considered as illustrative and not restrictive in all points. The scope of the present invention is shown not by the above description but by the scope of claim for patent, and it is intended that all changes within the meaning and range equivalent to the scope of claim for patent are included.

Association between various means and the embodiment is now described as follows:

(1) A private information protection method protecting private information on a network through a computer system, including:

an identification information generation step (S620 and S621 or S960 to S956) generating identification information, employed by a user for specifying a site to be accessed through the network (broadband/large capacity relay network 43) for providing his/her private information, which is identification information (trap type VP name as pseudonym, EKSB(site name) in FIG. 44A, E-mail address used every site and address for direct mail) to be included in a mail (E-mail, direct mail) when a person obtaining said private information sends the mail to the user possessing the private information through a processor (CPU 24), a private information provision step (S593, S600, S700, S701) for the user for accessing the site with the identification information generated by the identification information generation step and providing the private information, and a monitoring step (S516 or S969) determining whether or not said site specified on the basis of said identification information included in the mail sent by the person obtaining said private information provided by the private information provision step to the user possessing the private information and the sender of said mail match with each other and monitoring the circulation state of the private information of said user.

(2) Said identification information is a pseudonym (trap type VP name shown in FIGS. 11 and 44A) of the user used every site.

(3) A private information protector protecting private information on a network through a computer system, including:

identification information storage means (database 12*a*, EEPROM 26) storing information, capable of specifying identification information employed by a user for specifying a site accessed through the network (broadband/large capacity relay network 43) for providing his/her private information, which is information (trap type VP name as pseudonym, KSB and site name in FIG. 44A, E-mail address used every site and address for direct mail) capable of specifying identification information to be included in a mail when a person obtaining said private information sends the mail to user possessing the private information, and monitoring means (s516, S522, S523) determining whether or not said site specified on the basis of said identification information included in the mail (E-mail, direct mail) sent by the person obtaining said private information to the user possessing the private information and the sender of said mail match with each other and monitoring the circulation state of the private information of said user.

(4) Said monitoring means makes a determination of improperness (determination of NO through S523) if the sender of said mail is not included in circulation tolerance for the private information (in circulation tolerance specified by privacy policy stored in database 72 of XML store 50) approved by said user when providing his/her private information to said site specified on the basis of said identification information.

(5) A private information protector protecting private information on a network (broadband/large capacity relay network 43) through a computer system, including:

identification information storage means (S622, EEPROM 26) storing information, capable of specifying identification information employed by a user for specifying a site accessed through the network for providing his/her private information, which is information (trap type VP name as pseudonym, KSB and site name in FIG. 44A, E-mail address used every site and address for direct mail) capable of specifying identification information to be included in a mail when a person obtaining said private information sends the mail to the user possessing the private information, and identification information use control means (S623 to S628) performing processing for employing, when identification information employed by the user for specifying the site when accessing the site through the network is already stored in said identification information storage means, this stored identification information for said site.

(6) Said private information protector further includes registration processing means (S440) for performing processing of registering information capable of specifying the association between the user and said identification information employed by this user in a prescribed institution (financial institution 7) having the duty of confidentiality.

(7) Said identification information is a pseudonym (trap type VP name) used by the user every said site (see FIG. 11).

(8) Said private information protector further includes electronic certificate issuance processing means (S441) for performing processing of issuing an electronic certificate for said pseudonym used by said user when acting on the network with said pseudonym.

(9) Said electronic certificate is issued by the prescribed institution (financial institution 7) having the duty of confidentiality registering the information capable of specifying the association between the user and said identification information employed by this user for proving that the user employing said pseudonym is a user registered in this prescribed institution.

(10) Said private information protector further includes address set means (S11, S12) performing processing of setting the address of said user acting on the network with said pseudonym to an address (address of convenience store 2) different from the address of said user.

(11) Said address set means sets the address of a prescribed convenience store (see S11, S12).

(12) Said private information protector further includes identification data control processing means (S590 to S602) performing processing for not transmitting identification data (cookie) transmitted from the site for identifying the user when the user has acted on the network with the real name (Taro, for example) to the accessed site when said user accesses the site in order to act on the network with said pseudonym.

(13) Said identification data control processing means includes:

pseudonym-correspondent identification data storage means (S595, S276, cookie data storage area of EEPROM 26 (see FIG. 11)) storing only said identification data (cookie) transmitted from the site (MTT, MEC or the like, for example) accessed with said pseudonym as identification data dedicated to this pseudonym, and identification data retrieval/transmission means (S623 to S628) making retrieval in said pseudonym-correspondent identification data storage means, deducing identification data corresponding to this pseudonym and transmitting this identification data to said site when said user accesses said site specified by this pseudonym with said pseudonym.

(14) Said private information protector further includes:

action history data storage means (database 12a (see FIG. 4)) storing an action history (action history or the like as to which site has been accessed or the like) when the user has acted on the network with said pseudonym in a mode capable of specifying with which pseudonym he/she has acted, and action history data provision processing means (S530 to S546) performing processing for, when the site accessed by the user with said pseudonym requires provision of action history data of said user on the network with his/her another pseudonym, making retrieval in said action history data storage means and providing action history data with said another pseudonym to said site.

(15) Said private information protector further includes monitoring means (S548) determining, when notifying the pseudonym to said action history data provision processing means and requested for provision of action history data of the user employing the pseudonym on the network with another pseudonym (when name of user is transmitted and determination of YES is made through S535), whether or not this requester and said site specified on the basis of said notified pseudonym match with each other and monitoring the circulation state of the private information of said uses.

(16) Said private information protector includes credit number storage processing means (S438 to S440) performing processing for storing a common credit number (credit number for real name of VP) for a plurality of types of pseudonyms used by a certain user in a mode deducible from each pseudonym, and notification means (S560 to S574) performing processing for accepting enquiry from a credit company about presence/absence of a credit number corresponding to the pseudonym when the user makes credit settlement on the network with said pseudonym, retrieving the credit number registered by said credit number registration processing means, determining presence/absence of the credit number for the pseudonym about which said enquiry has been made and notifying the result of the determination to said credit company.

(17) Said private information protector further includes pseudonym-addressed electronic mail transfer means (S514 to S522) accepting an electronic mail addressed to the pseudonym when the user acts on the network with said pseudonym and transferring this electronic mail to an electronic mail address, readable by the user, corresponding to this pseudonym.

(18) Said private information protector further includes monitoring means determining whether or not said site specified on the basis of the pseudonym which is the addressee of said electronic mail accepted by said pseudonym-addressed electronic mail transfer means and the sender of said accepted electronic mail match with each other and monitoring the circulation state of the private information of said user.

(19) Said monitoring means is set in a prescribed institution (financial institution 7) providing a determination service as to properness/improperness for a plurality of users, and said prescribed institution comprises reliability calculation means (S550, S551) collecting results of monitoring by said monitoring means and calculating reliability related to private information every site, and reliability information provision means (S553) providing reliability information calculated by this reliability calculation means.

(20) Said pseudonym is created by encrypting or decoding the name of the site for which this pseudonym is employed with a key (secret key) usable by the user employing this pseudonym.

(21) A program for protecting private information on a network (broadband/large capacity relay network 43), for letting a processor (CPU 24) function as:

identification information storage means (S622) storing information, capable of specifying identification information employed by a user for specifying a site accessed through the network for providing his/her private information, which is information (trap type VP name, KSB and site name in FIG. 44A, E-mail address used every site and address for direct mail) capable of specifying identification information to be included in a mail (E-mail, direct mail) when a person obtaining said private information sends the mail to the user possessing the private information in a memory (EEPROM 26), and identification information use control means (S625 to S627) performing processing for employing, when identification information employed by the user when accessing the site through the network for specifying this site is already stored in said memory, this stored identification information for said site.

(22) Said identification information is a pseudonym (trap type VP name) used by the user every site, and the program further lets the processor function as:

identification data control processing means (S623 to S628) performing processing for not transmitting identification data (cookie) transmitted from the site for identifying the user when the user acts on the network with the real name (Taro, for example) to the accessed site when said user accesses the site in order to act on the network with said pseudonym.

(23) Said identification data control processing means includes:

pseudonym-correspondent identification data storage means (S622) storing only said identification data (cookie) transmitted from the site accessed with said pseudonym in the memory as identification data dedicated to this pseudonym, and identification data retrieval/transmission means (S625 to S627) making retrieval in said memory, deducing identification data stored in correspondence to this pseudonym and transmitting this identification data to said site when the user thereafter accesses said site specified by this pseudonym with said pseudonym.

(24) A program for protecting private information on a network (broadband/large capacity relay network 43), for letting a processor (CPU 24) function as:

conversion means (S969) decoding or encrypting, when a user has used a pseudonym (trap type VP name) generated by encrypting or decoding the name of a site, accessed by the user through the network, with a key (secret key KSB) usable by this user and received an electronic mail addressed to the pseudonym, the pseudonym which is the addressee of this electronic mail with a key (public key KPB) and returning the pseudonym to the name of the site in plaintext.

(25) The program, further letting the processor (CPU 24) function as:

monitoring means (S969, S968) determining whether or not the name of the site converted by said conversion means and the name of the sender of said received electronic mail match with each other and monitoring the circulation state of the private information of said user.

The present invention is not restricted to the aforementioned (1) to (25), but a combination of at least two arbitrarily selected from among (1) to (25) is also solving means according to the present invention.

Effects of the aforementioned various means are now described.

When a user accesses a site through a network and takes some action on the network such as shopping, for example, he/she may be requested to transmit private information such as the address and the name, the age or preference information of the user from the site in general.

When the user receiving the request from the site has provided private information including that his/her hobby is fishing, for example, to this site, a site different from this site might have sent an electronic mail or a direct mail for selling fishing goods to the user later.

Thus, when private information is provided to a certain site, this private information may be circulated to another site through the network in general. Particularly as the information-oriented society develops, such inconvenience takes place that private information provided to a certain site is instantaneously spread all over the world and the user's privacy is infringed on a worldwide level.

In general, therefore, the site presents a privacy policy to the user so that a user terminal previously input/set by the user refers to the privacy policy and automatically decides which private information of the user is to be presented to the site for presenting only presentable private information to the site according to P3P (Platform for Privacy Preferences) which is a technique developed in order to protect privacy on the network. In this privacy policy, the object of collecting the private information, the mode of utilization of the collected private information, the disclosure range (circulation range) of the collected private information etc. are described in an XML (Extensible Markup Language) text.

However, the user has possessed no means of monitoring whether or not his/her private information is illegally circulated beyond the circulation tolerance set in the privacy policy when the user agrees with this privacy policy and provides his/her private information to the site.

The present invention has been devised in consideration of such circumstances, and an object thereof is to make it possible to monitor illegal circulation of private information.

The following items are attained due to employment of the aforementioned various means:

A site providing private information is specified on the basis of identification information included in a mail sent by a person obtaining the private information of a user to the user possessing the private information, and whether or not the site and the sender of said mail match with each other is determined. When the site receiving provision of the private information circulates the private information to another trader and the trader receiving the private information sends a mail to the user of this private information, it follows that the site specified on the basis of identification information included in the mail and the name of the trader sending the mail do not match with each other. Consequently, it is possible to determine that the private information has been transferred from the site of the first transferee of the user's private information to another trader.

When said identification information is a pseudonym of the user used every site, the trader obtaining the private information employs this pseudonym for specifying the user, and the name of the site which is the first transferee of the user's private information can be specified from this pseudonym.

If making a determination of improperness when the sender of the mail is not included in circulation tolerance for this private information approved when the user provides his/her private information to the site specified on the basis of the identification information, properness/improperness can be determined also in consideration of the use's approval of private information circulation tolerance at the time of transfer of the private information.

When identification information employed by the user accessing the site through the network for specifying this site is already employed, processing for employing this identification information for said site is performed, whereby waste of employing a plurality of types of identification information for the same site can be eliminated.

If information capable of specifying the association between the user and said identification information employed by this user is registered in a prescribed institution having the duty of confidentiality, it is possible to refer to the information of the association registered in the prescribed institution when trouble related to the association between the user and said identification information arises between the user and a trader, for example.

When an electronic certificate for said pseudonym is issued, the user can present the electronic certificate to the other party when performing selling and buying, for example, for making selling and buying with the pseudonym, so that the user takes legal action with the pseudonym.

When the address of the user acting on the network with the pseudonym is set to an address different from the address of this user, it is possible to prevent such inconvenience that the fact that a certain pseudonym and a certain user are the same person is revealed with the clue of the address to the utmost.

If the address of the user acting on the network with the pseudonym is the address of a convenience store, the destination of an article in a case of making electronic shopping, for example, with the pseudonym is addressed to the convenience store, for improving utility for the user going to receive the article with the pseudonym.

When the user accesses the site for acting on the network with the pseudonym and processing for not transmitting identification data transmitted from the site for identifying the user when the user has acted on the network with his/her real name to the accessed site is performed, it is possible to prevent such inconvenience that the fact that a certain pseudonym and a certain user are the same person is revealed with the clue of the identification data to the utmost.

When only said identification data transmitted from the site accessed with the pseudonym is stored as identification data dedicated to this pseudonym so that the identification data corresponding to the pseudonym is transmitted to said site when the user thereafter accesses the site specified by said pseudonym with said pseudonym, it is possible to prevent such inconvenience that the fact that a certain pseudonym and a certain user are the same person is revealed with the clue of the identification information to the utmost.

When the site accessed by the user with the pseudonym is rendered to be capable of providing action history data of the user with another pseudonym to said site at this time, it is possible to prevent such inconvenience that the fact that a certain pseudonym and a certain user are the same person is revealed with the clue of the identification data to the utmost while providing action history data on the network related to the same person to the site for easily providing information or a service preferred by the user customized on the basis of the action history data to the user.

When the user makes credit settlement on the network with the pseudonym, the site receives enquiry about presence/absence of a credit number corresponding to the pseudonym from a credit company, retrieves a common credit number for the pseudonym, determines presence/absence of the enquired credit number corresponding to the pseudonym and notifies a result of determination to the credit company, whereby it is not necessary to register the common credit number for a plurality of types of pseudonyms in the credit company and it is possible to prevent such inconvenience that the fact that a certain pseudonym and another pseudonym are the same person is revealed with the clue of the common credit number to the utmost.

An electronic mail addressed to the pseudonym of the user acting on the network with the pseudonym is accepted and this electronic mail is transferred to an electronic mail address, readable by the user, corresponding to this pseudonym, whereby it is possible to prevent such inconvenience that the fact that a certain pseudonym and another pseudonym are the same person is revealed with the clue of the electronic mail address to the utmost.

In transfer of the electronic mail addressed to the pseudonym, whether or not the site specified on the basis of the pseudonym to whom the electronic mail is addressed and the sender of the electronic mail match with each other is determined for monitoring the circulation state of the user's private information, whereby monitoring is automatically performed in transfer of the electronic mail for improving utility for the user.

When reliability related to private information every site calculated by reliability calculation means is provided, this defines the criterion for the user in provision of private information to the site, for improving utility for the user.

When the pseudonym employed for the site is created by encrypting or decoding the name of the site with a key usable by the user, the pseudonym to whom a mail sent from a trader is addressed can be converted to the name of the site by decoding or encrypting the same with the key.

A virtual person is created through a virtual person creation step so that a real person can pretend to be the virtual action and act when acting on the network, it is possible to prevent private information of the real person from flowing out even if private information of the virtual person flows out, and privacy of the user can be protected. Further, information capable of specifying the association between said real person and said virtual person is registered in a prescribed institution having the duty of confidentiality, whereby, when the virtual person takes unpardonable illegal action on the network, for example, said prescribed institution can specify the real person corresponding thereto with the clue of the virtual person and it is also possible to expect an effect of suppressing illegal action of the virtual person on the network.

If said prescribed institution is a financial institution, this financial institution can, when someone settles accounts through the financial institution as a virtual person, also deduce the real person with the clue of the virtual person, whereby it is easy to let the virtual person settle accounts at ease.

An electronic certificate for the virtual person is issued, whereby it is possible to expect a certain degree of identity guarantee function by presenting the issued electronic certificate when the virtual person acts on the network, and it is possible to prevent such inconvenience that the range of action on the network is restricted due to unclearness of the identity of the virtual person to the utmost.

The address of the virtual person is set to the address different from that of the real person, whereby, when the virtual person purchases an article or the like on the network, the destination of the purchased article can be set to the address different from that of the real person and it is possible to prevent such inconvenience that the real person is revealed in delivery of the article to the virtual person with the clue of the address of the destination to the utmost.

When setting the address of the virtual person to the address of a prescribed convenience store, it is convenient when going to receive the purchased article or the like since convenience stores are widely distributed/arranged across the nation.

A credit number for the virtual person is issued so that the virtual person can pay on credit with the credit number, whereby the virtual person can use the credit number for the virtual person without using the credit number of the real person when making credit settlement on the network and it is possible to prevent such inconvenience that the real person is revealed with the clue of the credit number for the real person to the utmost.

A bank account for the virtual person is opened so that the virtual person can settle accounts with funds in the bank account, whereby the virtual person can utilize not a bank account for the real person but the bank account for the virtual person when settling accounts and it is possible to prevent such inconvenience that the real person is revealed with the clue of the bank account for the real person to the utmost.

The site can make transmission for identifying the user and vary acceptance limitation for identification data with a case of acting on the network as a real person and a case of acting on the network as a virtual person, whereby he/she relaxes the acceptance limitation for the identification data when acting on the network as the virtual person capable of being relatively tolerant for the identification data for cooperating with collection of private information of a trader to the utmost to be capable of receiving service provision from the trader on the basis of the collected private information to the utmost while rendering the acceptance limitation for the identification data strict when acting as the real person, whereby it is possible to prevent such inconvenience that the private information of the real person leaks to the utmost.

When creating and issuing an electronic certificate for the virtual person, creation/issuance processing for the electronic certificate is performed on condition that this is a registered virtual person for whom information capable of specifying the association between the real person and the virtual person is registered in a prescribed institution having the duty of confidentiality, whereby, when the virtual person presents the electronic certificate, it is possible to confirm that this virtual person is registered in the prescribed institution having the duty of confidentiality for proving that he/she is a reliable virtual person through the electronic certificate.

When a processor set on an address of a virtual person different from that of a real person stores information capable of specifying the virtual person setting the address where this processor is set to his/her address in a database and receives a request for delivery of a kept article, the processor performs processing of confirming that the virtual person making the delivery request is the virtual person stored in said database and issuing allowance for delivery of the corresponding article on condition that it has been confirmed that this is the virtual person for whom the article is kept, whereby it is possible to confirm that the virtual person is really the person in question and reliably deliver the article to the utmost in delivery of the article, for improving reliability of article delivery.

A computer-readable recording medium storing a program for letting a computer function as creation request determination means determining whether or not a creation request for a virtual person has been received, birth request transmission means for transmitting a birth request for the virtual person and prescribed information transmission means for transmitting information, capable of specifying a real person, necessary for bearing said virtual person to a prescribed institution is read by the computer so that functions of the aforementioned various means can be exhibited and the virtual person can be born so that the real person can pretend to be the virtual person and act on the network.

When identification data transmitted by a site for identifying a user is transmitted to a terminal of the user, the identification data can be stored in a processor carried by the user in place of the terminal of this user, whereby the terminal of the user can be brought into a state not recording the identification data to the utmost and it is possible to prevent such inconvenience that private information of the real person leaks on the basis of identification data already stored in the terminal when the user acts as the real person through the terminal of the user to the utmost.

When the user accesses a site as the virtual person through the terminal of the user, he/she can transmit the identification data stored in said processor to the site at need, whereby it is possible to positively provide the identification data to a trader for positively providing private information of the virtual person when acting on the network as the virtual person for receiving various types of services from the trader as compensation therefor.

INDUSTRIAL AVAILABILITY

According to the present invention, as hereinabove described, a user can pretend to be a virtual person and act on a network as the virtual person, whereby private information on the network can be protected, while the user provides his/her private information such as preference information to a trader (site) with small resistance due to the virtual person and the trader can collect sufficient private information for easily providing services making the best use thereof so that the present invention is applicable to a system on a network or the like to which protection and best utilization of private information are desired.

The invention claimed is:

1. A private information protection method protecting private information on a network through a computer system, including:

said computer system performing a step of creating a prescribed virtual person for generating specification data for a virtual person for specifying the virtual person different from specification data for a real person for specifying the real person in the actual world and allowing the real person in the actual world to present specification data for said virtual person instead of specification data for said real person in response to a request of private information of a user and act as the virtual person when the real person acts on the network;

said computer system performing a step of registering information capable of specifying the association between said real person and said virtual person in a prescribed institution having the duty of confidentiality and capable of determining said real person corresponding to this virtual person with information capable of specifying said association when said real person acts on the network as the virtual person and takes illegal action;

said computer system performing a step of issuing an electronic certificate for said virtual person;

said computer system performing a step of setting the address of the destination of an article purchased when said real person acts on the network as said virtual person to a different address from said real person, which is an address existing in the actual world; and said computer system performing a step of distinguishing a first identification data transmitted from a site for identifying the user when accessing said site as the real person from a second identification data transmitted from the site for identifying the user when accessing the site as the virtual person, and storing said their identification data, and blocking the first identification data from being transmitted to the site even if the first identification data was transmitted from the site before when accessing said site as the virtual person and transmitting the second identification data to said site when the second identification data was transmitted from said site before as well as blocking the second identification data from being transmitted to said site even if the second identification data was transmitted from said site before when accessing said site as the real person and transmitting the first identification data to said site when the first identification data was transmitted from said site before.

2. A private information protection system protecting private information on a network through a computer system, comprising:
- a processing unit belonging to said computer system performing processing to create a prescribed virtual person for generating specification data for a virtual person for specifying the virtual person different from specification data for a real person for specifying the real person in the actual world and allowing the real person in the actual world to present specification data for said virtual person instead of specification data for said real person in response to a request of private information of a user and act as the virtual person when the real person acts on the network;
- a registration unit registering information capable of specifying the association between said real person and said virtual person in a database of a prescribed institution having the duty of confidentiality and capable of determining said real person corresponding to this virtual person with information capable of specifying said association when said real person acts on the network as the virtual person and takes illegal action; and
- a transmission control unit distinguishing a first identification data transmitted from a site for identifying the user when accessing said site as the real person from a second identification data transmitted from the site for identifying the user when accessing the site as the virtual person, and storing said their identification data, and blocking the first identification data from being transmitted to the site even if the first identification data was transmitted from the site before when accessing said site as the virtual person and transmitting the second identification data to said site when the second identification data was transmitted from said site before as well as blocking the second identification data from being transmitted to said site even if the second identification data was transmitted from said site before when accessing said site as the real person and transmitting the first identification data to said site when the first identification data was transmitted from said site before.

3. The private information protection system according to claim 2, wherein said prescribed institution is a financial institution.

4. A private information protection system protecting private information on a network through a computer system, comprising:
- a processing unit belonging to said computer system performing processing to create a prescribed virtual person for generating specification data for a virtual person for specifying the virtual person different from specification data for a real person for specifying the real person in the actual world and allowing the real person in the actual world to present specification data for said virtual person instead of specification data for said real person in response to a request of private information of a user and act as the virtual person when the real person acts on the network;
- an electronic certificate issuance unit performing processing for issuing an electronic certificate for said virtual person different from that for said real person; and
- a registration unit registering information capable of specifying the association between said real person and said virtual person in a database of a prescribed institution having the duty of confidentiality and capable of determining said real person corresponding to this virtual person with information capable of specifying said association when said real person acts on the network as the virtual person and takes illegal action, wherein
- said electronic certificate issuance unit performs issuance processing of an electronic certificate on condition that it is registered said virtual person for whom the association between said real person and said virtual person is registered in said prescribed institution,
- wherein said computer system further includes a presentation unit presenting to a site specification data for said virtual person instead of specification data for said real person in response to a request of private information of a user when a user, which is said real person, acts on the network as said virtual person,
- said processing unit belonging to said computer system performing processing to create a prescribed virtual person generates first specification data for said virtual person only for a first site, repeatedly used by a user every time and the user accesses said first site and generates second specification data for said virtual person only for a second site repeatedly used by said user every time said user accesses said second site,
- said presentation unit presents different specification data for said virtual person by presenting to a trader of said first site said first specification data for said virtual person generated through a means for generating said specification data for said virtual person and presenting to a trader of said second site said second specification data for said virtual person generated through said means for generating said specification data for said virtual person, and
- said presentation unit differentiates said specification data for said virtual person presented to a first site from said specification data for said virtual person presented to a second site different from this first site.

5. The private information protection system according to claim 4, wherein said electronic certificate is issued by the prescribed institution having the duty of confidentiality registering information capable of specifying the association between said real person and said virtual person and used for certifying that said virtual person is registered in the database of this prescribed institution.

6. A private information protection system protecting private information on a network through a computer system, comprising:
- a processing unit belonging to said computer system performing processing to create a prescribed virtual person for generating specification data for a virtual person for specifying the virtual person different from specification data for a real person for specifying the real person in the actual world and allowing the real person in the actual world to present specification data for said virtual person instead of specification data for said real person in response to a request of private information of a user and act as the virtual person when the real person acts on the network;
- an address set unit setting the address of the destination of an article purchased when said real person acts on the network as said virtual person to a different address from said real person, which is an address existing in the actual world, wherein the address of the destination of an article purchased when acting on the network as said virtual person is the address of a prescribed convenience store; and a presentation unit presenting to a site specification data for said virtual person instead of specification data for said real person in response to a request of private information of a user when a user, which is said real person, acts on the network as said virtual person, wherein said processing unit belonging to said computer system performing processing to create a prescribed virtual person generates first specification data for said virtual person only for a first site, repeatedly used by a user every time and user access said first site and generates second specification data for said virtual person only for a second site repeatedly used by said user every time said user accesses said second site, said presentation unit presents different specification data for said virtual person by presenting to a trader of said first site said first specification data for said virtual person generated through said means for generating said specification data for said virtual person and presenting to a trader of said second site said second specification data for said virtual person generated through said means for generating said specification data for said virtual person, and said presentation unit differentiates said specification data for said virtual person presented to a first site from said specification data for said virtual person presented to a second site different from this first site.

7. A private information protection method protecting private information on a network through a computer system, including:

said computer system performing a step of performing processing for creating a prescribed virtual person for generating specification data for a virtual person for specifying the virtual person different from specification data for a real person for specifying the real person in the actual world and allowing the real person in the actual world to present specification data for said virtual person instead of specification data for said real person in response to a request of private information of a user and act as the virtual person when the real person acts on the network;

said computer system performing a step of presenting specification data for said virtual person instead of specification data for said real person in response to a request of private information of a user when a user, which is said real person, acts on the network as said virtual person; and said computer system performing a step of distinguishing a first identification data transmitted from a site for identifying the user when accessing said site as the real person from a second identification data transmitted from the site for identifying the user when accessing the site as the virtual person, and storing said their identification data, and blocking the first identification data from being transmitted to the site even if the first identification data was transmitted from the site before when accessing said site as the virtual person and transmitting the second identification data to said site when the second identification data was transmitted from said site before as well as blocking the second identification data from being transmitted to said site even if the second identification data was transmitted from said site before when accessing said site as the real person and transmitting the first identification data to said site when the first identification data was transmitted from said site before.

8. The private information protection system according to claim 4, further wherein said computer system further includes:

a proof unit proving that the person in question is registered as said virtual person registered in said prescribed institution, wherein said proof unit generates data for proof by decoding prescribed information with a secret key for said virtual person, transmits said data for proof to a person to be verified and verifies the person to be verified by encrypting the data for proof received by the person to be verified with a public key.

* * * * *